(12) United States Patent
Kondo et al.

(10) Patent No.: US 7,709,109 B2
(45) Date of Patent: *May 4, 2010

(54) INFORMATION RECORDING MEDIUM, AND APPARATUSES FOR REPRODUCING, RECORDING, AND RECORDING AND REPRODUCING THEREOF, AND METHODS FOR REPRODUCING, RECORDING, AND RECORDING AND REPRODUCING THEREOF

(75) Inventors: Tetsuya Kondo, Kanagawa-ken (JP); Kenji Oishi, Yokohama (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/434,973

(22) Filed: May 4, 2009

(65) Prior Publication Data

US 2009/0213714 A1 Aug. 27, 2009

Related U.S. Application Data

(63) Continuation of application No. 11/163,289, filed on Oct. 13, 2005, now Pat. No. 7,544,428, which is a continuation of application No. 10/453,653, filed on Jun. 4, 2003, now Pat. No. 6,982,127.

(30) Foreign Application Priority Data

Jun. 4, 2002 (JP) ............................. 2002-162591

(51) Int. Cl.
*G11B 11/105* (2006.01)
(52) U.S. Cl. ............. 428/817; 428/836; 428/848.3; 428/64.2; 428/64.4; 369/13.55

(58) Field of Classification Search ............ None
See application file for complete search history.

(56) References Cited

U.S. PATENT DOCUMENTS 6,069,870 A  5/2000 Maeda et al.

(Continued)

FOREIGN PATENT DOCUMENTS

JP  2000-11421 A  1/2000

(Continued)

OTHER PUBLICATIONS

Tatsuya Narahara et al., "Optical Disc System for Digital Video Recording," Part of the Joint International Symposium on Optical Memory and Optical Data Storage, Koloa, Hawaii, Jul. 1999, SPIE vol. 3864.

*Primary Examiner*—Kevin M Bernatz
(74) *Attorney, Agent, or Firm*—Connolly Bove Lodge & Hutz LLP

(57) ABSTRACT

An information recording medium comprises a substrate, a second recording layer, a second light transmitting layer, a first recording layer for recording different information from that to be recorded in the second recording layer, and a first light transmitting layer. The second recording layer is formed with a continuous second microscopic pattern of grooves. The first recording layer is formed with a continuous first microscopic pattern of grooves that is different from the second microscopic pattern. Both sidewalls of raised portions of the first and second microscopic patterns are formed with wobbling so as to be parallel with each other. Auxiliary information and a reference clock is recorded on these sidewalls alternately and continuously.

2 Claims, 25 Drawing Sheets

U.S. PATENT DOCUMENTS

| | | |
|---|---|---|
| 6,295,271 B1 | 9/2001 | Inui et al. |
| 6,392,979 B1 | 5/2002 | Yamamoto et al. |
| 6,873,595 B2 | 6/2004 | Kondo et al. |
| 6,982,127 B2 * | 1/2006 | Kondo et al. ............ 428/836 |
| 7,544,428 B2 * | 6/2009 | Kondo et al. ............ 428/836 |
| 7,563,521 B2 * | 7/2009 | Kondo et al. ............ 428/836 |
| 2002/0060979 A1 | 5/2002 | Tsukuda et al. |
| 2005/0122890 A1 | 6/2005 | Ando et al. |

FOREIGN PATENT DOCUMENTS

| | | |
|---|---|---|
| JP | 2000-235733 A | 8/2000 |
| JP | 2001-023243 A | 1/2001 |
| JP | 2001-155347 A | 6/2001 |
| JP | 2001-307336 A | 11/2001 |
| JP | 2002-280907 | 9/2002 |

* cited by examiner

| Base-band before modulating | Base-band after modulated |
|---|---|
| 0 | 00, 11 |
| 1 | 01, 10 |

Fig. 16

| Base-band before modulating | 1 0 0 0 0 1 |
|---|---|
| Base-band after modulated | 01 00 11 00 11 01 |

Fig. 17

INFORMATION RECORDING MEDIUM, AND APPARATUSES FOR REPRODUCING, RECORDING, AND RECORDING AND REPRODUCING THEREOF, AND METHODS FOR REPRODUCING, RECORDING, AND RECORDING AND REPRODUCING THEREOF

REFERENCE TO RELATED APPLICATIONS

This application is a Continuation of Application No. Ser. 11/163,289, filed Oct. 13, 2005 (now U.S. Pat. No. 7,544, 428); which is a Continuation of application Ser. No. 10/453, 653, filed on Jun. 4, 2003 (now U.S. Pat. No. 6,982,127), and for which priority is claimed under 35 U.S.C. § 120; and this application claims priority of Application Ser. No. 2002-162591 filed in Japan on Jun. 4, 2002 under 35 U.S.C. § 119; the entire contents of all are hereby incorporated by reference. This application is related to application Ser. No. 12/434,993 filed May 4, 2009, application Ser. No. 12/434,936 filed May 4, 2009, and application Ser. No. 12/434,915 filed May 4, 2009.

BACKGROUND OF THE INVENTION

1. Field of the Invention

The present invention relates to an information recording medium that is particularly used for recording information optically, and apparatuses for reproducing information recorded in the information recording medium with making the information recording medium move relatively, for recording information in the information recording medium with making the information recording medium move relatively, and for recording and reproducing information in the recording medium with making the information recording medium move relatively, and methods for reproducing the information recording medium, for recording the information recording medium, and for recording and reproducing the information recording medium.

2. Description of the Related Art

Until now, there existed a system used for reading out information from an information recording medium while the information recording medium is made relatively move. In order to reproduce the system, such a method as optical, magnetic or capacitance is utilized. A system for recording and/or reproducing information by the optical method has been most popular in daily life. In the case of a read-only type information recording medium in disciform, which is reproduced by a light beam having a wavelength of 650 nm, for example, such a medium in disciform as a DVD video disc pre-recorded with picture image information, a DVD-ROM disc that is pre-recorded with a program or like, a DVD audio disc, or an SACD (Super Audio CD) disc that is pre-recorded with musical information is popularly known.

In the case of a recording and reproducing type information recording medium, there existed a DVD RAM disc utilizing a phase change effect, an ASMO (Advanced Storage Magneto-Optical) disc and an iD (intelligent image disc) utilizing a magneto-optical effect.

On the other hand, in order to increase recording density, such a study as shortening a wavelength of laser beam so as to realize emission of violaceous light has been continued. A second harmonic oscillating element or a semiconductor light emitting element of gallium nitride system compound, which was invented recently, emits light having a wavelength λ in the neighborhood of 350 nm to 450 nm. Consequently, they could be an important light emitting element, which increases recording density drastically.

Further, a design of objective lens complying with such a wavelength has been advanced. Particularly, an objective lens having an NA (numerical aperture) utilized for a DVD disc, that is, an NA of exceeding 0.6 and more than 0.7 is being developed.

As mentioned above, a reproducing apparatus for information recording medium that is equipped with a light emitting element of which wavelength λ is reduced down to 350 nm to 450 nm and equipped with an objective lens of which an NA is more than 0.7 is being developed. By using these technologies, it can be expected that an optical disc system, which surpasses recording capacity of current DVD disc furthermore, will be developed.

Further, it is also desired that an information recording medium having higher recording density, which is designed on the basis of a violaceous laser beam and a higher NA, is developed.

On the other hand, a recent recording and reproducing type disc adopts a microscopic configuration, namely the land-groove system. With referring to FIGS. 40 and 41, an information recording medium designed for a higher NA recording and reproducing system is explained.

FIG. 40 is a cross sectional view of a conventional information recording medium adopting the microscopic configuration that is called the land-groove system according to the prior art.

FIG. 41 is an enlarged plan view of the information recording medium shown in FIG. 40 showing the horizontal configuration of the information recording medium according to the prior art.

As shown in FIG. 40, an information recording medium 100 is composed of a recording layer 120 and a light transmitting layer 110 sequentially laminated on a substrate 130. A microscopic pattern 131 is formed on the substrate 130. The recording layer 120 is formed directly on the surface of the microscopic pattern 131. The microscopic pattern 131 is composed of a plural of raised portions "Aa" and "Ab" (hereinafter generically referred to as raised portion "A") and a plural of recessed portions "Ba" to "Bc" (hereinafter generically referred to as recessed portion "B"). Macroscopically, the configuration corresponds to that the microscopic pattern 131 is constituted by a continuous groove composed of the raised portion "A" and another continuous groove composed of the recessed portion "B".

Further, as shown in FIG. 41, a record mark "M" is formed in both the grooves composed of the raised portion "A" and the recessed portion "B" respectively when recording.

With paying attention to the dimension of the microscopic pattern 131, while a shortest distance between the recessed portions "Ba" and "Bb" is assumed to be a pitch "P0" (another shortest distance between the raised portions "Aa" and "Ab" is also the pitch "P0"), the microscopic pattern 131 is formed so as to satisfy a relation of P0>S0, wherein "S0" is a spot diameter of reproducing light beam. The spot diameter "S0" is calculated by a wavelength λ of laser beam for reproducing and an NA of objective lens such as S0=λ/NA. In other words, the pitch "P0" is designed so as to satisfy a relation of P0>λ/NA.

In the case of the information recording medium 100, a light beam for recording (recording light) is irradiated on the light transmitting layer 110 and a record mark "M" is formed on both the raised portion "A" and the recessed portion "B" of the recording layer 120.

Further, reproducing light is irradiated on the substrate 130 or the light transmitting layer 110 and reflected by the recording layer 120, and then the reflected reproducing light is picked up for reproducing.

Furthermore, in such a land-groove recording method, an address information showing a recording position is disposed as a pit array at every predetermined interval with dividing the raised portion "A" and the recessed portion "B". In other words, a pit array is arranged in a part of information recording medium, and the address information exhibits an address of a position immediately before or immediately after the pit array. The pit array extends over approximately 1 mm long and arranged at every interval of the order of 10 mm to 20 mm.

Moreover, by applying such a land-groove recording method, a transmittable type double layer information recording medium having two layers of information recording surfaces has been introduced.

Inventors of the present invention have actually manufactured an information recording medium 100 as an experiment, and experimentally recorded and reproduced the information recording medium 100. The inventors founded a problem such that a cross erase phenomenon was extremely noticeable. The cross erase phenomenon is a phenomenon such that information is recorded with being superimposed on a signal previously recorded in a recessed portion "B", for example, when recording the information in a raised portion "A". In other words, it is such a phenomenon that information previously recorded in a recessed portion "B" is erased by recording another information in a raised portion "A".

Further, this phenomenon can also be noticeable in a reverse case, that is, the cross erase phenomenon is also recognized if previously recorded information in a raised portion "A" is observed when recording information in a recessed portion "B". If such a cross erase phenomenon occurs, as mentioned above, information recorded in an adjacent groove is damaged. In case of an information system having larger capacity, an amount of lost information becomes excessively large. Consequently, affection to a user is enormous.

Therefore, it is considered for such an information recording medium 100 that information shall be recorded only in either raised portion "A" or recessed portion "B". However, recording capacity of an information recording medium will decrease and a merit of the information recording medium having a potential of recording in higher density will decline if such an information recording method is conducted.

Further, a case of applying the land-groove recording method to a transmittable type double layer information recording medium, particularly, is considered. A transmittable type double layer information recording medium has two layers of information surfaces. A recording layer of one information surface can be recorded and reproduced through another recording layer of the other information surface as well as recording in the two layers of information surfaces independently. When recording in one recording layer through the other recording layer, the recording layer of a first information surface that recording light passes through first is changed in reflection factor and transmittance by recording. At this moment, the recording layer of the first information surface macroscopically has average transmittance between recorded and not-recorded states. However, recording in a pit array for address, which is provided in a part of the first information surface, itself is not conducted, so that transmittance is not changed. Consequently, a luminous energy irradiated on a second information surface that is disposed underneath the pit array for address of the first information surface is different from another luminous energy irradiated on the second information surface corresponding to another area of the first information surface other than the pit array. In other words, in case of recording in the second information surface through the first information surface, the recording is conducted under a condition of different luminous energies extending over a long area of approximately 1 mm.

Accordingly, it is hard to perform uniform recording in the recording layer of the second information surface.

SUMMARY OF THE INVENTION

Accordingly, in consideration of the above-mentioned problems of the prior art, an object of the present invention is to provide an information recording medium that is reduced in cross erase and can be recorded in higher density, and apparatuses for reproducing information recorded in an information recording medium with making the information recording medium move relatively, for recording information in an information recording medium with making the information recording medium move relatively, and for recording and reproducing information in an information recording medium with making the information recording medium move relatively, and methods for reproducing an information recording medium, for recording an information recording medium, and for recording and reproducing an information recording medium. Particularly, an object of the present invention is to provide an embedding method of an auxiliary information such as an address and a reference clock suitable for a transmittable type multi-layer information recording medium.

In order to achieve the above object, the present invention provides, according to a first aspect thereof, an information recording medium at least comprising: a substrate; a second recording layer formed on the substrate for recording information; a second light transmitting layer formed on the second recording layer; a first recording layer formed on the second light transmitting layer for recording different information from that recorded in the second recording layer; and a first light transmitting layer formed on the first recording layer, wherein the second recording layer is formed with a second microscopic pattern, which is constituted by a continuous substance of grooves formed with a raised portion and a recessed portion alternately with viewing from the first light transmitting layer side, and wherein the first recording layer is formed with a first microscopic pattern, which is constituted by a continuous substance of grooves formed with a raised portion and a recessed portion alternately with viewing from the first light transmitting layer side and is different from the second microscopic pattern, the information recording medium is further characterized in that both the first microscopic pattern and the second microscopic pattern satisfy a relation of $P \leq \lambda/NA$, wherein P is a pitch of the raised portion or the recessed portion, $\lambda$ is a wavelength of reproducing light for reproducing the first recording layer and the second recording layer, and NA is a numerical aperture of an objective lens, and that an auxiliary information based on data used supplementally when recording the information and a reference clock based on a clock used for controlling a recording speed when recording the information is recorded alternately and continuously.

According to a second aspect of the present invention, there is provided an apparatus for reproducing an information recording medium at least comprising: a substrate; a second recording layer formed on the substrate for recording information; a second light transmitting layer formed on the second recording layer; a first recording layer formed on the second light transmitting layer for recording different information from that recorded in the second recording layer; and a first light transmitting layer formed on the first recording layer, wherein the second recording layer is formed with a second microscopic pattern, which is constituted by a continuous substance of grooves formed with a raised portion and a recessed portion alternately with viewing from the first light transmitting layer side, and wherein the first recording layer is formed with a first microscopic pattern, which is constituted by a continuous substance of grooves formed with a raised portion and a recessed portion alternately with viewing from the first light transmitting layer side and is different from the second microscopic pattern, the information recording medium is further characterized in that both the first microscopic pattern and the second microscopic pattern satisfy a relation of $P \leq \lambda/NA$, wherein P is a pitch of the raised portion or the recessed portion, $\lambda$ is a wavelength of reproducing light for reproducing the first recording layer and the second recording layer, and NA is a numerical aperture of an objective lens, and that an auxiliary information based on data used supplementally when recording the information and a reference clock based on a clock used for controlling a recording speed when recording the information is recorded alternately and continuously, the apparatus at least comprising: a reproducing means for reproducing the first recording layer or the second recording layer of the information recording medium, wherein the reproducing means is constituted by a light emitting element for emitting reproducing light having a wavelength $\lambda$ of 350 nm to 450 nm and a noise of less than RIN (Relative Intensity Noise)−125 dB/Hz, and an objective lens having a numerical aperture NA of 0.75 to 0.9; and a control means for controlling the reproducing means to irradiate the reproducing light only on the raised portion for reproducing.

According to a third aspect of the present invention, there provided an apparatus for recording an information recording medium at least comprising: a substrate; a second recording layer formed on the substrate for recording information; a second light transmitting layer formed on the second recording layer; a first recording layer formed on the second light transmitting layer for recording different information from that recorded in the second recording layer; and a first light transmitting layer formed on the first recording layer, wherein the second recording layer is formed with a second microscopic pattern, which is constituted by a continuous substance of grooves formed with a raised portion and a recessed portion alternately with viewing from the first light transmitting layer side, and wherein the first recording layer is formed with a first microscopic pattern, which is constituted by a continuous substance of grooves formed with a raised portion and a recessed portion alternately with viewing from the first light transmitting layer side and is different from the second microscopic pattern, the information recording medium is further characterized in that both the first microscopic pattern and the second microscopic pattern satisfy a relation of $P \leq \lambda/NA$, wherein P is a pitch of the raised portion or the recessed portion, $\lambda$ is a wavelength of reproducing light for reproducing the first recording layer and the second recording layer, and NA is a numerical aperture of an objective lens, and that an auxiliary information based on data used supplementally when recording the information and a reference clock based on a clock used for controlling a recording speed when recording the information is recorded alternately and continuously, the apparatus at least comprising: a recording means for recording information in the first recording layer or the second recording layer of the information recording medium, wherein the recording means is constituted by a light emitting element for emitting recording light having a wavelength $\lambda$ of 350 nm to 450 nm and a noise of less than RIN−125 dB/Hz, and an objective lens having a numerical aperture NA of 0.75 to 0.9; and a control means for controlling the recording means to irradiate the recording light only on the raised portion for recording.

According to a fourth aspect of the present invention, there provided an apparatus for recording and reproducing an information recording medium at least comprising: a substrate; a second recording layer formed on the substrate for recording information; a second light transmitting layer formed on the second recording layer; a first recording layer formed on the second light transmitting layer for recording different information from that recorded in the second recording layer; and a first light transmitting layer formed on the first recording layer, wherein the second recording layer is formed with a second microscopic pattern, which is constituted by a continuous substance of grooves formed with a raised portion and a recessed portion alternately with viewing from the first light transmitting layer side, and wherein the first recording layer is formed with a first microscopic pattern, which is constituted by a continuous substance of grooves formed with a raised portion and a recessed portion alternately with viewing from the first light transmitting layer side and is different from the second microscopic pattern, the information recording medium is further characterized in that both the first microscopic pattern and the second microscopic pattern satisfy a relation of $P \leq \lambda/NA$, wherein P is a pitch of the raised portion or the recessed portion, $\lambda$ is a wavelength of reproducing light for reproducing the first recording layer and the second recording layer, and NA is a numerical aperture of an objective lens, and that an auxiliary information based on data used supplementally when recording the information and a reference clock based on a clock used for controlling a recording speed when recording the information is recorded alternately and continuously, the apparatus at least comprising: a recording and reproducing means for recording information in the first recording layer or the second recording layer of the information recording medium and reproducing the information, wherein the recording and reproducing means is constituted by a light emitting element for emitting recording light and reproducing light having a wavelength $\lambda$ of 350 nm to 450 nm and a noise of less than RIN−125 dB/Hz, and an objective lens having a numerical aperture NA of 0.75 to 0.9; and a control means for controlling the recording and reproducing means to irradiate the recording light and the reproducing light only on the raised portion for recording and reproducing.

Other object and further features of the present invention will be apparent from the following detailed description when read in conjunction with the accompanying drawings.

BRIEF DESCRIPTION OF DRAWINGS

FIG. 16 is a table exhibiting data change before and after modulating a base-band.

FIG. 17 is a table exhibiting an example of actual data change before and after modulating a base-band.

DETAILED DESCRIPTION OF THE PREFERRED EMBODIMENTS

Embodiment One

With referring to FIG. 1, a basic configuration of an information recording medium according to the present invention will be explained. An information recording medium according to an embodiment one of the present invention is such an information recording medium that at least one of recording and reproducing is conducted through an optical method. Actually, it is such an information recording medium as a phase change recording type information recording medium, a dye type information recording medium, a magneto-optical type information recording medium or a light assist magnetic type information recording medium.

Further, such an information recording medium is composed of a plurality of information faces, so that different information can be recorded on each information surface individually. More exactly, such an information recording medium is constructed that one information surface can be recorded and reproduced by a light beam, which passes through the other information surface. Hereinafter, such an information recording medium is explained with assuming that a plurality of information surfaces is two information surfaces.

Figure 1:
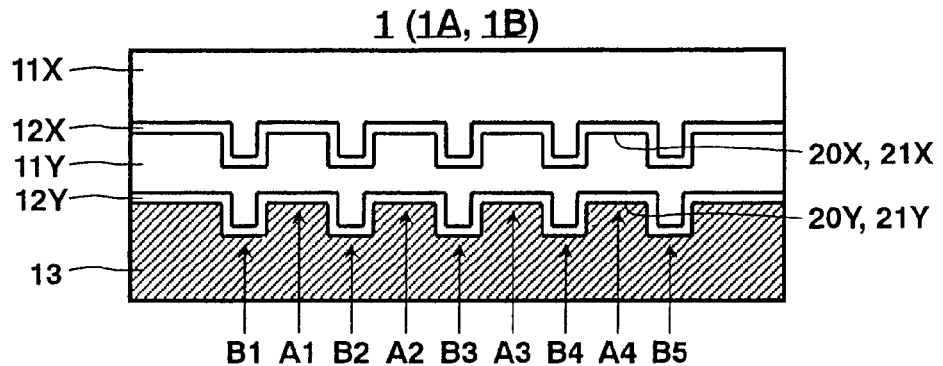
FIG. 1 is a cross sectional view of an information recording medium according to an embodiment one of the present invention.

FIG. 1 is a cross sectional view of an information recording medium according to an embodiment one of the present invention.

In FIG. 1, an information recording medium 1 according to the present invention is at least composed of a first light transmitting layer 11X, a first recording layer 12X, a second light transmitting layer 11Y, a second recording layer 12Y, and a substrate 13. An embossed microscopic pattern is formed on the first recording layer 12X and the second recording layer 12Y respectively, wherein each embossed microscopic pattern is referred to as a first microscopic pattern 20X and a second microscopic pattern 20Y. These microscopic patterns are also formed on a surface of other layers adjoining the recording layers 12X and 12Y respectively.

Further, unevenness in the first microscopic pattern 20X and the second microscopic pattern 20Y forms a shape of continuous substance of approximately parallel grooves.

Furthermore, a shape of the information recording medium 1 can be applicable in any shape such as disciform, card and tape even in circular, rectangular or oval shape. The information recording medium 1 can also be acceptable although it is perforated.

In addition thereto, a light beam for reproducing (reproducing light) or recording (recording light) is irradiated on the first light transmitting layer 11X.

First of all, the substrate 13, the first recording layer 12X, the second recording layer 12Y, the first light transmitting layer 11X and the second light transmitting layer 11Y is detailed. The substrate 13 is a base substance having a function of sustaining mechanically the second recording layer 12Y, the second light transmitting layer 11Y, the first recording layer 12X, and the first light transmitting layer 11X sequentially laminated thereon. With respect to a material for the substrate 13, any of synthetic resin, ceramic and metal is used. A typical example of synthetic resin is various kinds of thermoplastic resins and thermosetting resins such as polycarbonate, polymethyle methacrylate, polystyrene, copolymer of polycarbonate and polystyrene, polyvinyl chloride, alicyclic polyolefin and polymethyle pentene, and various kinds of energy ray curable resins such as UV ray curable resins, visible radiation curable resins and electron beam curable resins. They can be preferably used.

Further, it is also acceptable that these synthetic resins are mixed with metal powder or ceramic powder.

With respect to a typical example of the ceramic, soda lime glass, soda aluminosilicate glass, borosilicate glass or silica glass can be used. With respect to a typical example of the metal, a metal plate such as aluminum having no transparency can be used. A thickness of the substrate 13 is suitable to be within a range of 0.3 mm to 3 mm, desirably 0.5 mm to 2 mm due to necessity of supporting mechanically the information recording medium 1 in total. In case that the information recording medium 1 is in disciform, the thickness of the substrate 13 is desirable to be designed such that the total thickness of the information recording medium 1 including the substrate 13, the second recording layer 12Y, the second light transmitting layer 11Y, the first recording layer 12X, and the first light transmitting layer 11X becomes 1.2 mm, for the purpose of interchangeability with a conventional optical disc.

The first recording layer 12X and the second recording layer 12Y is a thin film layer that has a function of reading out information, recording or rewriting information. The first recording layer 12X and the second recording layer 12Y is formed with the first microscopic pattern 20X and the second microscopic pattern 20Y respectively. Both the first microscopic pattern 20X and the second microscopic pattern 20Y are constituted by a plurality of raised portions "A1" through "A4" (hereinafter generically referred to as raised portion "A") and a plurality of recessed portions "B1" through "B5" (hereinafter generically referred to as recessed portion "B") respectively. Information is recorded on either one of a raised portion "A" and a recessed portion "B" as a record mark "M". With respect to a material for the first recording layer 12X and the second recording layer 12Y, a material that is represented by a phase-change material of which reflectivity or refractive index changes in a process of before and after recording or both of reflectivity and refractive index change in a process of before and after recording, a dye material of which refractive index or a depth changes in a process of before and after recording or both of refractive index and depth change in a process of before and after recording, or a material represented by a magneto-optical material, which produces a change of Kerr rotation angle in a process of before and after recording, can be used. In addition, it is acceptable for materials of the first recording layer 12X and the second recording layer 12Y that they are the same material as each other or different materials from each other.

With respect to an actual example of phase change material, alloys composed of an element such as indium (In), antimony (Sb), tellurium (Te), selenium (Se), germanium (Ge), bismuth (Bi), vanadium (V), gallium (Ga), platinum (Pt), gold (Au), silver (Ag), copper (Cu), aluminum (Al), silicon (Si), palladium (Pd), tin (Sn) and arsenic (As) are used, wherein an alloy includes a compound such as oxide, nitride, carbide, sulfide and fluoride. Particularly, alloys composed of a system such as Ge—Sb—Te system, Ag—In—Te—Sb system, Cu—Al—Sb—Te system and Ag—Al—Sb—Te system are suitable for the first and second recording layers 12X and 12Y. These alloys can contain one or more elements as a micro additive element within a range of more than 0.01 atomic % to less than 10 atomic % in total. Such a micro additive element is selected out of Cu, Ba, Co, Cr, Ni, Pt, Si, Sr, Au, Cd, Li, Mo, Mn, Zn, Fe, Pb, Na, Cs, Ga, Pd, Bi, Sn, Ti, V, Ge, Se, S, As, Tl and In.

With respect to an actual example of dye material, porphyrin dye, cyanine dye, phthalocyanine dye, naphthalocyanine dye, azo dye, naphthoquinone dye, fulgide dye, polymethine dye and acridine dye can be used.

With respect to an actual example of magneto-optical material, alloys composed of an element such as terbium (Tb), cobalt (Co), iron (Fe), gadolinium (Gd), chromium (Cr), neodymium (Nd), dysprosium (Dy), bismuth (Bi), palladium (Pd), samarium (Sm), holmium (Ho), praseodymium (Pr), manganese (Mn), titanium (Ti), erbium (Er), ytterbium (Yb), lutetium (Lu) and tin (Sn) can be used, wherein an alloy includes a compound such as oxide, nitride, carbide, sulfide and fluoride. Particularly, constituting an alloy of a transition metal, which is represented by TbFeCo, GdFeCo and DyFeCo, with rare earth element is preferable.

Further, the first and second recording layers 12X and 12Y can be constituted by using an alternate lamination layer of cobalt (Co) and platinum (Pt).

In order to bring out maximal performance from the first and second recording layers 12X and 12Y, they can be accompanied by various kinds of dielectric materials or reflective materials. Constituting the first and second recording layers 12X and 12Y by laminating these materials thereon results in improving reflectivity, recording sensitivity, reproduction modulation amplitude, deterioration of reproducing light, and storage stability. An actual example will be explained later.

When recording on and reproducing from the second recording layer 12Y, the recording and reproducing is conducted through the first recording layer 12X. Consequently, it is necessary for the first recording layer 12X to be that its transmittance at wavelength λ of reproducing light is relatively high and to be in semitransparent. The necessity results in reducing its thickness, so that its material is essential to have relatively higher reflectivity.

Further, reproducing light passes through the first recording layer 12X and is reflected by the second recording layer 12Y, and then returns back to an apparatus for reproducing. Therefore, reflectivity of the second recording layer 12Y is essential to be high to some degree.

With respect to an optimal value that satisfies the above-mentioned requirement when a phase-change material is selected for both the first and second recording layers 12X and 12Y, transmittance of the first recording layer 12X is 40% to 60%, reflectivity of the first recording layer 12X is 0.5% to 10%, and reflectivity of the second recording layer 12Y alone is 5% to 40%. Consequently, reflectivity of the second recording layer 12Y, which is observed through the first recording layer 12X, is 0.8% to 14%.

Accordingly, reflectivity that is observed at an apparatus for reproducing is approximately the same order for both the first and second recording layers 12X and 12Y, so that recording and reproducing two information surfaces is enabled by switching focusing on either information surfaces.

Further, an excellent reproduction characteristic that maintains an error rate of less than $4 \times 10^{-4}$ can be obtained even when jitter of a record mark "M" decreases and the information recording medium 1 inclines.

With respect to a method of forming the first and second recording layers 12X and 12Y, a film forming method such as a vapor phase film forming method and a liquid phase film forming method can be used. As a typical example of the vapor phase film forming method, such methods as vacuum deposition of resister heating type or electron beam type, direct current sputtering, high frequency sputtering, reactive sputtering, ion beam sputtering, ion plating and chemical vapor deposition (CVD) can be used.

Further, with respect to a typical example of the liquid phase film forming method, there is existed a spin coating method and a dipping and drawing up method.

The first and second light transmitting layers 11X and 11Y have a function of conducting converged reproducing light to the first and second recording layers 12X and 12Y with keeping the converged reproducing light in less optical distortion. For example, in order to suppress reduction of the reproducing light, a material of which birefringence that is a total of the first and second light transmitting layers 11X and 11Y is less than ±100 nm, preferably ±50 nm by 90-degree (vertical) incident double paths is used for the first and second light transmitting layers 11X and 11Y.

Further, such a material that total transmittance of the first and second light transmitting layers 11X and 11Y at a wavelength λ of the reproducing light becomes more than 70%, preferably more than 80% is suitably used for the first and second light transmitting layers 11X and 11Y.

A thickness of the first light transmitting layer 11X is desirable to be less than 0.12 mm in view of suppressing coma aberration when the information recording medium 1 is inclined.

Further, in view of preventing the first recording layer 12X from being scratched, the thickness is desirable to be more than 0.05 mm. In other words, the desirable thickness is within a range of 0.05 mm to 0.12 mm. More desirably, the thickness is within a range of 0.07 mm to 0.10 mm.

Furthermore, scattering of thickness in a single plain is desirable to be ±0.003 mm maximum in view of spherical aberration, because an NA of objective lens is relatively large. Particularly, in case that an NA of the objective lens is more than 0.85, the scattering of thickness in a single plain is desirable to be less than ±0.002 mm.

Moreover, in case that an NA of the objective lens is 0.9, the scattering of thickness in a single plain is desirable to be less than ±0.001 mm.

With respect to a thickness of the second light transmitting layer 11Y, the thickness is desirable to be more than 0.02 mm in order to prevent inter-layer crosstalk when reproducing both the first and second recording layers 12X and 12Y, and to prevent the first recording layer 12X from accidental erasure when recording and reproducing the second recording layer 12Y. In other words, the thickness is desirable to be more than 0.01 mm as a limit for preventing interference between respective auxiliary information and reference clock that are obtained from the first and second recording layers 12X and 12Y, which appear in a differential signal when reading out the auxiliary information and the reference clock, will be detailed later.

Further, the thickness is desirable to be more than 0.02 mm as a limit for preventing interference between recording signals from both the first and second recording layers 12X and 12Y, which appear in a total sum signal when reading out the recording signals, will be detailed later.

Furthermore, since recording and reproducing the second recording layer 12Y is conducted through the first recording layer 12X, information recorded on the first recording layer 12X is easily erased by recording light or reproducing light. Consequently, the thickness is desirable to be more than 0.015 mm as a limit for preventing the accidental erasure.

In summing up the above-mentioned conditions, a thickness of the second light transmitting layer 11Y is desirable to be more than 0.02 mm.

In a reproducing apparatus and a recording apparatus, which will be mentioned later, an optical length is adjusted so as to minimize spherical aberration corresponding to the first recording layer 12X and the second recording layer 12Y. An optical length is desirable to be less than 0.04 mm as a limit for a range of adjustment.

Accordingly, a thickness of the second light transmitting layer 11Y is most desirable to be within a range of 0.02 mm to 0.04 mm.

With respect to a material for constituting the first light transmitting layer 11X and the second light transmitting layer 11Y, a synthetic resin such as polycarbonate, polymethyle methacrylate, cellulose tri-acetate, cellulose di-acetate, polystyrene, copolymer of polycarbonate and polystyrene, polyvinyl chloride, alicyclic polyolefin and polymethyle pentene can be used.

Further, a material having higher stiffness so as to have a function of protecting the second recording layer 12Y mechanically and chemically can be used. For example, an energy ray curable resin such as a ultraviolet ray curable resin, a visible ray curable resin and an electron beam curable resin, a thermosetting resin, a transparent ceramic such as soda lime glass, soda aluminosilicate glass, borosilicate glass and silica glass can be suitably used.

Furthermore, the first light transmitting layer 11X and the second light transmitting layer 11Y is not necessary to be a single layer respectively. They can be composed of multi-layers of different materials.

With referring to FIG. 2, the first and second microscopic patterns 20X and 20Y that are one of major features of the present invention are explained next. As mentioned above, microscopically, the first microscopic pattern 20X and the second microscopic pattern 20Y is composed of a continuous substance of approximately parallel grooves. However, macroscopically, the continuous substance can be in a shape of not only linear but also coaxial or spiral.

Figures 2, 3:
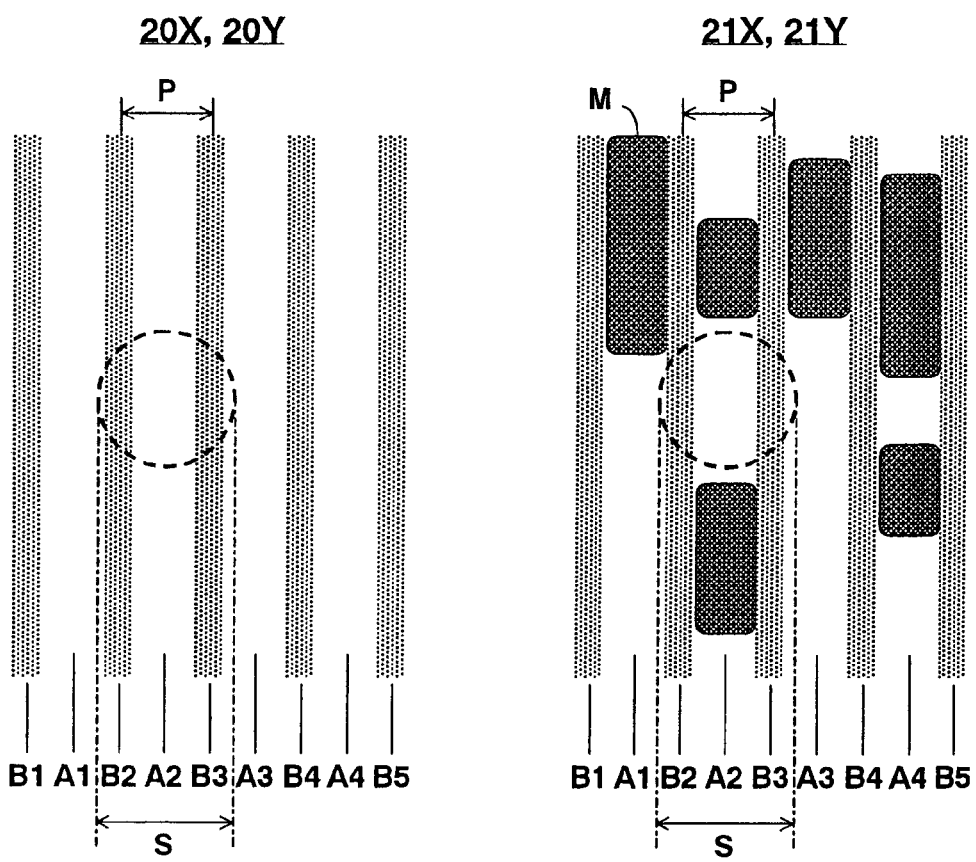
FIG. 2 is an enlarged plan view of the information recording medium shown in FIG. 1.
FIG. 3 is another enlarged plan view of the information recording medium shown in FIG. 1 exhibiting a state of being recorded.

FIG. 2 is an enlarged plan view of the information recording medium shown in FIG. 1. In FIG. 2, symbol signs "P" and "S" are a pitch between adjoining two recessed portions "B2" and "B3" and a spot diameter of reproducing light beam respectively. As shown in FIG. 2, a raised portion "A" of the first microscopic pattern 20X or the second microscopic pattern 20Y corresponds to the raised portion "A" shown in FIG. 1 and a recessed portion "B" of the first microscopic pattern 20X or the second microscopic pattern 20Y corresponds to the recessed portion "B" shown in FIG. 1.

Further, the raised portion "A" and the recessed portion "B" can be wobbled, will be mentioned later. However, centerlines of the raised portion "A" and the recessed portion "B" are formed in parallel to each other. In FIG. 2 and succeeding drawings FIGS. 3 to 10, a width of the raised portion "A" and a width of the recessed portion "B" is illustrated in different width in each drawing. However, it is understood that the width is not limited to one specific width, basically.

Furthermore, in case that a user records data in the information recording medium 1, the data are recorded only on either one of the raised portion "A" and the recessed portion "B". Accurately, the data are recorded on a portion corresponding to either one of the raised portion "A" and the recessed portion "B" in either the first recording layer 12X or the second recording layer 12Y. Selecting either the raised portion "A" or the recessed portion "B" is arbitrary. However, it is desirable for selecting the raised portion "A" or the recessed portion "B" to maintain at least a same selection result of either the raised portion "A" or the recessed portion "B" even in any place in each recording layer. In case of recording on different portions by a place, it is hard to reproduce continuously and resulted in degrading a recording capacity substantially.

Moreover, it is acceptable that a selection result of the first recording layer 12X is different from that of the second recording layer 12Y. However, these selection results are desirable to be the same in order to make an operation of apparatus for reproducing and an apparatus for recording easier and to simplify their circuitry.

FIG. 3 is a plan view of the information recording medium 1 shown in FIG. 1 exhibiting an example of recording that is conducted only on raised portions "A" of the first recording layer 12X or the second recording layer 12Y. As shown in FIG. 3, a record mark "M" is recorded only on the raised portions "A1" through "A4" not on the recessed portions "B1" through "B5", which constitute the first microscopic pattern 21X and the second microscopic pattern 21Y. The record mark "M" is recorded by a mark position recording method or a mark edge recording method.

A signal, which is used for recording, is a modulation signal that is a so-called (d, k) code, which is defined as that a minimum mark length is "d+1" and a maximum mark length is "k+1", wherein either a fixed length code or a variable length code can be applied for a (d, k) modulation signal. Actually, with defining that a minimum mark length is 2T, a (d, k) modulation such as (1, 7) modulation, 17PP modulation, DRL modulation, (1, 8) modulation and (1, 9) modulation can be used.

An example representing the (1, 7) modulation of the fixed length code is the "D1, 7" modulation (that is disclosed in the Japanese Patent Application No. 2001-80205 in the name of Victor company of Japan, Limited). The "D1, 7" modulation can be replaced by the (1, 7) modulation or the (1, 9) modulation, which is based on the "D4, 6" modulation of the fixed length code (that is disclosed in the Japanese Patent Application Laid-open Publication No. 2000-332613). The 17PP modulation is one of the (1, 7) modulation of the variable length code and disclosed in the Japanese Patent Application Laid-open Publication No. 11-346154/1999.

Further, the (2, 7) modulation and the (2, 8) modulation, which are the variable length code with defining the minimum mark length as 3T, the EFM modulation, the EFM plus modulation, and the "D8-15" modulation (that is disclosed in the Japanese Patent Application Laid-open Publication No. 2000-286709) as the (2, 10) modulation of the fixed length code can be used.

Furthermore, a modulation system, which defines the minimum mark length as 4T such as the (3, 17) modulation, and another modulation system, which defines the minimum mark length as 5T such as the (4, 21) modulation, can be used.

A raised portion "A", hereupon, is defined as a portion that appears to be raised with observing from an irradiating direction of reproducing light or recording light. In other words, with observing from the first light transmitting layer 11X, a raised portion "A" is a portion that appears to be raised.

On the contrary, a recessed portion "B" is defined as a portion that appears to be recessed with observing from an irradiating direction of reproducing light or recording light. In other words, with observing from the first light transmitting layer 11X, a recessed portion "B" is a portion that appears to be recessed.

In FIG. 3, with defining that a distance between adjoining two recessed portions "B2" and "B3" is a pitch "P" (in the same way, a distance between adjoining two raised portions "A1" and "A2" is also defined as the pitch "P"), the pitch "P" is designated so as to satisfy a relation of $P \leq S$, wherein "S" is a spot diameter of reproducing light. The spot diameter "S" is calculated by a wavelength $\lambda$ of laser beam for reproducing and an NA of objective lens such as $S=\lambda/NA$. In other words, the pitch "P" satisfies a relation of $P \leq \lambda/NA$.

In case of using a violaceous laser beam, its wavelength $\lambda$ is within a range of 350 nm to 450 nm, and in case of using a high NA lens, its NA is 0.75 to 0.9. Consequently, a pitch "P" is set to be within a range of 250 nm to 600 nm.

Further, in case of considering that a digital picture image of HDTV (High Definition Television) program is recorded for approximately two hours, more than 20 GB is necessary for a recording capacity. Consequently, the pitch "P" is desirable to be within a range of 250 nm to 450 nm. Particularly, in case that an NA is 0.85 to 0.9, the pitch "P" is more desirable to be 250 nm to 400 nm.

Furthermore, in case that a wavelength $\lambda$ is 350 nm to 410 nm and also an NA is 0.85 to 0.9, the pitch "P" is most desirable to be 250 nm to 360 nm.

A depth of recessed portion "B" is preferable to be $\lambda/8n$ to $\lambda/20n$, wherein "n" is a refractive index at a wavelength $\lambda$ of the first light transmitting layer 11X and the second light transmitting layer 11Y. Since a reflectivity of the first recording layer 12X and the second recording layer 12Y is reduced a little due to existence of the first microscopic pattern 20X and the second microscopic pattern 20Y, a depth of recessed portion "B" is desirable to be shallower. Less than $\lambda/10n$ is suitable for the depth of recessed portion "B" as a limit for jitter of a reproduced signal not to be deteriorated.

Further, an output of a differential signal increases in accordance with a depth of recessed portion "B" when tracking down a raised portion "A" or a recessed portion "B". Consequently, more than $\lambda/18n$ is suitable for a limiting value for enabling to track. In other words, a range of $\lambda/10n$ to $\lambda/18n$ is suitable for a depth of recessed portion "B", and a most suitable range for the depth of recessed portion "B" is λ/11n to λ/16n.

As mentioned above, the information recording medium 1 according to the embodiment one of the present invention is such an information recording medium that is recorded on either a recessed portion "B" or a raised portion "A" of the first recording layer 12X and the second recording layer 12Y. Therefore, recording is conducted with keeping a distance of pitch "P" and resulted in decreasing the cross erase phenomenon.

Further, it is designed for the relation between the pitch "P" and the spot diameter "S" to be P≦S, so that decreasing recording density is suppressed.

A result of evaluation with respect to the cross erase phenomenon in comparison with a conventional information recording medium 100 is depicted hereinafter. With respect to an information recording medium of which second recording layer 12Y is formed by a phase change material, a second track is recorded and reproduced, and the reproduced output is measured. Then, a first track and a third track is recorded ten times each with a signal having a frequency different from that recorded on the second track, and an output from the second track is measured once again. With defining that an output difference between the outputs originally measured and secondary measured is a cross erase amount, a cross erase amount cause by conventional land-groove recording method is−5 dB. On the contrary, by the information recording medium 1 according to the embodiment one of the present invention, a cross erase amount is reduced to the order of−2 dB. In other words, by using the information recording medium 1 according to the embodiment one of the present invention, a cross erase phenomenon can be improved by 3 dB in comparison with the conventional land-groove recording method.

Further, a similar evaluation is conducted to an information recording medium of which second recording layer 12Y is formed by a dye material. By the conventional land-groove recording method, an output decreases drastically by 12 dB. On the contrary, by the information recording medium 1, an output decreases by 2 dB. In other words, by using the information recording medium 1, a cross erase phenomenon is improved by up to 10 dB in comparison with the conventional land-groove recording method although a dye material is used for the information recording medium 1.

Furthermore, a similar evaluation is conducted to an information recording medium of which second recording layer 12Y is formed by a magneto-optical material. By the conventional land-groove recording method, an output decreases by 4 dB. On the contrary, by the information recording medium 1 according to the embodiment one of the present invention, an output decreases by just 1 dB. In other words, by using the information recording medium 1, a cross erase phenomenon is improved by up to 3 dB in comparison with the conventional land-groove recording method although a magneto-optical material is used for the information recording medium 1.

Moreover, such an effect of improving the cross erase phenomenon is recognized in not only the second recording layer 12Y but also the first recording layer 12X.

In addition thereto, such an effect is recognized by any of phase change material, dye material and magneto-optical material to be used for the first and second recording layers 12X and 12Y.

The information recording medium 1 according to the embodiment one of the present invention is such an information recording medium that is recorded with information on either a recessed portion "B" or a raised portion "A" of the first recording layer 12X and the second recording layer 12Y. It is studied that either portion is suitable for recording information in view of reproduction, and founded that recording on a raised portion "A" of both the first recording layer 12X and the second recording layer 12Y decreases an error rate and is excellent in a rewriting characteristic. In view of that a raised portion "A" is disposed in a side closer to the first light transmitting layer 11X than a recessed portion "B", and reproducing light and recording light is irradiated on the first light transmitting layer 11X, it is considered that thermal flow of a material constituting the first and second recording layers 12X and 12Y is suppressed to some degree in an area of raised portion "A".

Figure 4:
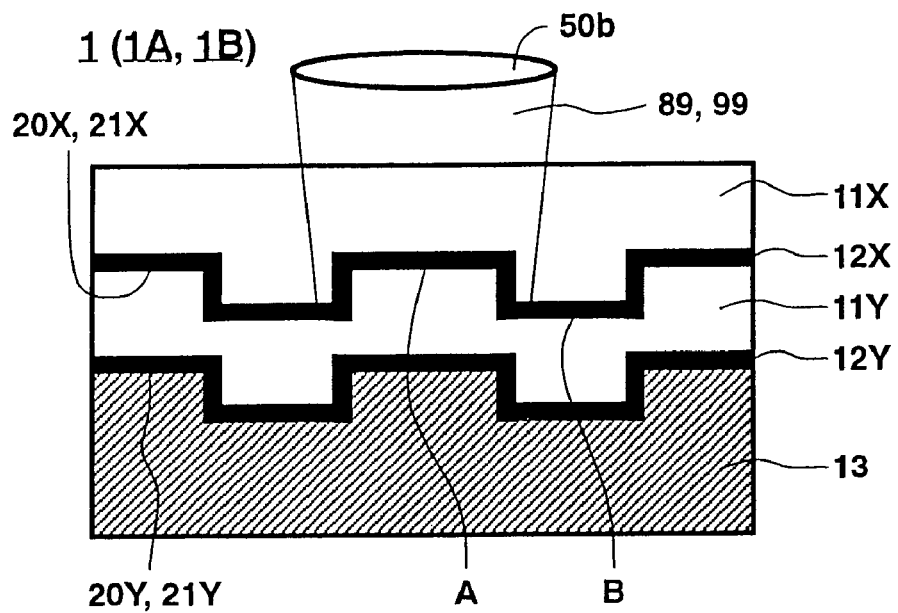
FIG. 4 is a cross sectional view of the information recording medium shown in FIG. 1 exhibiting a state of reproducing or recording a first recording layer of the information recording medium.

FIG. 4 is a cross sectional view of the information recording medium 1 according to the embodiment one of the present invention exhibiting a state of recording and reproducing the first recording layer 12X. In FIG. 4, an apparatus for recording and another apparatus for reproducing is illustrated by an objective lens 50b as a representative of them. A laser beam 89 is emitted through the objective lens 50b of the apparatus for recording when recording. The laser beam 89 is converged selectively on a raised portion "A" of the first microscopic pattern 20X in the information recording medium 1 with respect to the horizontal direction. With respect to the vertical direction, the laser beam 89 is converged selectively on the first recording layer 12X through the first light transmitting layer 11X.

Further, a record mark "M" is recorded on a portion where the laser beam 89 is converged on. In other words, recording is selectively conducted to the first recording layer 12X corresponding to a raised portion "A".

As mentioned above, in case that the first recording layer 12X is formed by a phase change material, the recording hereupon is conducted by change of reflectivity, change of refractive index, or change of both of them. In case of being formed by a magneto-optical material, the recording is conducted by change of Kerr rotation angle.

Further, in case of a dye material, the recording is conducted by change of refractive index, change of depth, or change of both of them.

On the other hand, when reproducing, a laser beam 99 is emitted through the objective lens 50b of the other apparatus for reproducing. The laser beam 99 is converged selectively on a raised portion "A" of the first microscopic pattern 21X in the information recording medium 1 with respect to the horizontal direction.

Further, with respect to the vertical direction, the laser beam 99 is converged selectively on the first recording layer 12X through the first light transmitting layer 11X. A record mark "M" is recorded selectively on the first recording layer 12X corresponding to a raised portion "A". Consequently, a record mark "M" can be read out from a portion where the laser beam 99 is converged on.

Figure 5:
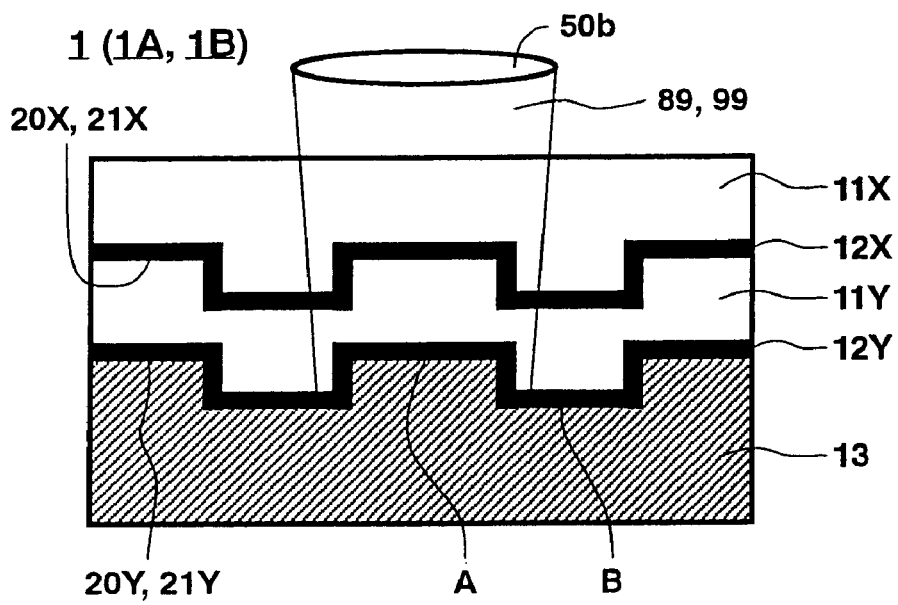
FIG. 5 is a cross sectional view of the information recording medium shown in FIG. 1 exhibiting a state of reproducing or recording a second recording layer of the information recording medium.

FIG. 5 is a cross sectional view of the information recording medium 1 according to the embodiment one of the present invention exhibiting a state of recording and reproducing the second recording layer 12Y. In FIG. 5, an apparatus for recording and another apparatus for reproducing is illustrated by an objective lens 50b as a representative of them. A laser beam 89 is emitted through the objective lens 50b of the apparatus for recording when recording. The laser beam 89 is converged selectively on a raised portion "A" of the second microscopic pattern 20Y in the information recording medium 1 with respect to the horizontal direction. With respect to the vertical direction, the laser beam 89 is converged selectively on the second recording layer 12Y through the first light transmitting layer 11X, the first recording layer 12X, and the second light transmitting layer 11Y.

Further, a record mark "M" is recorded on a portion where the laser beam 89 is converged on. In other words, recording is selectively conducted to the second recording layer 12Y corresponding to a raised portion "A".

On the other hand, when reproducing, a laser beam 99 is emitted through the objective lens 50b of the other apparatus for reproducing. The laser beam 99 is converged selectively on a raised portion "A" of the second microscopic pattern 21Y in the information recording medium 1 with respect to the horizontal direction.

Further, with respect to the vertical direction, the laser beam 99 is converged selectively on the second recording layer 12Y through the first light transmitting layer 11X, the first recording layer 12X, and the second light transmitting layer 11Y. A record mark "M" is recorded selectively on the second recording layer 12Y corresponding to a raised portion "A". Consequently, a record mark "M" can be read out from a portion where the laser beam 99 is converged on.

According to the embodiment one of the present invention, as mentioned above, the information recording medium 1 is constituted such that the first microscopic pattern 20X and the second microscopic pattern 20Y is formed to be P≦λ/NA, wherein "P" is the pitch between adjoining two recessed portions "B" or raised portions "A", "λ" is a wavelength of a laser beam for recording or reproducing, and "NA" is a numerical aperture of an objective lens.

Further, recording is conducted to either one of a raised portion "A" and a recessed portion "B". Consequently, an information recording medium recorded in high density can be obtained as well as reducing a cross erase phenomenon.

In addition thereto, according to the embodiment one of the present invention, an information recording medium that is low in error rate and excellent in rewriting characteristic can be obtained by recording selectively on a raised portion "A".

A method of embedding an auxiliary information such as address and a reference clock, which is a second object of the information recording medium 1 according to the embodiment one of the present invention, is explained hereafter. The present invention is explained by specifying an embodiment in which recording is conducted on a raised portion "A" hereupon.

In a recording type information recording medium, it is required that recording is accurately conducted in an arbitrary position, which is requested by a user. In the case of an optical disc according to the prior art, a pit is disposed across a constitution that is arranged with a recessed portion "B" and a raised portion "A" alternatively by cutting the constitution at each certain macroscopic interval (each interval of the order of milli) and the pit is defined as an address information. Consequently, a loss of capacity increases drastically.

Further, in case of a multi-layered transmittable type information recording medium, as mentioned above, there existed a problem such that luminous energy for recording becomes uneven due to an address pit disposed in the first recording layer 12X when recording in the second recording layer 12Y.

Furthermore, in the case of the recording type information recording medium, a relative speed between an information recording medium and an apparatus for recording, that is, a recording speed affects a recording density and besides, signal quality. Therefore, a reference clock for designating a recording speed correctly is essential. In case that a reference clock is provided in an apparatus for recording, a relative speed can hardly be adjusted even though the relative speed is shifted by various conditions. Consequently, it is desirable for the reference clock to be provided inside an information recording medium. Particularly, the information recording medium 1 is in disciform and a linear velocity changes every moment in case of a recording mode by the CLV (Constant Linear Velocity) recording method. Therefore, it is essential for the reference clock to be provided inside the information recording medium 1. A reference clock can be constituted by a pit array that is called a clock pit. However, there existed another problem such that luminous energy for recording becomes uneven due to a pit array disposed in the first recording layer 12X by a reason similar to the reason mentioned above when recording in the second recording layer 12Y.

In order to solve the problems and satisfy the requirements mentioned above, there provided a method for embedding an auxiliary information and a reference clock in the information recording medium 1. An auxiliary information is a data array that is used subsidiarily when recording in the first recording layer 12X and the second recording layer 12Y of the information recording medium 1 by a user. Actually, an auxiliary information is composed of at least an address information. An address information exhibits an address that changes continuously by a position of the information recording medium 1 and is data selected out from information such as absolute address allocated to the whole area of the information recording medium 1, relative address allocated to a partial area, track number, sector number, frame number, field number, and time information.

These address data sequentially change in the order of increment or decrement in accordance with progress of a recording track such as a raised portion "A", for example. Consequently, the same address data never exist in the plane of the first recording layer 12X or the second recording layer 12Y.

Further, it is desirable for an address to be allocated such that the same address data common to the first recording layer 12X and the second recording layer 12Y never exist. Because there is a possibility of reproducing or recording a recording layer not intended if the same address data exist in different information surfaces when reproducing or recording by using an apparatus for reproducing or recording.

It is most desirable that address data are allocated so as to continue sequentially throughout the first recording layer 12X and the second recording layer 12Y. For example, in case that the information recording medium 1 is in disciform, address data of "00001" through "20001" are sequentially allocated to the first recording layer 12X of the information recording medium 1 in such a manner as from an innermost circumference toward an outermost circumference, and another address data of "20002" through "40002" are sequentially allocated to the second recording layer 12Y in such a manner as from an innermost circumference toward an outermost circumference. Consequently, it is apparent that address data allocated to the first recording layer 12X and the second recording layer 12Y continue, so that managing address data in an apparatus for reproducing or recording is simplified.

With respect to a most desirable example for allocating address data, the address data of "00001" through "20001" are sequentially allocated to the first recording layer 12X of the information recording medium 1 in such a manner as from an innermost circumference toward an outermost circumference, and the other address data of "20002" through "40002" are sequentially allocated to the second recording layer 12Y in such a manner as from an outermost circumference toward an innermost circumference. In other words, the address data allocated to the first recording layer 12X continue sequentially to the other address data allocated to the second recording layer 12Y.

Further, these address data are connected at a point in the outermost circumference of the information recording medium 1. That is to say, when reproducing or recording continuously over the information surfaces of the first recording layer 12X and the second recording layer 12Y, a connecting point is just one, so that the information surfaces can be changed over in an extremely short period of time.

Furthermore, circuitry of an apparatus for reproducing or recording can be simplified.

It is acceptable that an address information can be accompanied by a specific information, which is composed of a small amount of data. A specific information is common data in each plain of the first recording layer 12X and the second recording layer 12Y. Such a specific information is at least selected out from, for example, type of an information recording medium, size of the information recording medium, estimated recording capacity of the information recording medium, estimated recording linear density of the information recording medium, estimated recording linear velocity of the information recording medium, track pitch of the information recording medium, code for exhibiting a number of recording layers of the information recording medium whether it is one or two, code exhibiting a recording layer being reproduced whether it is a first recording layer 12X or a second recording layer 12Y, recording strategic information such as peak power, bottom power, erase power, and pulse period, reproduction power information, manufacturer's information, production number, lot number or batch number, control number, copyright related information, key for ciphering, key for deciphering, ciphered data, recording permission code, recording refusal code, reproducing permission code, and reproducing refusal code.

Further, an auxiliary information is such information that, for example, is described by the decimal number system or the hexadecimal notation and converted into the binary number system such as a BCD (Binary-Coded Decimal) code and a gray code.

Furthermore, the auxiliary information can accompany an error correcting code in order to prevent a data error.

In addition, a reference clock is provided for representing a pause of a certain period of time on a signal. Actually, a reference clock is composed of a single frequency that will be mentioned later.

Figure 6:
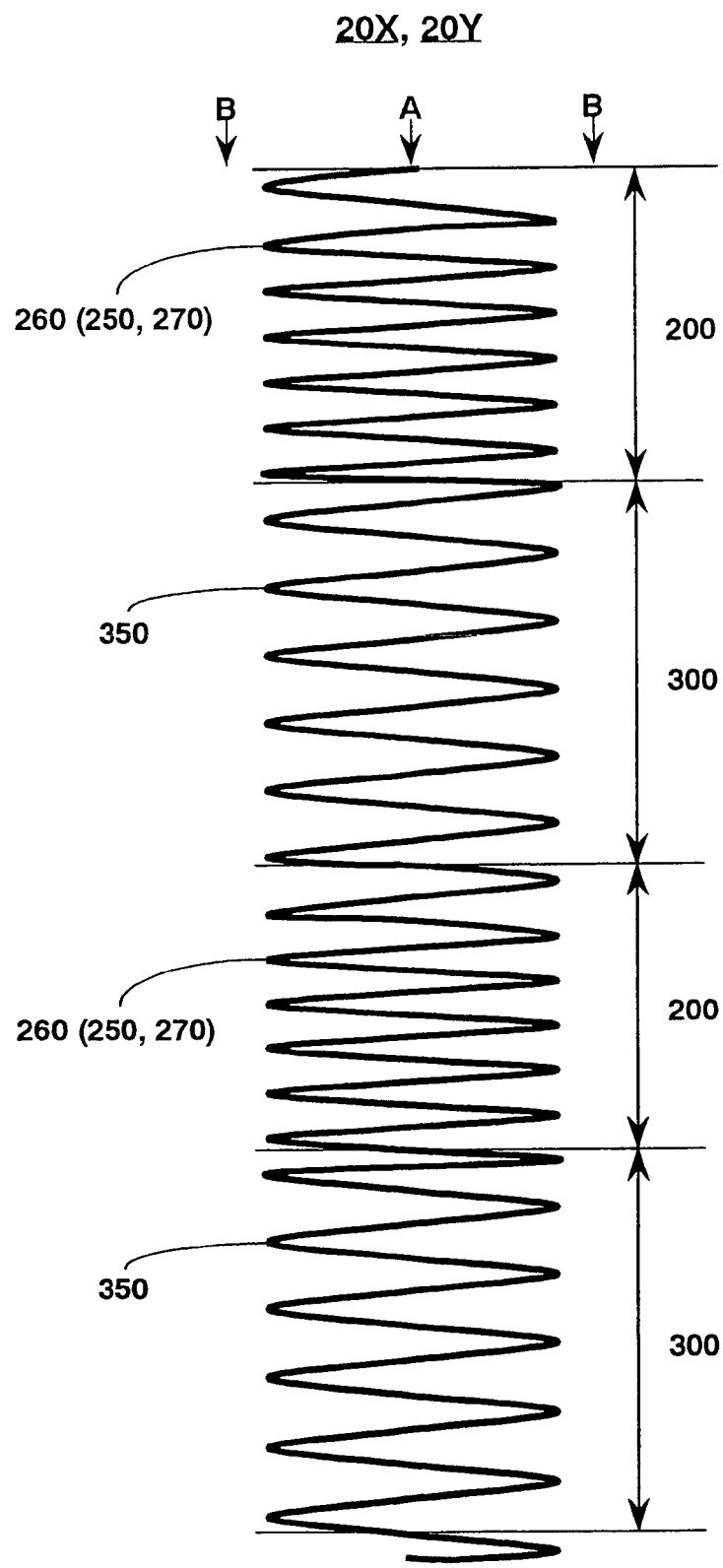
FIG. 6 is an enlarged plan view showing an auxiliary information area and a reference clock area in the information recording medium according to the embodiment one of the present invention.

FIG. 6 is a plan view showing a structure of the first microscopic pattern 20X and the second microscopic pattern 20Y, which are embedded with an auxiliary information and a reference clock, of the information recording medium 1 according to the embodiment one of the present invention. Each of the first microscopic pattern 20X and the second microscopic pattern 20Y is composed of a raised portion "A" and a recessed portion "B" respectively.

Further, the raised portion "A" and the recessed portion "B" is formed by being wobbled. In other words, both an auxiliary information and a reference clock are recorded by a wobbling groove. In FIG. 6, the drawing is illustrated such that an auxiliary information and a reference clock are recorded by wobbling a raised portion "A".

Furthermore, both the first microscopic pattern 20X and the second microscopic pattern 20Y are divided into at least two areas macroscopically, and composed of at least an auxiliary information area 200 and a reference clock area 300. As mentioned above, each of the auxiliary information area 200 and the reference clock area 300 is wobbled respectively. By a wobbling groove, an auxiliary information is recorded in the auxiliary information area 200 and a reference clock is recorded in the reference clock area 300. These areas are continuously formed without being interrupted, so that continuous reproduction can be conducted. FIG. 6 is illustrated such that only two areas of the auxiliary information area 200 and the reference clock area 300 are allocated. However, this alternative allocation of the auxiliary information area 200 and the reference clock area 300 is repeated and constitutes whole area of the first microscopic pattern 20X and the second microscopic pattern 20Y of the information recording medium 1.

Moreover, in FIG. 5, both of the auxiliary information area 200 and the reference clock area 300 are formed on a raised portion "A" as a most preferable example. However, it is essential that one of the auxiliary information area 200 and the reference clock area 300 is formed on a recessed portion "B" if the other one of the auxiliary information area 200 and the reference clock area 300 is formed on a recessed portion "B".

As mentioned above, by forming the auxiliary information area 200 and the reference clock area 300 on the same shaped portion, that is, a raised portion "A" or a recessed portion "B", an auxiliary information and a reference clock can be reproduced continuously.

The auxiliary information 200 is composed of a waveform that is modulated digital data hereupon. Actually, the waveform is composed of any one of an amplitude-shift keying modulation wave 250 (250, 251, and 252), a frequency-shift keying modulation wave 260 (260, 261, and 262) and a phase-shift keying modulation wave 270 (270, 271, and 272) or any one of them that are transformed. FIG. 6 exemplifies particularly that the auxiliary information 200 is the frequency-shift keying modulation waveform 260 (260, 261, and 262).

Although these modulation methods will be detailed later, in the amplitude-shift keying modulation method, digital data of an auxiliary information are expressed such as "1" or "0" by a fundamental wave whether or not the fundamental wave is existed. In the case of the frequency-shift keying modulation method, digital data of an auxiliary information are expressed such as "1" or "0" by a frequency of a fundamental wave whether the frequency is higher or lower. In the case of the phase-shift keying modulation method, digital data of an auxiliary information are expressed such as "1" or "0" by a difference of phase angular of a fundamental wave. It is possible to record an auxiliary information such as an address more efficiently and to allocate the reference clock area 200 relatively longer by adopting these modulation methods. Being able to allocate the reference clock area 200 longer enables to detect a reference clock for a long period of time when recording the information recording medium 1, so that stable recording can be conducted.

A fundamental wave of these modulation methods hereupon can be selected out from a sinusoidal wave (or cosine wave), a triangular wave, and a rectangular wave. In case that a sinusoidal wave (cosine wave) is selected out from them, a harmonic component can be minimized when reproducing, and resulted in improving power efficiency and suppressing a jitter. Consequently, a sinusoidal wave (cosine wave) is suitable for a fundamental wave.

In addition thereto, a signal waveform formed by any of these modulation methods is recorded geometrically as a wobbling sidewall of raised portion "A".

On the other hand, the reference clock area 300 is composed of a single-frequency wave 350 that is continuously repeated. Since the frequency is single, it is possible to generate a frequency in response to a number of revolutions by making the information recording medium 1 move relatively while reproducing. Consequently, a reference clock can be produced. The reference clock can be used for revolution control when recording.

Further, a fundamental wave having a single frequency is composed of any one of a sinusoidal wave (cosine wave), a triangular wave, and a rectangular wave. In case that a sinusoidal wave (cosine wave) is selected out from them, a harmonic component can be minimized when reproducing, and resulted in improving power efficiency and suppressing a jitter. Consequently, a sinusoidal wave (cosine wave) is suitable for a fundamental wave.

In addition thereto, a signal waveform formed by any of these modulation methods is recorded geometrically as a wobbling sidewall of raised portion "A".

As mentioned above, the first microscopic pattern 20X and the second microscopic pattern 20Y according to the present invention is composed of at least the auxiliary information area 200 and the reference clock area 300. An auxiliary information and a reference clock are recorded continuously by a wobbling groove without interruption. These auxiliary information and reference clock recorded on a sidewall of the raised portion "A" in a shape of wobbling are read out from a differential signal by using a well-known 2-division or 4-division detector. Revolution control can be conducted by the read-out reference clock while recording, and further an information can be written in or erased from a predetermined address by extracting an address information from an auxiliary signal.

In the information recording medium 1 according to the present invention, as mentioned above, an auxiliary information such as an address is recorded in a shape of wobbling groove, so that an additional pit area is not required in comparison with a conventional information recording medium. Consequently, it is not necessary for the information recording medium 1 to reduce recording capacity for an additional pit area.

Further, in case of a transmittable type multi-layer information recording medium, a pit area is not provided, so that luminous energy is never reduced. Consequently, the second recording layer 12Y can be recorded by uniform luminous energy through the first recording layer 12X.

It is desirable for reproduction that the auxiliary information area 200 and the reference clock area 300 are in uniform length with each other and allocated alternately. In case that a length is not uniform with each other, it is not predicted that an auxiliary information such as an address or a reference clock can be detected at which timing while reproducing. Consequently, confusions may occur. On the contrary, in case that each length is uniform and they are allocated alternately, arrival of a succeeding signal can be easily predicted once reproduction is enabled. Accordingly, a timing of obtaining an auxiliary information and a reference clock is predicted by a logic circuit and the auxiliary information and the reference clock can be reproduced in less error.

Further, the reference clock area 300 is an important signal for controlling a number of revolutions when reproducing the information recording medium 1, so that the reference clock area 300 is desirable to be formed as long as possible. Actually, it is necessary for a ratio of a length of the reference clock area 300 to a total length of the auxiliary information area 200 and the reference clock area 300 to be more than 50%, desirably more than 60%. If the ratio is less than the value mentioned above, a reference clock can only be obtained for a short period of time. Consequently, revolution control is conducted intermittently and a reproduction operation becomes unstable. In a worst case, mismatching occurs in a logic circuit for reproducing and the operation is resulted in interrupting the reproduction.

It is acceptable that a shape of fundamental waveform and an amount of amplitude of these two areas are different from each other. However, they are desirable to be the same in view of simplification and stabilization of a recording circuit and a reproducing circuit.

With respect to a frequency, in case that the auxiliary information area 200 is formed with the amplitude-shift keying modulation wave 250 or the phase-shift keying modulation wave 270, it is acceptable that a frequency of the amplitude-shift keying modulation wave 250 or the phase-shift keying modulation wave 270 is different from a frequency of the single-frequency wave 350 of the reference clock area 300. However, in case of the same frequency, the recording circuit and the reproducing circuit can be simplified drastically. Consequently, the same frequency is desirable. Their frequencies are desirable to be at least related to "integral multiples" or "one over an integer".

Further, in case that an auxiliary information of the auxiliary information area 200 is formed by the frequency-shift keying modulation wave 260, it is acceptable that two frequencies constituting the frequency-shift keying modulation wave 260 are different from a frequency of the single-frequency wave 350 of the reference clock area 300. However, in case that one of the two frequencies constituting the frequency-shift keying modulation wave 260 is the same as the frequency of the single-frequency wave 350, a physical length utilized for extracting a clock can be extended slightly. Consequently, the same frequency is desirable. These three frequencies are desirable to be related to "integral multiples" or "one over an integer" respectively in view of simplifying a recording circuit and a reproducing circuit.

Furthermore, it is also acceptable that a start-bit signal, a stop-bit signal and a sync signal is recorded as a wobbling groove at the boundary between the auxiliary information area 200 and the reference clock area 300 in order to clarify the division of them. With respect to such a signal, a single-frequency wave having a predetermined period and a predetermined frequency can be used. However, the predetermined frequency is essential to be at least different from the frequency of the single-frequency wave 350 that constitutes the reference clock area 300. It is most desirable that the predetermined frequency is different from any frequency constituting the single-frequency wave 350, the amplitude-shift keying modulation wave 250, the frequency-shift keying modulation wave 260, or the phase-shift keying modulation wave 270.

As mentioned above, the information recording medium 1 according to the embodiment one of the present invention can be in any shape such as disciform, card and tape. Consequently, the first microscopic pattern 20X and the second microscopic pattern 20Y that is composed of approximately parallel grooves can also be in any shape such as spiral, coaxial and line. In case that the information recording medium 1 is in disciform and the first microscopic pattern 20X and the second microscopic pattern 20Y is recorded spirally, the raised portion "A" and the recessed portion "B" is recorded by a recording method such as the constant angular velocity (CAV), the constant linear velocity (CLV), the zone constant angular velocity (ZCAV) and the zone constant linear velocity (ZCLV) recording methods, wherein the ZCAV and the ZCLV recording methods are a method that forms zones, which vary by radius, and conducts a different controlling system independent of each zone. In case that the information recording medium 1 is recorded by the CLV recording method, for example, a same linear velocity is maintained in the whole area of the information recording medium 1.

Further, in case of recording by the ZCAV recording method, the CLV recording method is conducted in one zone and a controlling system similar to the CAV recording method is conducted in the information recording medium 1 totally.

Furthermore, in case of recording by the ZCLV recording method, the CAV recording method is conducted in one zone and a controlling system similar to the CAV recording method is conducted in the information recording medium 1 totally.

Figure 7:
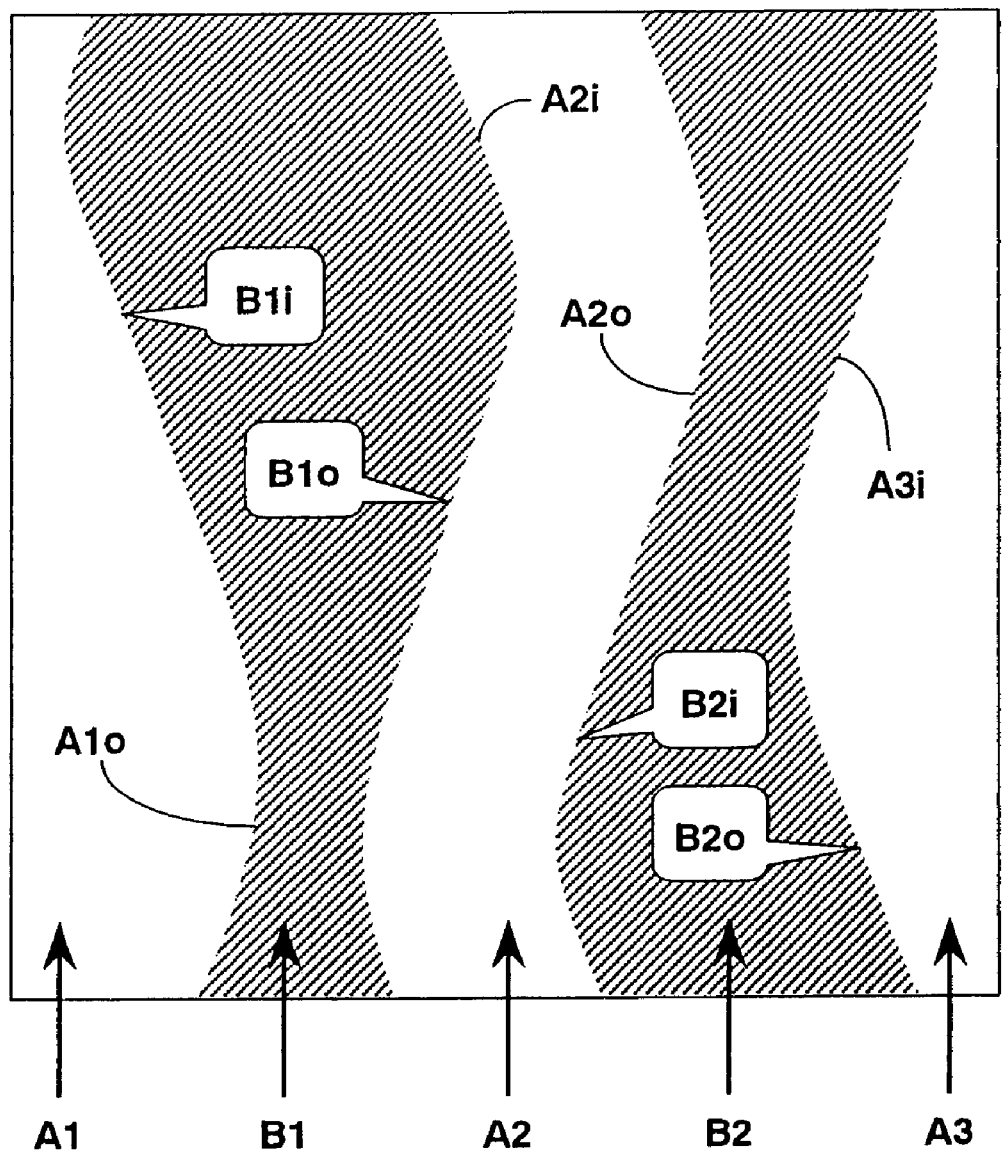
FIG. 7 is an enlarged plan view of the information recording medium according to the embodiment one of the present invention when information is recorded in the information recording medium through the CLV (Constant Linear Velocity) recording method.

FIG. 7 is an enlarged plan view of the reference clock area 300 in the information recording medium 1 on the basis of recording on a raised portion "A" through the CLV recording method. In case that recording is conducted on a portion corresponding to a raised portion "A" of the first recording layer 12X and the second recording layer 12Y, an auxiliary information or a reference clock is essential to be extracted from the raised portion "A". Consequently, a single-frequency wave 350 to be a reference clock must be recorded on the raised portion "A". In view of that recording light scan along a centerline not shown of the raised portion "A", both sidewalls of the raised portion "A" are essential to be parallel to each other. In other words, three raised portions "A1" through "A3" (hereinafter generically referred to as raised portion "A") and two recessed portions "B1" and "B2" (hereinafter generically referred to as recessed portion "B") are illustrated in FIG. 7.

Further, in FIG. 7, a sidewall of the inner circumferential side of the raised portion "A2" or "A3" is shown as "A2$i$" or "A3$i$" (hereinafter generically referred to as inner sidewall "Ai") and another sidewall of the outer circumferential side of the raised portion "A1" or "A2" is shown as "A1$o$" or "A2$o$" (hereinafter generically referred to as outer sidewall "Ao").

Further, a side wall of the outer circumferential side of the recessed portion "B1" or "B2" is shown as "B1$i$" or "B2$i$" (hereinafter generically referred to as inner sidewall "Bi") and another sidewall of the outer circumferential side of the recessed portion "B1" and "B2" is shown as "B1$o$" or "B2$o$" (hereinafter generically referred to as outer sidewall "Bo"). The inner sidewall "Ai" of the raised portion "A" and the outer sidewall "Bo" of the recessed portion "B" represents the same wall, and the outer sidewall "Ao" of the raised portion "A" and the inner sidewall "Bi" of the recessed portion "B" represents the same wall hereupon.

Furthermore, a reference clock is recorded on the raised portion "A" as a sinusoidal-wave signal through the CLV recording method. Therefore, as shown in FIG. 7, three raised portions "A1" through "A3" are not parallel to each other in almost all cases. However, in order to extract a sinusoidal-wave signal accurately with avoiding interference from both sidewalls caused by a phase shift of each sidewall, the inner sidewall "Ai" and the outer sidewall "Ao" of the raised portion "A" are essential to be always formed in parallel to each other. From a point of view contrary to this, it is represented such that the inner sidewall "Bi" and the outer sidewall "Bo" constituting the recessed portion "B", which is the other portion than the raised portion "A", are never in parallel to each other.

Figure 8:
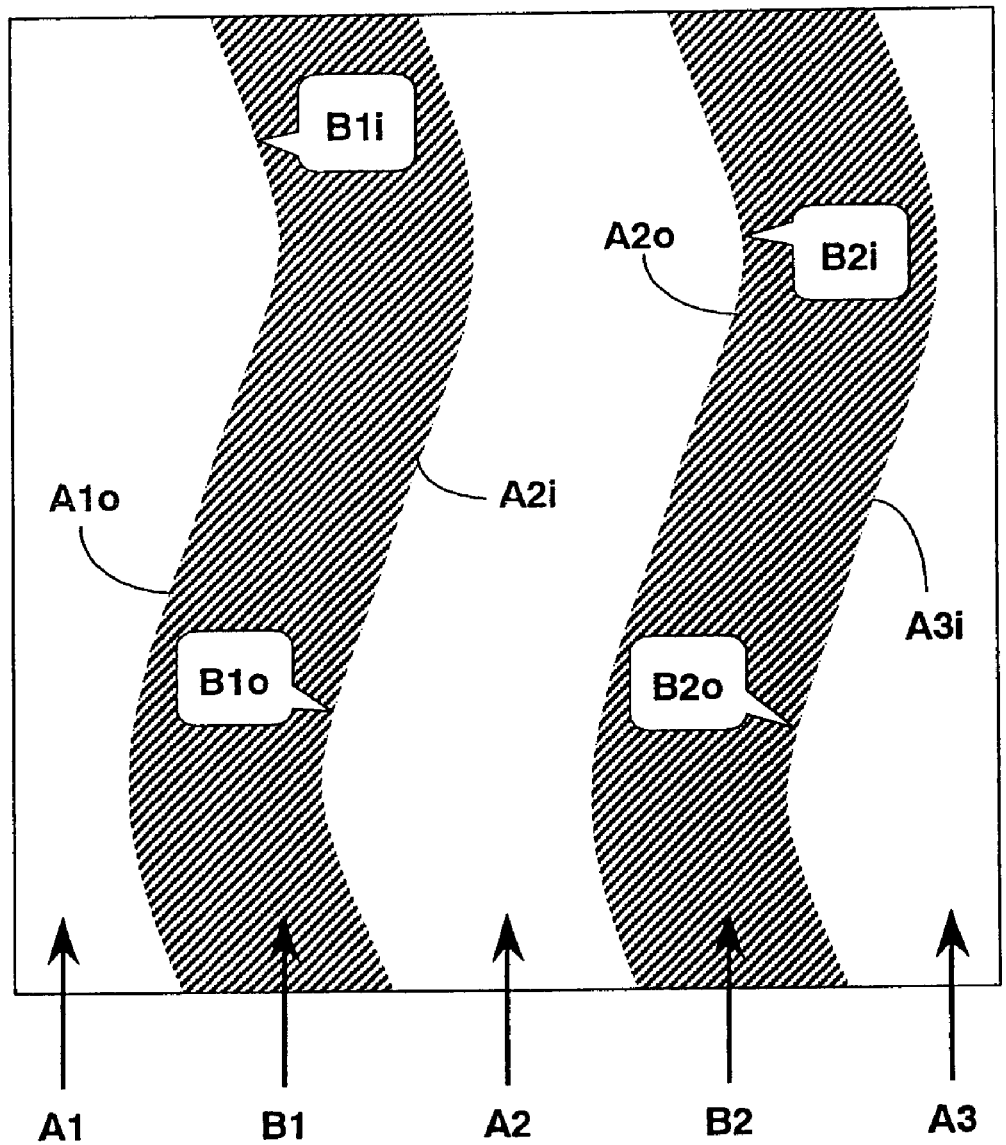
FIG. 8 is an enlarged plan view of the information recording medium according to the embodiment one of the present invention when information is recorded on the information recording medium through the CAV (Constant Angular Velocity) recording method.

FIG. 8 is an enlarged plan view of the reference clock area 300 in the information recording medium 1 on the basis of recording on a raised portion "A" through the CAV recording method. In case that the information recording medium 1 is recorded by the CAV recording method, a same angular velocity is maintained in a whole area of the information recording medium 1. By this CAV recording method, the wobbling raised portion "A" and the recessed portion "B" can always be in parallel to each other completely, so that a crosstalk amount between adjoining grooves becomes constant at all times. Consequently, ideal reproduction that can suppress output fluctuation of wobbling frequency and fluctuation in a time axis direction can be conducted. In other words, as shown in FIG. 8, each raised portion "A" becomes in parallel to each other and at the same time each recessed portion "B" also becomes in parallel to each other due to the characteristic of angular velocity. Three raised portions "A1" through "A3" (hereinafter generically referred to as raised portion "A") and two recessed portions "B1" and "B2" (hereinafter generically referred to as recessed portion "B") are illustrated in FIG. 8. In FIG. 8, a sidewall of the inner circumferential side of the raised portion "A2" or "A3" is shown as "A2$i$" or "A3$i$" (hereinafter generically referred to as inner sidewall "Ai") and another sidewall of the outer circumferential side of the raised portion "A1" or "A2" is shown as "A1$o$" or "A2$o$" (hereinafter generically referred to as outer sidewall "Ao").

Further, a side wall of the outer circumferential side of the recessed portion "B1" or "B2" is shown as "B1$i$" or "B2$i$" (hereinafter generically referred to as inner sidewall "Bi") and another sidewall of the outer circumferential side of the recessed portion "B1" or "B2" is shown as "B1$o$" or "B2$o$" (hereinafter generically referred to as outer sidewall "Bo"). The inner sidewall "Ai" of the raised portion "A" and the outer sidewall "Bo" of the recessed portion "B" represents the same wall, and the outer sidewall "Ao" of the raised portion "A" and the inner sidewall "Bi" of the recessed portion "B" represents the same wall hereupon.

As mentioned above, in case of recording on a raised portion "A" of the first recording layer 12X or the second recording layer 12Y, for example, a clock is essential to be extracted from the raised portion "A". Therefore, the single-frequency wave 350 to be a reference clock is recorded on the raised portion "A". The clock is recorded by the CAV recording method, so that the three raised portions "A1" through "A3" are completely in parallel to each other as shown in FIG. 8. At the same time, the recessed portion "B" that is the rest portion other than the raised portion "A" is also in parallel to each other perfectly. In other words, in order to extract a sinusoidal-wave signal accurately, the inner sidewall "Ai" and the outer sidewall "Ao" of the raised portion "A" are essential to be always formed in parallel to each other. However, in the case of recording by the CAV recording method, the inner sidewall "Bi" and the outer sidewall "Bo" of the recessed portion "B" is also formed to be in parallel to each other.

In either recording method of the CLV and the CAV, both the sidewalls constituting the raised portion "A", that is, the inner sidewall "Ai" and the outer sidewall "Ao" of the raised portion "A" are essential to be in parallel to each other.

Further, particularly in the case of recording by the CAV recording method, not only the raised portion "A" but also both the sidewalls "Bi" and "Bo" constituting the recessed portion "B" are in parallel to each other. In other words, the inner sidewall "Ai" and the outer sidewall "Ao" of the raised portion "A" and the inner sidewall "Bi" and the outer sidewall "Bo" of the recessed portion "B" are all in parallel to each other.

The shape of the sidewall of the reference clock area 300 in the first microscopic pattern 20X and the second microscopic pattern 20Y recorded spirally in the information recording medium 1 in disciform is mentioned above. This situation is exactly the same as for the auxiliary information area 200 due to a similar reason for the reference clock area 300. In other words, in either recording method of the CLV and the CAV, both the sidewalls constituting the raised portion "A", that is, both the inner sidewall "Ai" and the outer sidewall "Ao" of the raised portion "A" are essential to be in parallel to each other. In the information recording medium 1 according to the present invention, the auxiliary information area 200 and the reference clock area 300 is continuously formed without interruption, so that both sidewalls constituting the raised portion "A", that is, the inner sidewall "Ai" and the outer sidewall "Ao" of the raised portion "A" are formed in parallel to each other in any area on the information recording medium 1.

While referring to FIG. 9, a wobbling amount A of a wobbling groove that is formed in the information recording medium 1 according to the embodiment one of the present invention is explained next.

Figure 9:
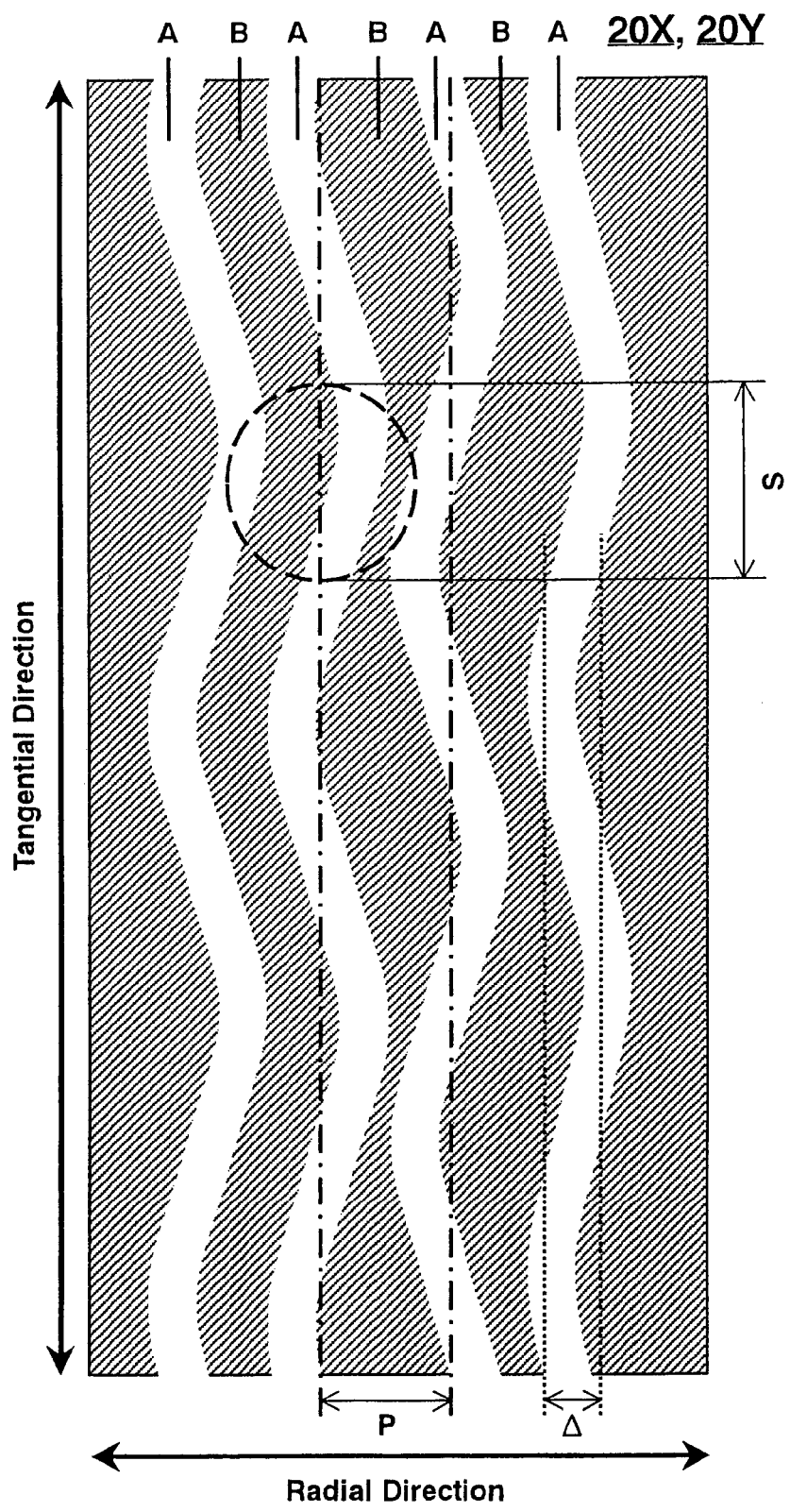
FIG. 9 is an enlarged plan view of the information recording medium in disciform according to the embodiment one of the present invention when information is recorded in the information recording medium through the CLV recording method.

FIG. 9 is an enlarged plan view of the first microscopic pattern 20X and the second microscopic pattern 20Y formed by the CLV recording method in the information recording medium 1 according to the embodiment one of the present invention. The first microscopic pattern 20X and the second microscopic pattern 20Y is composed of the auxiliary information area 200 and the reference clock area 300, which are formed with a fundamental wave based on the sinusoidal wave or the cosine wave and continue without interruption. In FIG. 9, a centerline of wobbling groove is shown by a chain line. A distance between two chain lines, which are adjacent to each other, is defined as a pitch "P".

Further, the information recording medium 1 shown in FIG. 9 is assumed to be recorded on a raised portion "A" and a spot of reproducing light beam or a recording light beam that focuses on the raised portion "A" is shown by a circle in doted line. The spot diameter is exhibited by "S", that is equal to "λ/NA", as mentioned above.

Furthermore, the raised portion "A" wobbles and its wobbling width Δ in peak to peak value is shown by two doted lines.

Moreover, in case that the information recording medium 1 is in disciform, a wobbling direction corresponds to a radial direction of the disc-shaped information recording medium 1.

An apparatus for reproducing the information recording medium 1 can extract a wobbling amplitude of the auxiliary information area 200 and the reference clock area 300 as a signal through a reproducing light spot without interruption. In other words, by producing a differential signal from reflected light of the reproducing light spot, a single-frequency wave 350, a amplitude-shift keying modulation wave 250, a frequency-shift keying modulation wave 260, or a phase-shift keying modulation wave 270, which is based on a sinusoidal wave, can be directly extracted as a signal of similar figure. More accurately, a track direction of wobbling groove is transformed into a time axis direction, and further a radial direction of the wobbling groove is transformed into an amplitude direction of reproduced signal, and then the single-frequency wave 350, the amplitude-shift keying modulation wave 250, the frequency-shift keying modulation wave 260, or the phase-shift keying modulation wave 270 is reproduced as the signal of similar figure.

According to another aspect of the present invention, the information recording medium 1 of the embodiment one is formed with a wobbling groove of which wobbling width Δ is within a range of Δ<P. In case that the information recording medium 1 is manufactured as mentioned above, adjacent tracks, that is, adjacent raised portions "A", for example, do not contact with each other physically, so that crosstalk caused by recording can be avoided.

Further, the inventors of the present invention made an experiment where a phase change material is used for the first and second recording layers 12X and 12Y and recording is conducted by difference of reflectivity, phase difference, or both of them. In other words, the inventors tried to reproduce an auxiliary information through a differential signal detecting method from the information recording medium 1 that is recorded with random data by conducting a phase change recording method. As a result of the experiment, a limit of enabling detection of an auxiliary information is $0.01S \leqq \Delta$. In case of a groove of which wobbling width Δ is formed to be less than 0.01S, random data caused by the phase change recording method are superimposed as an extreme on an auxiliary information as a noise and an error rate of the auxiliary information drastically increases.

On the contrary, the wobbling width Δ is set to the limitation of $0.01S \leqq \Delta$, an auxiliary information can be reproduced sufficiently even in a low reflectivity condition such as an amorphous state due to the phase change recording method. However, in case of $0.15S < \Delta$, a jitter in time axis direction occurs in an auxiliary information signal and a reference clock signal due to an affection of reproduction crosstalk caused by an adjacent groove, particularly, stability of the reference clock signal is deteriorated.

Accordingly, a relation between the wobbling width Δ and the pitch P shall be Δ<P, particularly, conditions satisfying relations $\Delta < P$ and $0.01S \leqq \Delta \leqq 0.15S$ are most suitable for forming a wobbling groove.

Figure 10:
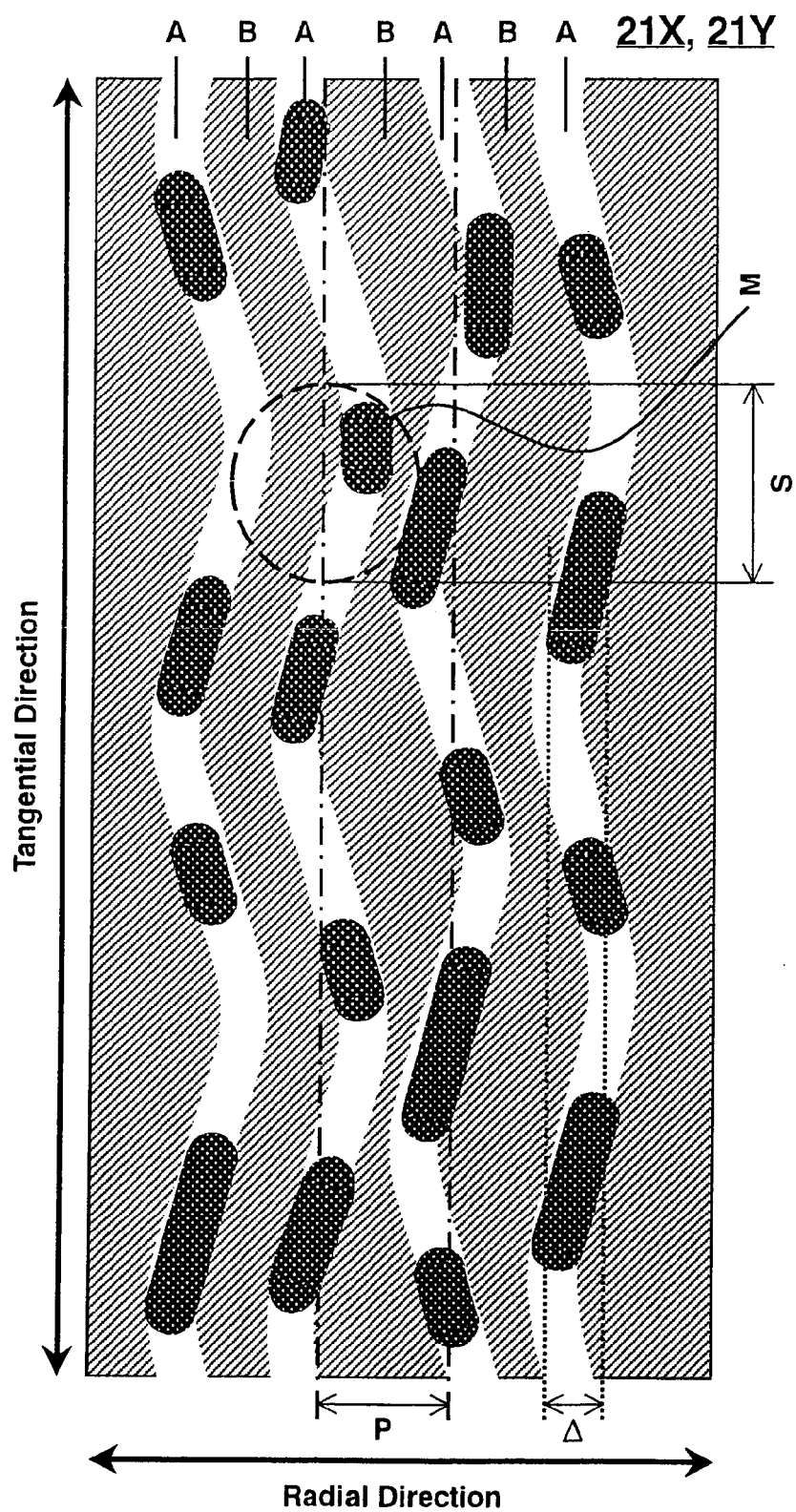
FIG. 10 is an enlarged plan view of the information recording medium in disciform according to the embodiment one of the present invention when information is recorded on the information recording medium through the CLV recording method and further the information is recorded on a raised portion.

FIG. 10 is an enlarged plan view of the first microscopic pattern 20X and the second microscopic pattern 20Y of the information recording medium 1, wherein recording is conducted on the first recording layer 12X and the second recording layer 12Y of the information recording medium 1 shown in FIG. 9. In FIG. 10, a record mark M is recorded on the raised portion "A" that is wobbled. The record mark M represents whether a modulated signal is ON or OFF. There provided various lengths of record mark M as it will be explained later. As mentioned above, the record mark M is formed on the first recording layer 12X and the second recording layer 12Y. In case that the first recording layer 12X and the second recording layer 12Y is formed by a phase change material, a record mark M is recorded by reflectivity and phase difference, difference of reflectivity, or phase difference.

A structure of how a shape of wobbling groove is reflected to a differential signal is complemented hereupon.

Figure 11:
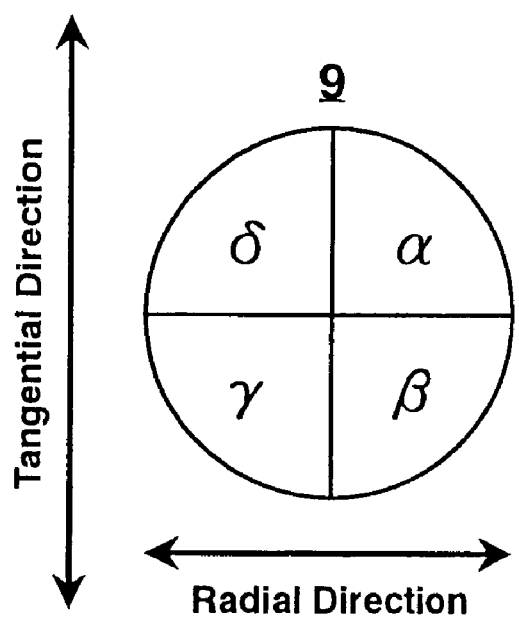
FIG. 11 is an enlarged plan view of a photo-detector mounted on an apparatus for reproducing an information recording medium according to the present invention showing a state of dividing the photo-detector into four.

FIG. 11 is an enlarged plan view of a photo-detector 9 that collects reproducing light, which is irradiated on the information recording medium 1 and reflected. In case that the photo-detector 9 is a 4-division detector, as shown in FIG. 11, the detector 9 is divided into four elements in accordance with the radial direction and the tangential direction of the information recording medium 1. A differential signal can be produced by subtracting each sum signal in the tangential direction. More accurately, with defining that the four elements are α, β, γ, and δ respectively, and further defining that electric currents, which are obtained from each of the elements α, β, γ, and δ when they receive light, are Iα, Iβ, Iγ and Iδ respectively, the differential signal can be represented by an equation "(Iα+Iβ)−(Iγ+Iδ)". In other words, a signal to be obtained is a differential signal in the radial direction. When an apparatus for reproducing the information recording medium 1 traces a center of groove, that is, the center of the chain line shown in FIGS. 9 and 10, the differential signal is in a form of obtaining an output difference in the radial direction with respect to the centerline. Consequently, a wobbling shape can be reproduced as a signal that reflects the wobbling shape.

The total constitution of the information recording medium 1 according to the embodiment one of the present invention is detailed above. The information recording medium 1 is, as mentioned above, formed with an auxiliary information including an address as a wobbling groove, so that a specific pit array is not necessary and luminous energy passing through the first recording layer 12X becomes constant in the whole plane of the first recording layer 12X. Consequently, recording or reproducing the second recording layer 12Y through the first recording layer 12X can be conducted by constant luminous energy, so that stable recording and reproducing can be realized.

Further, the reference clock area 300 composed of a reference clock by a wobbling groove is allocated in succession to the auxiliary information area 200 that handles an auxiliary information continuously, so that a clock pit is not necessary. Consequently, recording or reproducing under constant luminous energy can be realized as well as conducting stable recording and reproducing at an optimum number of revolutions.

Furthermore, it is acceptable that the auxiliary information area 200 is conducted with not only recording on a sidewall by selecting one modulation wave out of the amplitude-shift keying modulation wave 250, the frequency-shift keying modulation wave 260, and the phase-shift keying modulation wave 270 but also time-division recording on each sidewall in different areas by selecting two or three modulation methods.

Moreover, it is also acceptable that the auxiliary information area 200 is conducted with multiplex recording on a sidewall by selecting two modulation methods and superimposing two modulation waves on the same area.

A single-frequency wave can be superimposed on the amplitude-shift keying modulation wave 250, the frequency-shift keying modulation wave 260, or the phase-shift keying modulation wave 270. In other words, with respect to the amplitude-shift keying modulation wave 250 and the frequency-shift keying modulation wave 260, a wave having a same frequency as a frequency that constitutes those modulation waves or a different frequency from frequencies of those modulation waves can be superimposed and recorded.

Particularly, with respect to the frequency-shift keying modulation wave 260, a wave having either a higher frequency or a lower frequency of the frequency-shift keying modulation wave 260 can be superimposed on the frequency-shift keying modulation wave 260. Similarly, a wave having a frequency of "an integer multiple" or "one over an integer" of either a higher frequency section or lower frequency section of the frequency-shift keying modulation wave 260 can be superimposed on the frequency-shift keying modulation wave 260.

Further, with respect to the phase-shift keying modulation wave 270, a wave having a frequency of "an integer multiple" or "one over an integer" of the frequency constituting the phase-shift keying modulation wave 270 can be superimposed on the phase-shift keying modulation wave 270.

In any case, by using a well-known band pass filter or phase detector, it is possible to separate a single-frequency wave and any of the amplitude-shift keying modulation wave 250, the frequency-shift keying modulation wave 260, and the phase-shift keying modulation wave 270 from the superimposed wave. For example, an experience is conducted with respect to the phase-shift keying modulation wave 270. It is confirmed that a single-frequency wave and a phase-shift keying modulation wave can be separated as far as an amplitude ratio of the phase-shift keying modulation wave to the single-frequency wave is within a predetermined range of 1:5 to 5:1 while superimposing the single-frequency wave on the phase-shift keying modulation wave. In other words, in case that an information recording medium is manufactured as a trial by setting the amplitude ratio for out of the predetermined range, one wave having larger amplitude can be reproduced. However, the other wave having smaller amplitude can not be reproduced due to an excessively low signal to noise ratio (S/N).

In case of constituting that a single-frequency wave to be superimposed and the single-frequency wave 350 of the reference clock area 300 is the same frequency, a reference clock can also be extracted form the auxiliary information area 200, so that it is more suitable for recording by superimposing. That is to say, since a reference clock continues substantially although the auxiliary information area 200 is formed over a long distance, extremely stable recording can be conducted.

It is acceptable that an auxiliary information to be formed on a sidewall of a raised portion "A" is highly discomposed and recorded with distributed. By combining with dummy data "101", for example, distributed recording is one recording method such that an auxiliary information is recorded as a data array such as "101X", wherein X is either "0" or "1", and the data array is allocated in each predetermined interval.

Figure 12:
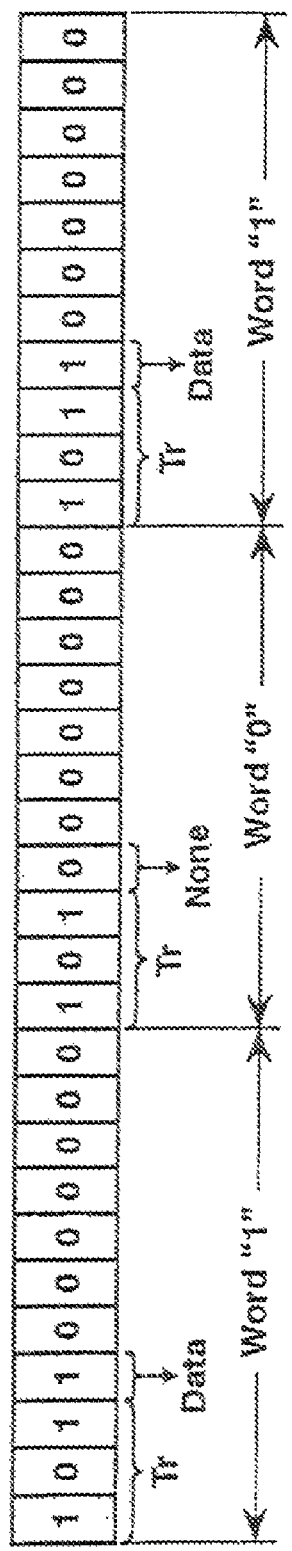
FIG. 12 is a first example showing a distributed recording of auxiliary information.

FIG. 12 is a first example showing a distributed recording of an auxiliary information. As shown in FIG. 12, the dummy data "101" as a data trigger "Tr" is allocated in the predetermined interval, at every 11 bits herein, and an "X" is allocated in succession to the data trigger "Tr". In other words, by extracting only the "X" allocated immediately after the data trigger "Tr", an auxiliary information can be restored. In this case, with defining that the "1" is data, the auxiliary information shown in FIG. 12 can be restored as a series of data that are composed of existing data (Data), none data (None) and existing data (Data) in sequence, so that "101" can be reproduced as the auxiliary information. This recording method is effective for a format that is allowed to read a data array to be processed with spending a longer period of time. It is defined hereupon that one-bit data to be extracted at each predetermined interval is a "word" and an auxiliary information is constituted by integrating a plurality of "words".

Figure 13:
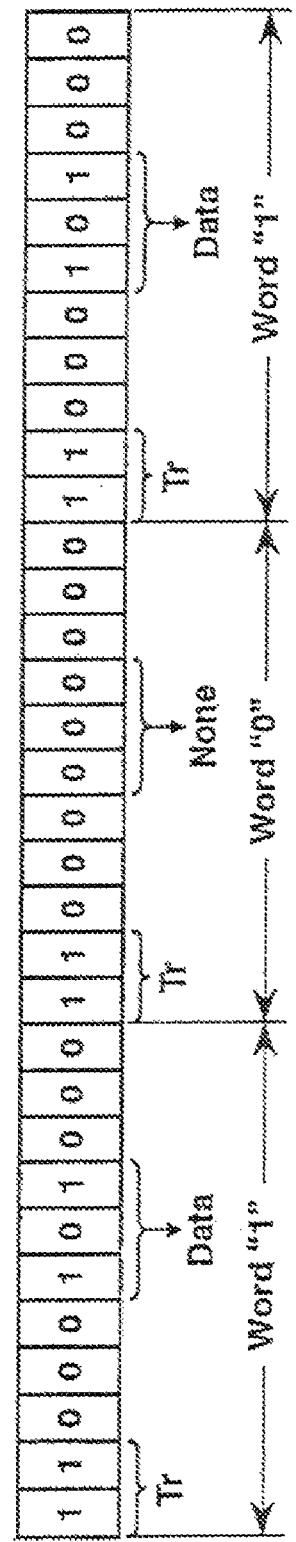
FIG. 13 is a second example showing a distributed recording of auxiliary information.

Further, a variation of the recording method shown in FIG. 12 is exhibited in FIG. 13.

FIG. 13 is a second example showing a distributed recording of an auxiliary information. As shown in FIG. 13, a data trigger "Tr" and data "X" can be allocated with separating them in a predetermined bit of interval. In FIG. 13, the data trigger "Tr" is "11" and allocated at every 11 bits. Data are recorded by "101" whether the "101" is existed or not in a predetermined interval. In other words, by extracting data existing in the fourth bit to the sixth bit, one-bit data can be restored. In this second example, data can be restored as a series of data composed of existing data (Data), none data (None) and existing data (Data) in sequence, so that "101" is reproduced as the auxiliary information. This recording method is effective for reducing erratic readout because the data "X" is separated from the data trigger "Tr".

Furthermore, with respect to a third example of the highly distributed recording method, a first specific data pattern such as "11" is allocated or recorded at every predetermined interval. Then, a second specific data pattern such as "101" is allocated between the first specific patterns. A position at where the second specific pattern is allocated is advanced by a predetermined bit, distance or period with respect to the first specific data pattern. Particularly, two positions are allocated previously.

Figure 14:
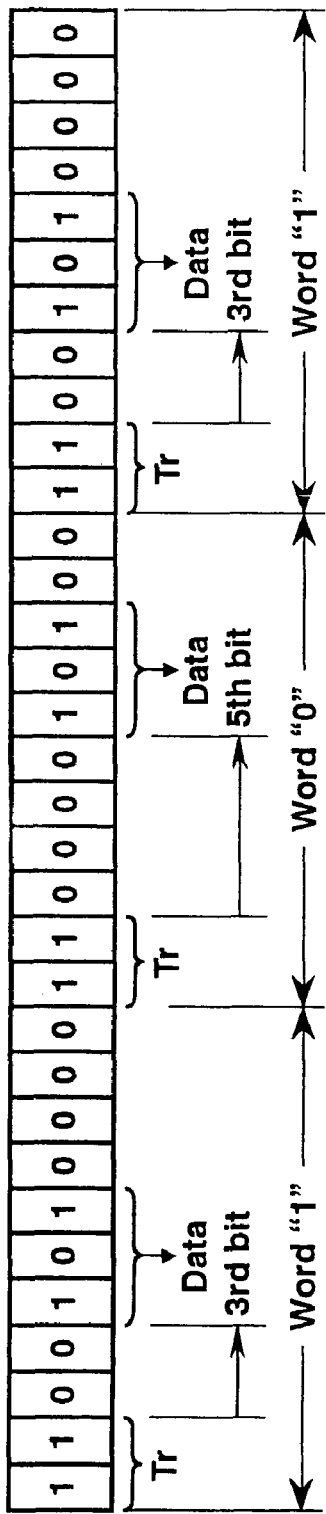
FIG. 14 is a third example showing a distributed recording of auxiliary information.

FIG. 14 is a third example of the highly distributed recording method showing a distributed recording of an auxiliary information. As shown in FIG. 14, a data trigger "Tr" or "11", is allocated at every predetermined interval, actually every 11 bits hereupon, as the first specific data pattern and a second specific data pattern "101" is allocated between the data triggers "Tr" or "11". A position at where the second specific data pattern is allocated is provided with two positions; one is within a range of the third bit to the fifth bit from the data trigger "Tr" or "11" and the other is within a range of the fifth bit to the seventh bit. Decoding is conducted by judging that the second specific data pattern is allocated in either position. In the case of FIG. 14, the second specific data pattern "101" is sequentially allocated in the positions starting with the third bit, fifth bit and third bit respectively, so that data or words "101" can be reproduced as an auxiliary information. This recording method is effective for ensuring higher reliability to an auxiliary information because the recording method can add a parameter whether or not the data "101" can be read out to one of standards for judging reliability.

In other words, data to be recorded in an auxiliary information area are at least composed of a data trigger that is allocated at every predetermined interval and data allocated at a predetermined position between the data triggers. The information recording medium 1 according to the present invention is recorded with an auxiliary information by a relative distance between the data trigger and the data or the second specific data pattern.

Moreover, in the description of the third example of the highly distributed recording method mentioned above, the method of distributed recording that is conducted by using a position difference between the first specific data pattern and the second specific data pattern is explained. However, in case that a pattern, which is extremely high in readout accuracy, can be provided, it is acceptable for both the first specific data pattern and the second specific data pattern to make their patterns the same pattern. In other words, decoding can be conducted by extracting a specific pattern having a shorter time interval from a specific data pattern recorded at a predetermined time interval and measuring a distance interval or the time interval between the specific data pattern and the specific pattern. With referring to FIG. 15, further details are explained next.

Figure 15:
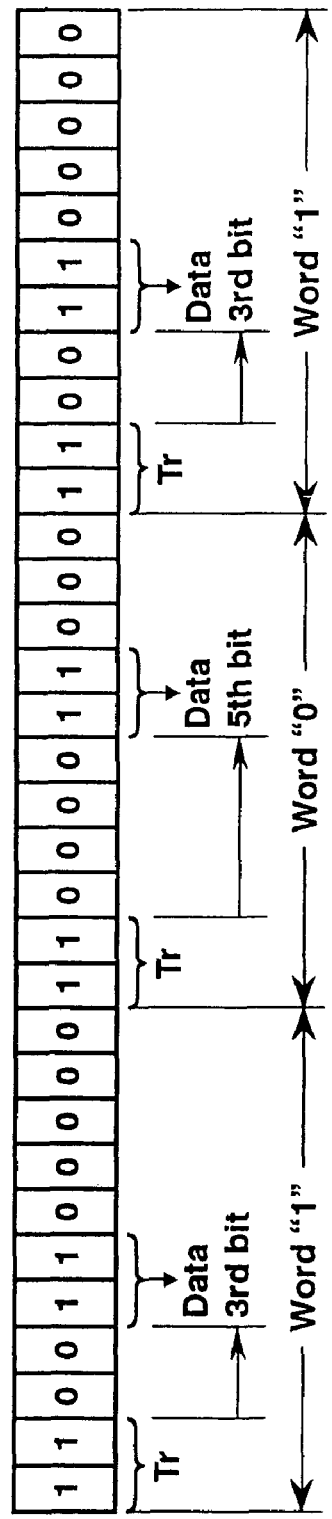
FIG. 15 is a fourth example showing a distributed recording of auxiliary information.

FIG. 15 is a fourth example showing a distributed recording of an auxiliary information. As shown in FIG. 15, a data trigger "Tr" or "11" is allocated at a predetermined interval, at every 11 bits hereupon, as a first specific data pattern, and a second specific data pattern "11" having the same pattern as the data trigger "Tr" is allocated between the data triggers "Tr". A position at where the second specific data pattern is allocated is provided with two positions; one is within a range of the third bit to the fifth bit from the data trigger "Tr" or "11" and the other is within a range of the fifth bit to the seventh bit. Decoding is conducted by judging that the second specific data pattern is allocated in either position. In the case of FIG. 15, the second specific data pattern "101" is sequentially allocated in the positions starting with the third bit, fifth bit and third bit respectively, so that data or words "101" can be reproduced as an auxiliary information. This recording method is advantageous to a reproducing circuit to be simplified because the recording method requires only one specific data pattern.

The highly distributed recording method is explained above in several types. According to these highly distributed recording methods, an auxiliary information is recorded as data that are decomposed into every one bit. Actually, some bits of dummy data are prepared for a data trigger "Tr" first, and a data array composed of continuing single data such as continuing zeros, for example, is prepared next. The data trigger "Tr" is connected with the single data array so as for the data trigger "Tr" to be allocated at every predetermined interval. Then, the auxiliary information that is decomposed into every one bit is recorded so as to convert a part of the single data array by a predetermined rule. In other words, an auxiliary information is recorded by converting data allocated in a bit, which is advanced by a predetermined distance from the data trigger "Tr", by the predetermined rule.

On the other hand, when reproducing the auxiliary information, all data are once read out from a sidewall of raised portion "A" as a data array and a data trigger "Tr" that is allocated at every predetermined interval is detected from the data array. Then, one bit of data that is equivalent to a "Word" shown in FIGS. 12 to 15 is extracted from the data array excluding the data trigger "Tr" with referring to the predetermined rule. The auxiliary information is restored by integrating the detected one-bit data.

The methods for recording in highly distributed and for reproducing an information recording medium according to the present invention are explained above. In case of an auxiliary information, particularly, an address information, a plurality of zeros or ones may continue, so that there is existed a possibility of generating a DC component in a data array being read out. In order to eliminate such a possibility, it is acceptable that the data array is previously modulated by the base-band modulation method and recorded. In other words, there existed a method such that a data array to be recorded on a sidewall of raised portion "A" by wobbling modulation is previously replaced with another codes so as to reduce a sequence of zeros and ones to a certain number or less. With respect to such a method, the method such as Manchester code, PE (phase encoding) modulation, MFM (modified frequency modulation), M2 (Miller squared) modulation, NRZI (non return to zero inverted) modulation, NRZ (non return to zero) modulation, RZ (return to zero) modulation and differential modulation can be used independently or by combining some of them together.

FIG. 16 is a table exhibiting data change before and after modulating a base-band.

With respect to a base-band modulation method, which is most suitable for the information recording medium 1 of the present invention, there is provided the Manchester code (bi-phase modulation) method. The Manchester code method is a method of applying two bits to each one bit of an original data to be recorded as shown in FIG. 16. That is, "00" or "11" is assigned to a data "0" to be recorded, and "01" or "10" to a data "1".

Further, an inverted code of inverting a last code of preceding data is essentially applied to a head code of succeeding data when arranging the succeeding data after the preceding data.

FIG. 17 is a table exhibiting an example of actual data change before and after modulating a base-band. As shown in FIG. 17, an original data "100001" is assigned to be a code array of "010011001101". The original data contains a sequence of four "0"s and is an asymmetrical data in which an appearing probability of "0" is twice that of "1". If such an asymmetrical data is modulated by the Manchester code method, a sequence of "0" or "1" is only two maximally and the original data is converted into a symmetrical data having equal appearing probability of "0" and "1". As mentioned above, the base-band modulation, which restricts a sequence of same bits within a certain quantity, is effective to increase stability of reading out data. Consequently, the base-band modulation method is suitable for pre-treatment for a long array of auxiliary information.

An amplitude-shift keying modulation wave 250 (250, 251 and 252), a frequency-shift keying modulation wave 260 (260, 261 and 262) and a phase-shift keying modulation wave 270 (270, 271 and 272), which are used for the information recording medium 1 according to the embodiment one of the present invention as a wobbling groove modulation wave, are explained next.

Figure 18:
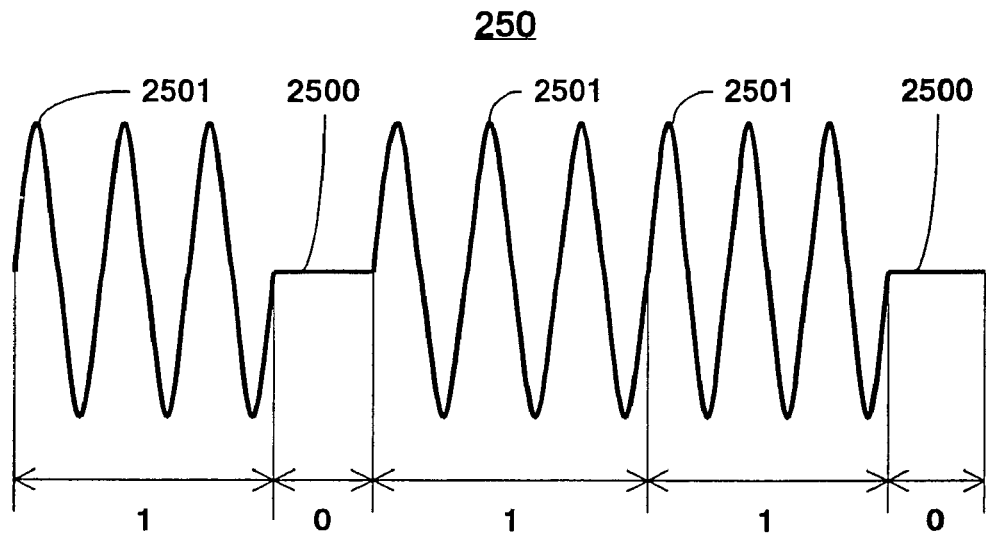
FIG. 18 shows a first example of an amplitude-shift keying modulation waveform according to the present invention.
Figure 19:
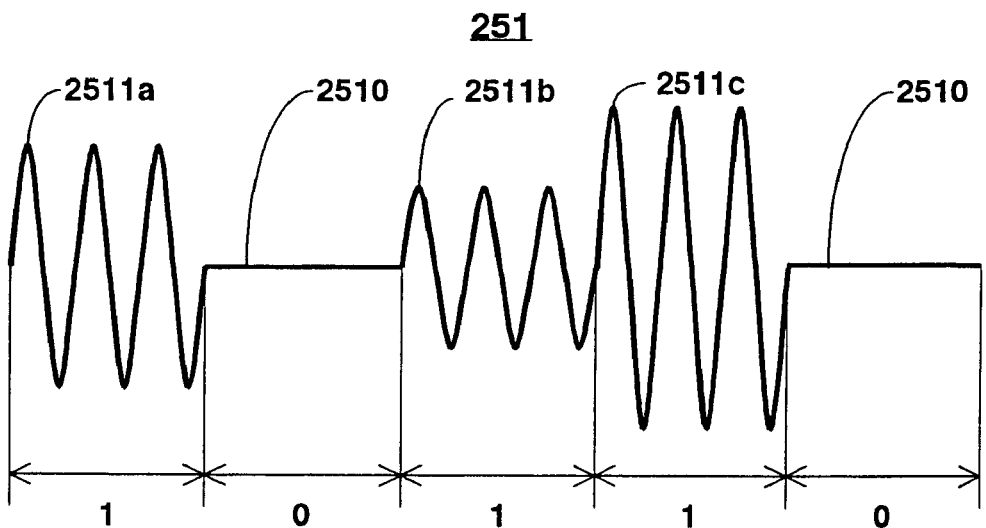
FIG. 19 shows a second example of an amplitude-shift keying modulation waveform according to the present invention.
Figure 20:
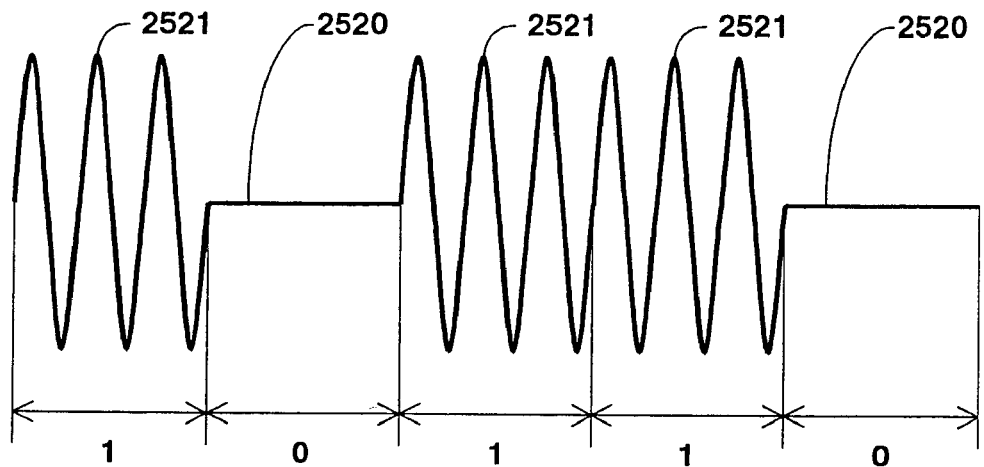
FIG. 20 shows a third example of an amplitude-shift keying modulation waveform according to the present invention.

With referring to FIGS. 18 through 20, the amplitude-shift keying modulation waves 250, 251 and 252 are depicted.

FIG. 18 shows a first example of an amplitude-shift keying modulation waveform according to the present invention. FIG. 19 shows a second example of an amplitude-shift keying modulation waveform according to the present invention. FIG. 20 shows a third example of an amplitude-shift keying modulation waveform according to the present invention.

As shown in FIG. 18, the amplitude-shift keying modulation wave 250 according to the present invention is geometrically recorded by modulating data through the amplitude-shift keying modulation method and actually, constituted by an amplitude section 2501 and a non-amplitude section 2500, wherein the amplitude section 2501 is formed by wobbling a groove in a predetermined period. In other words, the amplitude section 2501 is a wobbling part of groove and the non-amplitude section 2500 is a non-wobbling part of groove.

Further, the amplitude section 2501 and the non-amplitude section 2500 are corresponding to "1" and "0" of a data bit respectively. The amplitude section 2501 is composed of a plurality of waves that continue more than one cycle hereupon. A number of waves is not limited to a specific cycle. However, if it is too many, length of the non-amplitude section 2500 consequently becomes longer and resulting in that a fundamental wave, which produces a gate when reproducing, is hardly detected. Therefore, two to one hundred cycles, preferably three to thirty cycles are suitable for the number of waves of the amplitude section 2501. As mentioned above, digital data (in case of FIG. 18, it is "10110") is recorded by whether or not amplitude is existed. The differential signal detecting method mentioned above can be used for reading out the recorded data.

Furthermore, it should be understood that the amplitude-shift keying modulation wave 250 according to the present invention does not limit each length or each amplitude size of the amplitude section 2501 and the non-amplitude section 2500 to specific figure. In the case of the amplitude-shift keying modulation wave 250 shown in FIG. 18, the length of the amplitude section 2501 is set to be longer than that of the non-amplitude section 2500.

In FIG. 19, an amplitude-shift keying modulation wave 251 is constituted by amplitude sections 2511a through 2511c and non-amplitude sections 2511. Each amplitude of the amplitude sections 2511a through 2511c is unequal to each other. However, unequal amplitude is acceptable for the amplitude-shift keying modulation method.

Further, it is also acceptable that assigning each amplitude in multiple levels intentionally realizes recording in multi-values more than three values.

Furthermore, in case of an amplitude-shift keying modulation wave 252 shown in FIG. 20, each amplitude of amplitude sections 2521 is equal to each other and each length of the amplitude sections 2521 is equal to that of non-amplitude sections 2520. This configuration is also acceptable for the amplitude-shift keying modulation method. Particularly, in case that data are recorded in digital by the binary value of "0" and "1", an isotropic layout as shown in FIG. 20 is desirable for the digital recording by the binary value. In other words, if each height of the amplitude sections 2521 is made equal to each other and each length of the amplitude sections 2521 is made equal to that of the non-amplitude sections 2520, judging "0" or "1" when reproducing can be realized by sufficient threshold value of amplitude.

Moreover, data arranged in series can be read out by one threshold value, so that a reproducing circuit can be simplified.

In addition thereto, even in case that jitter exists in reproduced data, there is existed a merit that influence of the jitter can be minimized.

Further, with assuming that a code to be recorded is ideally symmetrical, total length of the amplitude sections 2521 is made equal to that of the non-amplitude sections 2520 and resulted in that no DC component is existed in a reproduced signal. It is advantageous to digital recording that no DC component releases a burden on data decoding and servo.

As mentioned above, by using any of the amplitude-shift keying modulation waves 250, 251 and 252, an auxiliary information is recorded in an information recording medium 1 according to the embodiment one of the present invention. Either "0" or "1" is recorded in response to whether a wobble is existed on a sidewall of groove or not, so that ability of judging "0" or "1" is excellent. In other words, a low error rate can be obtained although an auxiliary information is in relatively low C/N (carrier to noise ratio).

Further, although recording on a recording layer 12X or 12Y is conducted by a user, influence of random noise caused by the recording can be reduced and a low error rate can be maintained.

Figure 21:
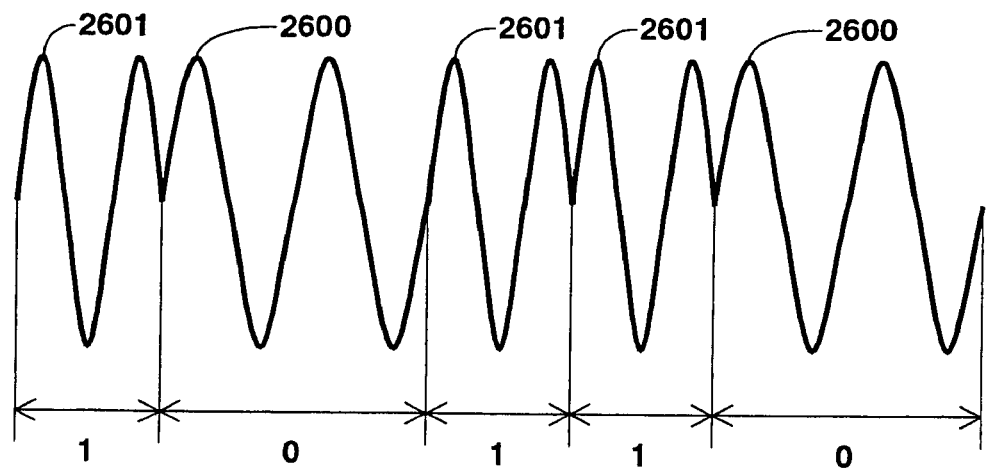
FIG. 21 shows a first example of a frequency-shift keying modulation waveform according to the present invention.
Figure 22:
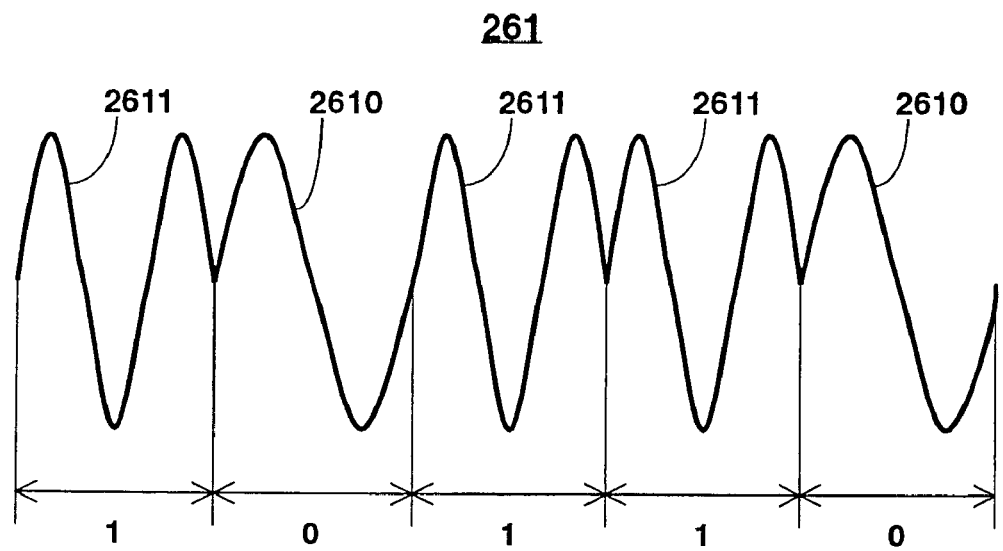
FIG. 22 shows a second example of a frequency-shift keying modulation waveform according to the present invention.
Figure 23:
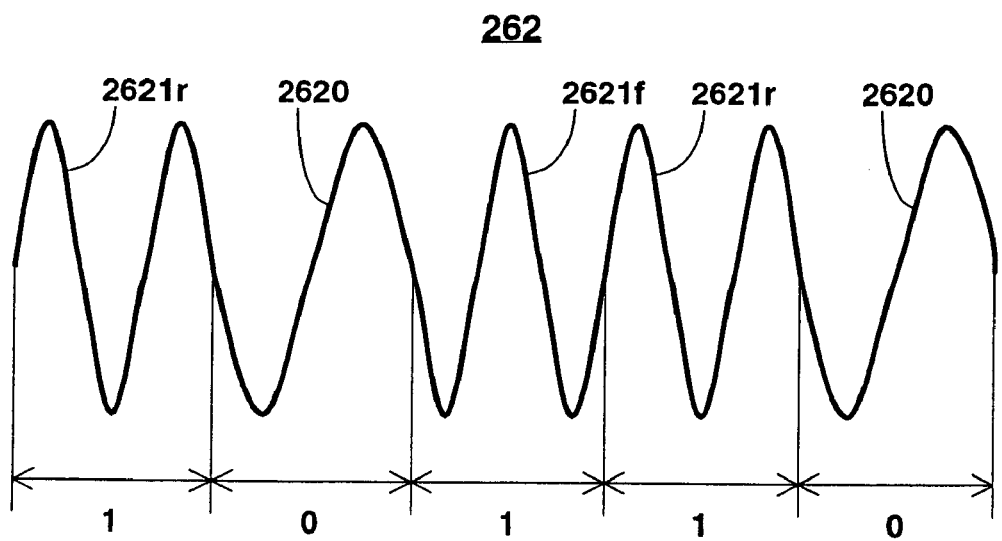
FIG. 23 shows a third example of a frequency-shift keying modulation waveform according to the present invention.

With reference to FIGS. 21 through 23, frequency-shift keying modulation waves 260 through 262 are explained next.

FIG. 21 shows a first example of a frequency-shift keying modulation waveform according to the present invention. FIG. 22 shows a second example of a frequency-shift keying modulation waveform according to the present invention. FIG. 23 shows a third example of a frequency-shift keying modulation waveform according to the present invention.

A frequency-shift keying modulation wave is for recording data geometrically by the frequency-shift keying modulation method and is composed of a plurality of sections that are formed by wobbling grooves by different frequencies. Actually, in the case of binary data, the frequency-shift keying modulation wave is geometrically recorded by using a higher frequency section and a lower frequency section. In case of multi-valued data such as "n" values, a frequency-shift keying modulation wave is geometrically recorded by the frequency-shift keying modulation method that uses "n" kinds of frequency sections. Hereinafter the examples are explained with assuming that data to be recorded are in binary. FIG. 21 is one example of recording data "10110" geometrically. In FIG. 21, the frequency-shift keying modulation wave 260 is composed of three higher frequency sections 2601 and two lower frequency sections 2600. The higher frequency section 2601 and the lower frequency section 2600 are equivalent to "1" and "0" of a data bit respectively and they are recorded in digital by changing the frequency at each one channel bit. A number of waves that constitute each frequency section is not limited to one specific number. Each frequency section is composed of a wave that continues more than one cycle. However, in consideration of that data are not redundant too much in an apparatus for reproducing so as to detect a frequency accurately and to obtain a certain degree of data transfer rate, each frequency section, which is corresponding to each data bit mentioned above, is desirable to be constituted by a number of waves within a range of one cycle to one hundred cycles, preferably one cycle to thirty cycles.

Further, it is acceptable that each amplitude of the higher frequency section 2601 and the lower frequency section 2600 is equal to each other. However, an amplitude ratio is not limited to one specific figure. Amplitude of the higher frequency section 2601 can be formed larger than that of the lower frequency section 2600 in consideration of a frequency response of reproducing apparatus.

Furthermore, the differential signal detecting method mentioned above can be used for reading out the recorded data.

It should be understood that the information recording medium 1 according to the embodiment one of the present invention does not place a restraint on physical length or amplitude size of a channel bit, which is composed of the higher frequency section 2601 and the lower frequency section 2600. For example, in FIG. 21, the physical length of lower frequency section 2600 is designated to be longer than that of the higher frequency section 2601.

As shown in FIG. 22, in case of a frequency-shift keying modulation wave 261, it is acceptable that amplitude of a higher frequency section 2611 and a lower frequency section 2610 are equal to each other and length of the higher frequency section 2611 is equal to that of the lower frequency section 2610. By equalizing each amplitude and length as mentioned above, judging "0" or "1" can be performed by sufficient threshold value of amplitude when reproducing.

Further, data arranged in series can be read out by one threshold value of time, so that a reproducing circuit can be simplified.

Furthermore, in case that jitter exists in reproduced data, there is existed a merit that influence of the jitter can be minimized.

Moreover, with assuming that a code to be recorded is ideally symmetrical, total length of the higher frequency sections 2611 is equal to that of the lower frequency sections 2610 and resulted in that no DC component is existed in a reproduced signal. It is advantageous to digital recording that no DC component releases a burden on data decoding and servo.

In FIGS. 21 and 22, the higher frequency section 2601 or 2611 and the lower frequency section 2600 or 2610 are connected to each other respectively, wherein each waveform rises at a point where a channel bit changes. However, phase jump happens in probability of 50% at the moment when a channel bit changes. Consequently, a high frequency component is generated and resulted in deterioration of power efficiency per each frequency.

In order to eliminate such phase jump, a frequency-shift keying modulation wave 262 is provided. In FIG. 23, the frequency-shift keying modulation wave 262 is composed of a higher frequency section 2621r or 2621f (hereinafter referred generically to as higher frequency section 2621) and a lower frequency section 2620. The higher frequency section 2621 and the lower frequency section 2620 is arranged so as to maintain phase continuity at a point where each channel bit of the frequency-shift keying modulation wave 262 changes over. Actually, a starting phase of the lower frequency section 2620 is selected so as to be that a phase direction of the end of the higher frequency section 2621 and a phase direction of the start of the lower frequency section 2620 are the same direction.

Further, the reverse connection is the same as such that a starting phase of the higher frequency section 2621 is selected so as to be that a phase direction of the end of the lower frequency section 2620 and a phase direction of the start of the higher frequency section 2621 are the same direction. If the starting phase is selected as mentioned above, continuity of phase is maintained and power efficiency is improved.

Furthermore, a reproduction envelope becomes constant, so that a data error rate of auxiliary information, which is recorded in the information recording medium 1, is improved. Such a method of maintaining continuity of phase at a point where a channel bit changes can be applied to the auxiliary information area 200 and the reference clock area 300 shown in FIG. 6. A data error rate of auxiliary information is further improved if waveforms of the auxiliary information area 200 and the reference clock area 300 are arranged as mentioned above.

A frequency of the higher frequency section 2621 (2601, 2611 or 2621) and the lower frequency section 2620 (2600, 2610 or 2620) is arbitrary selected. However, in order to eliminate interference with a frequency range that is provided for recording data on the information recording medium 1 by a user, it is strictly required for the higher frequency section 2621 not to be extremely high frequency in comparison with a frequency of the lower frequency section 2620. On the other hand, in order to improve a reproduction error rate of address data, a frequency difference between the higher frequency section 2621 and the lower frequency section 2620 shall be kept in certain degree so as to maintain excellent separativeness. From these points, a frequency ratio of the higher frequency section 2621 to the lower frequency section 2620 is desirable to be within a range of 1.05 to 5.0, particularly, desirable to be within a range of 1.09 to 1.67. In other words, phase relation between two frequencies is desirable to be within a range of $2\pi \pm (\pi/20.5)$ to $2\pi \pm (\pi/0.75)$, particularly, desirable to be within a range of $2\pi \pm (\pi/12)$ to $2\pi \pm (\pi/2)$, that is, 360±15 degrees to 360±90 degrees, wherein the reference phase is defined as $2\pi$.

With respect to a frequency ratio (ratio of higher frequency to lower frequency), if the frequency ratio shown in FIG. 23 is assigned to be 1.5, there exists a phase relation between these higher and lower frequencies such that the higher frequency is shifted by $-\pi/2.5$ from a reference phase of a single-frequency wave and the lower frequency is shifted by $+\pi/2.5$ from the reference phase of the single-frequency wave, wherein the phase relation becomes $2\pi \pm (\pi/2.5)$ when the reference phase is defined as $2\pi$. In other words, the phase relation is shifted to 360±72 degrees. It is expressed that these two frequencies are integral multiple (wherein it is three times and two times respectively) of the frequency (in this case 0.5) of the single-frequency wave. Consequently, it is advantageous for a demodulation circuit to be simplified.

Further, generating a clock signal becomes easier by using a circuit having a window of 0.5.

Furthermore, a synchronous detector circuit can conduct demodulation. In this case, an error rate can be reduced extremely.

As mentioned above, an auxiliary information is recorded in the information recording medium 1 of the present invention by the frequency-shift keying modulation waves 260, 261 and 262. The binary data "0" or "1" is recorded in accordance with change of a wobbling frequency, so that ability of judging "0" or "1" is excellent. In other words, an auxiliary information can be obtained in a low error rate although a C/N is relatively low.

Furthermore, influence of random noise caused by recording on the first recording layer 12X or the second recording layer 12Y by a user can be reduced and a low error rate can be maintained.

With referring to FIGS. 24 through 26, phase-shift keying modulation waves 270, 271 and 272 are explained next.

Figure 24:
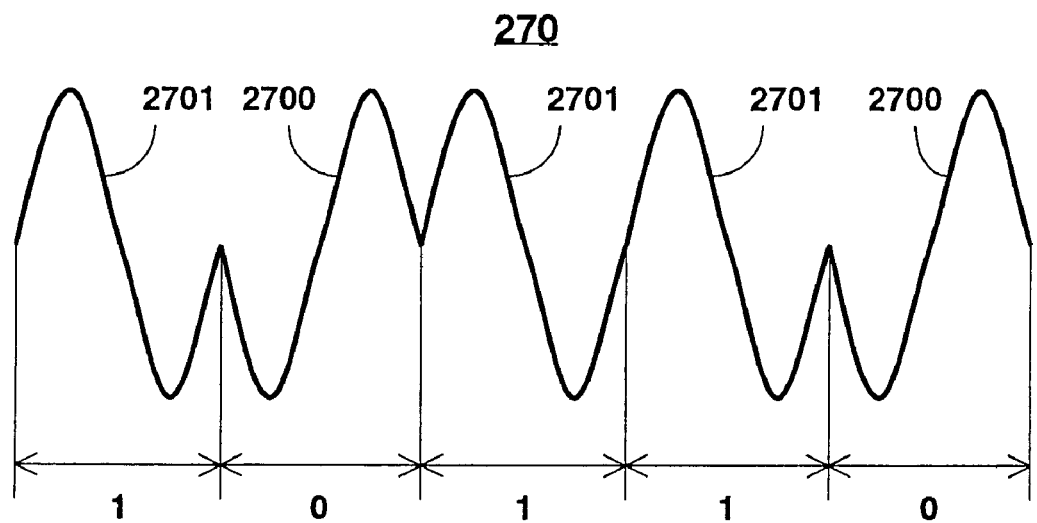
FIG. 24 shows a first example of a phase-shift keying modulation waveform according to the present invention.

FIG. 24 shows a first example of a phase-shift keying modulation waveform according to the present invention. FIG. 25 shows a second example of a phase-shift keying modulation waveform according to the present invention. FIG. 26 shows a third example of a phase-shift keying modulation waveform according to the present invention.

As shown in FIG. 24, the phase-shift keying modulation wave 270 is formed by recording data geometrically by the phase-shift keying modulation method. Actually, the phase-shift keying modulation wave 270 is composed of a plurality of sections, which are constituted by wobbling a groove by a predetermined frequency. In the case of binary data, the phase-shift keying modulation wave 270 is composed of an advancing phase section 2701 and a receding phase section 2700. In case of multi-valued data such as "n" values, a phase-shift keying modulation wave is composed of "n" phase sections, which correspond to "n" kinds of phases respectively. Hereinafter the examples are explained with assuming that data to be recorded are in binary. FIG. 24 is one example of recording data "10110" geometrically. In FIG. 24, the phase-shift keying modulation wave 270 is composed of three advancing phase sections 2701 and two receding phase sections 2700. The advancing phase section 2701 and the receding phase section 2700 are equivalent to "1" and "0" of a data bit respectively, and recorded in digital by changing the phase at each one channel bit. Actually, the advancing phase section 2701 and the receding phase section 2700 are exhibited by a sinusoidal wave of "sin 0" and another sinusoidal wave of "sin(−π)" respectively. As shown in FIG. 24, the advancing phase section 2701 and the receding phase section 2700 are constituted by one cycle of waveform respectively. However, phase difference between them is as many as π, so that they can be separated and reproduced sufficiently by the envelope detection method or the synchronous detection method.

Each frequency of the advancing phase section 2701 and the receding phase section 2700 is identical to each other. A number of waves, which constitutes the advancing phase section 2701 and the receding phase section 2700, is not restricted to a specific number. Both phase sections are composed of a wave that continues more than one cycle. However, in consideration of that data are not redundant too much in a reproducing apparatus so as to detect a frequency accurately and obtain a certain degree of data transfer rate, each phase section corresponding to each data bit that is mentioned above is desirable to be constituted by a number of waves within a range of one cycle to one hundred cycles, preferably one cycle to thirty cycles.

It is acceptable for each physical length of the advancing phase section 2701 and the receding phase section 2700 to be identical or not. In case that each physical length is identical, data, which are combined in series, can be divided into piece by a predetermined time, that is, a predetermined clock when reproducing, so that a reproduction circuit can be simplified.

Further, in case that jitter exists in reproduced data, there is existed a merit that enables to minimize influence of the jitter.

It is also acceptable for each amplitude of the advancing phase section 2701 and the receding phase section 2700 to be coincide with each other or not. However, in consideration of easier reproduction, it is desirable for the advancing phase section 2701 and the receding phase section 2700 that each amplitude of them coincides with each other.

The information recording medium 1 according to the embodiment one of the present invention can deal with not only binary data but also multi-valued data. Dealing with how many kinds of phases depends on that phase difference of each data bit can be separated into what degree of resolution. The limit of separation of the information recording medium 1 is obtained experimentally by the inventors of the present invention and it is confirmed that phase difference can be separated into up to π/8. In other words, various phase sections, which constitute the multi-valued channel bit, can deal with minimum phase difference of each phase section within a range of π/8 to π, wherein π is equivalent to minimum phase difference of a binary data. That is to say, a wide range of data from binary to hexadecimal can be dealt with.

Figure 25:
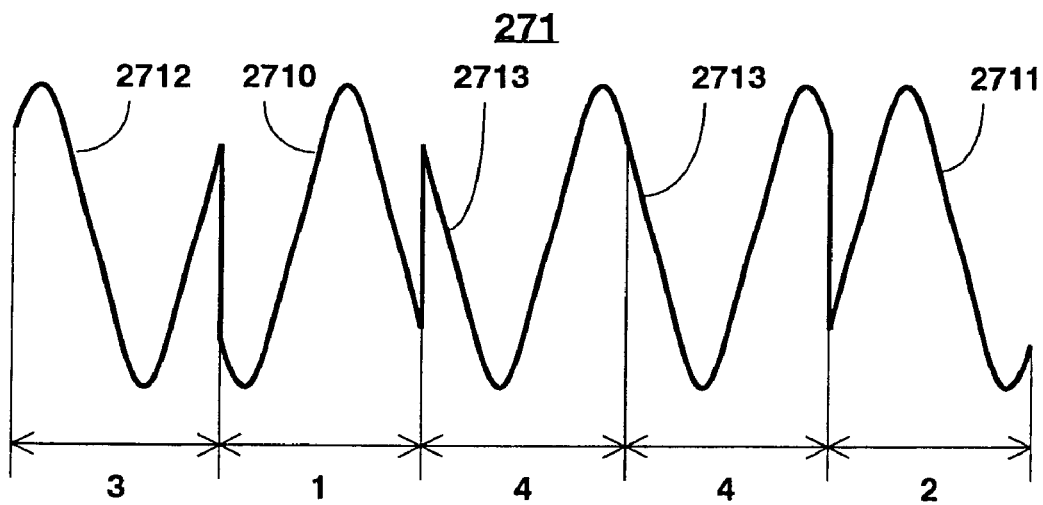
FIG. 25 shows a second example of a phase-shift keying modulation waveform according to the present invention.

FIG. 25 is a second example showing a phase-shift keying modulation wave 271 that is recorded with 4-valued data. In FIG. 25 the phase-shift keying modulation wave 271 is composed of a first phase section [sin(3π/4)] 2710, a second phase section [sin (−π/4)] 2711, a third phase section [sin(π/4)] 2712 and a fourth phase section [sin(3π/4)] 2713. Minimum phase difference of each phase section is π/2, so that each of the 4-valued data can be sufficiently separated and obtained. Hereupon, the first phase section 2710, the second phase section 2711, the third phase section 2712 and the fourth phase section 2713 are corresponded to data "1", "2", "3" and "4" respectively for convenience.

When recording multi-valued data such as mentioned above, the multi-valued data can be replaced by multidimensional data. With assuming that the data is two-dimensional data (x, y), for example, the data "1" through "4" can be replaced by data (0, 0), data (0, 1), data (1, 0), and data (1, 1) respectively.

Figure 26:
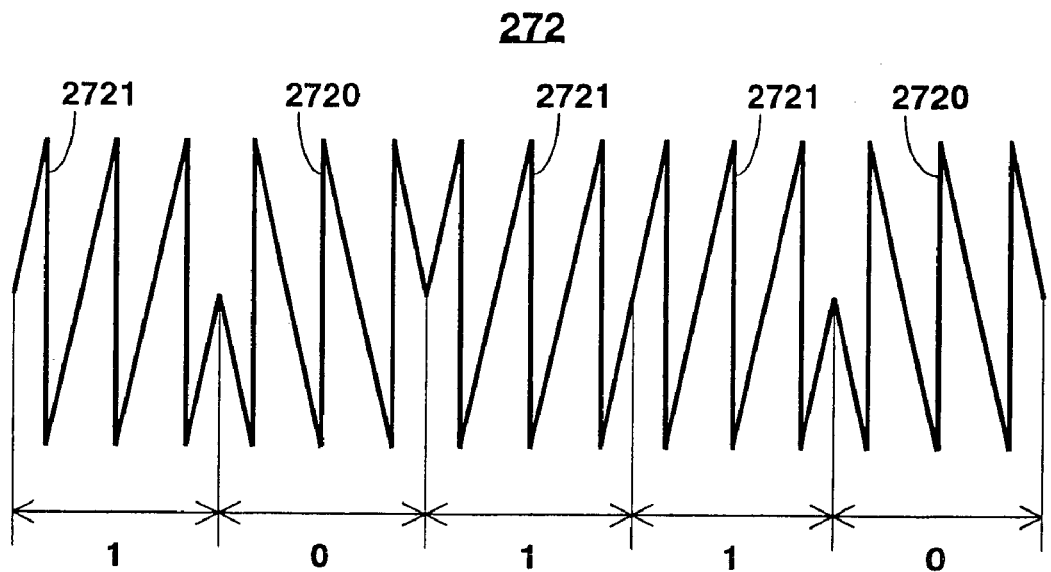
FIG. 26 shows a third example of a phase-shift keying modulation waveform according to the present invention.

FIG. 26 is a third example showing a phase-shift keying modulation wave 272, which deals with binary data in the information recording medium 1 according to the embodiment one of the present invention. In FIG. 26, a fundamental wave is a saw-tooth wave and the waveform is asymmetrical for rising and falling sections. By controlling the rising and falling sections individually, difference of phase is exhibited. In the case of the waveform shown in FIG. 26, data "1" is recorded as a section 2721 of which a wave rises gradually and falls rapidly (hereinafter referred to as a rapidly falling section 2721), and data "0" as a section 2720, which rises rapidly and falls gradually (hereinafter referred to as a rapidly rising section 2720). In case that address data "10110" is recorded, for example, as shown in FIG. 26, the phase-shift keying modulation wave 272 is geometrically recorded with the rapidly falling section 2721, the rapidly rising section 2720, the rapidly falling section 2721, the rapidly falling section 2721 and the rapidly rising section 2720 in order. Such a recording method that records data by angle difference between a rising angle and a falling angle can demodulate the data by inputting the data into a high-pass filter and by extracting a differential component. Consequently, the recording method is advantageous to the data that can be reproduced even under low C/N condition.

As mentioned above, an auxiliary information is recorded in the information recording medium 1 according to the embodiment one of the present invention by the phase-shift keying modulation wave 270, 271 or 272. The binary data "0" or "1" is recorded in accordance with phase change of a number of wobbles, so that ability of judging "0" or "1" is excellent. Particularly, a frequency of the phase-shift keying modulation method is constant. Therefore, a filter, which is installed in a preceding stage of a demodulation circuit for auxiliary information, can be assigned to be a band-pass filter of which passing band is specialized in one frequency.

Further, the band-pass filter can also eliminate any kind of noises including a noise that is caused by recording by a user effectively. In other words, a lower error rate can be obtained even though a C/N is relatively low.

Furthermore, influence of random noise caused by the recording can be effectively eliminated and a low error rate can be maintained, even though recording in the first recording layer 12X or the second recording layer 12Y of the information recording medium 1 is conducted by a user.

As mentioned above, constitutions and effects of the amplitude-shift keying modulation waves 250, 251 and 252, the frequency-shift keying modulation waves 260, 261 and 262 and the phase-shift keying modulation waves 270, 271 and 272 according to the present invention are depicted. In the above-mentioned descriptions that are explained with referring to FIGS. 18 through 26, they are explained as examples with defining that a fundamental wave is a sinusoidal wave and recorded. However, it is also acceptable that a fundamental wave is defined as a cosine wave and recorded.

The constitution and the effect of the information recording medium 1 according to the embodiment one of the present invention is detailed above. However, the inventive concept of the present invention is not limited to the information recording medium 1 that is described with referring to FIGS. 1 though 26. It is apparent that many changes, modifications and variations in the arrangement of equipment and devices and in materials can be made without departing from the invention concept disclosed herein.

Further, in the above-mentioned embodiment one, each constituting component can be replaced by each other or exchanged by another component that is disclosed herein.

For example, the shape of the information recording medium 1 is not restricted to one specific shape, any shape such as disc, card and tape can be applied for the information recording medium 1. It is also applicable for the information recording medium 1 to be a shape in circular, rectangular or elliptic. In addition, an information recording medium having a hole is also acceptable.

Figure 27:
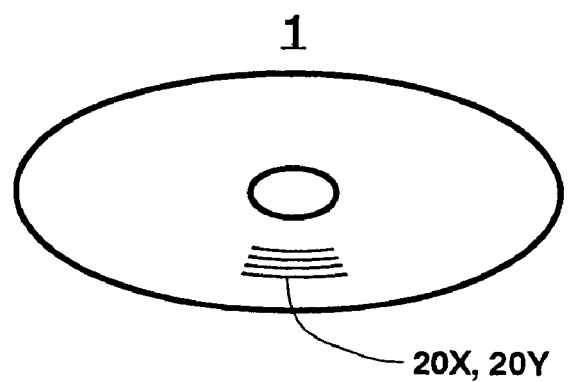
FIG. 27 shows a first example of a shape of the information recording medium according to the present invention.
Figure 28:
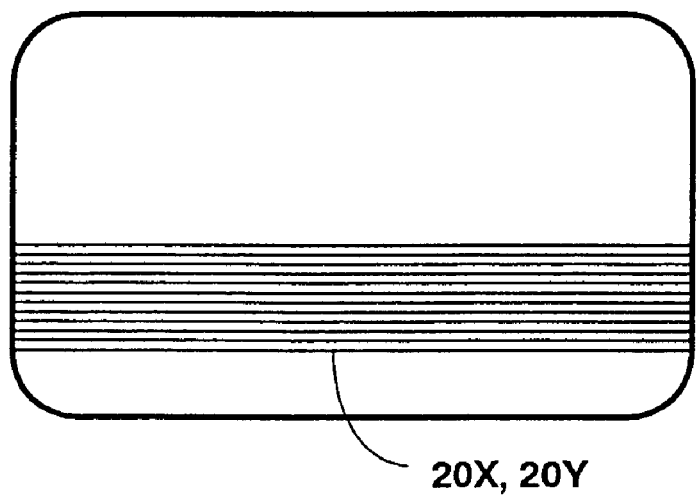
FIG. 28 shows a second example of a shape of the information recording medium according to the present invention.
Figure 29:
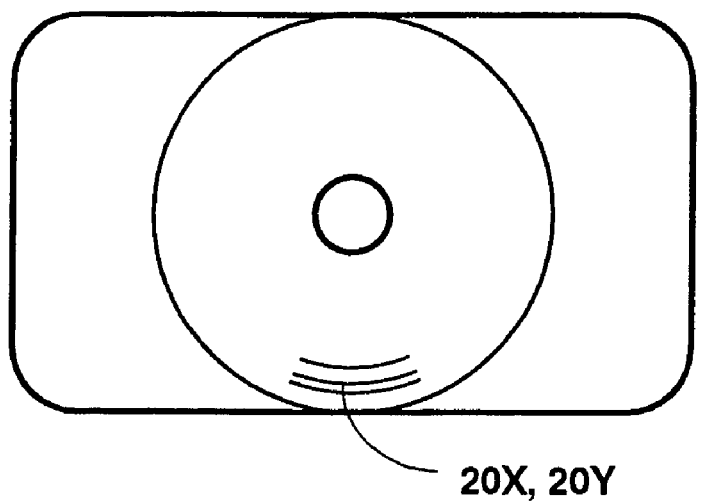
FIG. 29 shows a third example of a shape of the information recording medium according to the present invention.

FIG. 27 shows a first example of disk-shaped information recording medium 1 having a hole. FIG. 28 shows a second example of card-shaped information recording medium 1A having no hole. FIG. 29 shows a third example of a card-shaped information recording medium 1B having a hole. In FIG. 27, the disc-shaped information recording medium 1 is formed with a first microscopic pattern 20X and a second microscopic pattern 20Y, which are constituted by a continuous substance of approximately parallel grooves in a circular arc and in parallel with the inner or outer circumference of the information recording medium 1. The form of the first microscopic pattern 20X and the second microscopic pattern 20Y is not limited to be the circular arc. Any form that is arranged continuously in 360 degrees coaxially or spirally is also acceptable. In FIG. 28, the card-shaped information recording medium 1A having no hole is formed with a first microscopic pattern 20X and a second microscopic pattern 20Y, which are constituted by a continuous substance of approximately parallel grooves linearly and in parallel with the longitudinal direction of the information recording medium 1A. In FIG. 29, the card-shaped information recording medium 1B having a hole is formed with a first microscopic pattern 20X and a second microscopic pattern 20Y, which are constituted by a continuous substance of approximately parallel grooves in circular.

Further, the cross section of the information recording medium 1 explained by using FIG. 1 is not limited to the cross sectional view shown in FIG. 1. It is apparent that the invention concept of the present invention can apply to an information recording medium having various cross sectional configurations.

Embodiment Two

Figure 30:
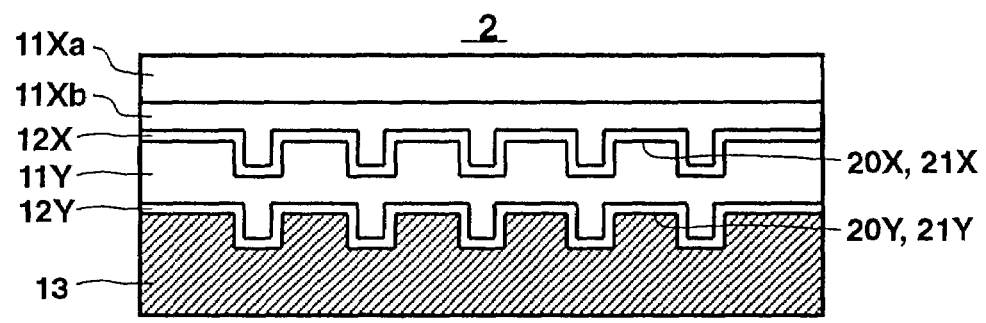
FIG. 30 is a cross sectional view of an information recording medium according to an embodiment two of the present invention.

FIG. 30 is a cross sectional view of an information recording medium according to an embodiment two of the present invention. In FIG. 30, an information recording medium 2 is identical to the information recording medium 1 shown in FIG. 1 except for the first light transmitting layer 11, so that details of the same components will be omitted. As shown in FIG. 30, the first light transmitting layer 11X of the information recording medium 1 is divided into two layers; a first light transmitting layer 11Xa and an adhesive light transmitting layer 11Xb, wherein the first light transmitting layer 11Xa is similar to the first light transmitting layer 11X as mentioned above. The adhesive light transmitting layer 11Xb is a layer for adhering the first light transmitting layer 11Xa on the first recording layer 12X firmly, and transmits more than 70% of light having a wavelength λ, desirably more than 80%.

With respect to a material of the adhesive light transmitting layer 11Xa, an adhesive or cohesive resin such as thermosetting resins, various energy ray curable resins including examples of UV ray curable resins, visible radiation curable resins and electron beam curable resins, moisture curable resins, plural liquid mixture curable resins and thermoplastic resins containing solvent can be used.

Further, a cohesive resin such as natural rubber, synthetic rubber, acrylic resin, polyvinyl ether resin, silicon resin, polyethylene resin, polyester resin, polyurethane resin, and ethylene-vinyl acetate resin can also be used.

Furthermore, a thickness of the adhesive light transmitting layer 11Xb is more than 0.001 mm as a minimum thickness exhibiting adhesiveness, desirably less than 0.04 mm in view of preventing a growth of stress crack, and more desirably more than 0.001 mm and less than 0.03 mm. Desirably further more, the thickness is more than 0.001 and less than 0.02 mm. However, it is the most desirable that the thickness is more than 0.001 mm and less than 0.01 mm in view of warpage of the information recording medium 2 totally.

Embodiment Three

Figure 31:
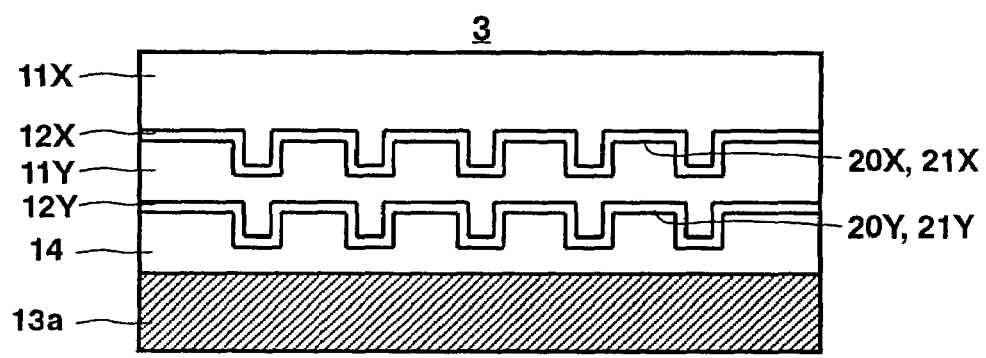
FIG. 31 is a cross sectional view of an information recording medium according to an embodiment three of the present invention.

FIG. 31 is a cross sectional view of an information recording medium according to an embodiment three of the present invention. In FIG. 31, an information recording medium 3 is identical to the information recording medium 1 shown in FIG. 1 except for the substrate 13, so that details of the same components will be omitted. As shown in FIG. 31, the substrate 13 shown in FIG. 1 is replace with a substance of two-layer structure; a substrate 13a and a resin layer 14.

With respect to a material of the resin layer 14, such resins as thermosetting resins, various energy ray curable resins including examples of UV ray curable resins, visible radiation curable resins and electron beam curable resins, moisture curable resins, plural liquid mixture curable resins and thermoplastic resins containing solvent can be used. Reproducing light never reaches to the resin layer 14, so that there is existed no limitation in transmittance.

Further, a thickness of the resin layer 14 is desirable to be less than 0.02 mm in view of warpage of the information recording medium 3 totally.

Embodiment Four

Figure 32:
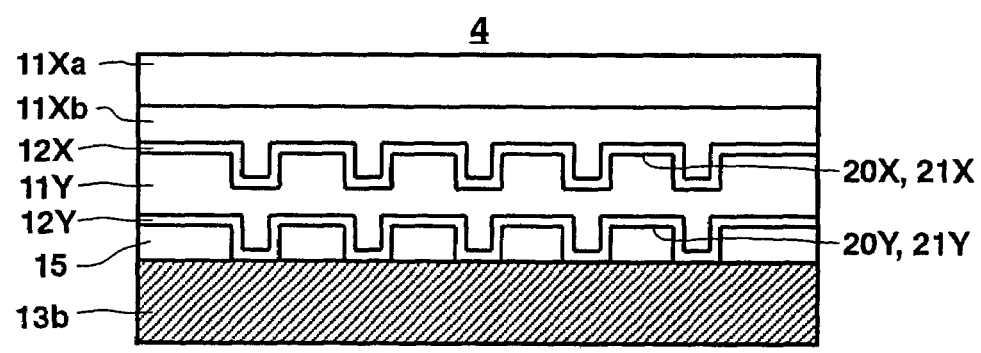
FIG. 32 is a cross sectional view of an information recording medium according to an embodiment four of the present invention.

FIG. 32 is a cross sectional view of an information recording medium according to an embodiment four of the present invention. In FIG. 32, an information recording medium 4 is identical to the information recording medium 1 shown in FIG. 1 except for the first light transmitting layer 11X and the substrate 13, so that details of the same components will be omitted. As shown in FIG. 32, the first light transmitting layer 11X of the information recording medium 1 is divided into two layers; a first light transmitting layer 11Xa and an adhesive light transmitting layer 11Xb as same constitution as those of the information recording medium 2 shown in FIG. 30.

Further, the substrate 13 shown in FIG. 1 is replace with a substance of two-layer structure; a flat substrate 13b and a pattern transferring layer 15 having second microscopic patterns 20Y and 21Y, wherein the pattern transferring layer 15 is an extremely thin film for having the microscopic patterns 20Y and 21Y.

Furthermore, a material of the pattern transferring layer 15 is selected out from a metal, an alloy of the metal and a resin, wherein an alloy includes a compound such as oxide, nitride, carbide, sulfide and fluoride, and its thickness is designated to be within a range of 5 nm to 200 nm.

With respect to a typical example of resin, there is existed novolac light-sensitive resin and polyhydroxy styrene light-sensitive resin, wherein both resins can be developed by alkali.

Each component of the information recording mediums 1 through 4 shown in FIGS. 1 through 5 and 27 through 32 can be replaced by or combined with other component mutually as far as a reproduction characteristic is not deteriorated.

For example, the second light transmitting layer 11Y can be constituted by two layers; a second light transmitting layer and an adhesive light transmitting layer, that is similar to the first light transmitting layer 11X, which is constituted by the first light transmitting layer 11Xa and the adhesive light transmitting layer 11Xb in the information recording medium 2 according to the embodiment two shown by FIG. 30.

Further, it is also acceptable to stick two information recording mediums out of the information recording mediums 1 through 4, wherein one information recording medium is stuck on the other information recording medium with facing each substrate 13 (13a, 13b) towards each other.

Furthermore, the information recording mediums 1 through 4 according to the embodiments one through four of the present invention can be formed with commonly known layers such as an antistatic layer, a lubricative layer and a hard coat layer that are laminated on the light transmitting layer 11X (or 11Xa) although they are not shown in drawings.

With respect to an actual material for the antistatic layer, a resin such as energy ray curable resin and thermosetting resin that are dispersed with surface-active agent and conductive fine particles can be used.

With respect to an actual material for the lubricative layer, liquid lubricant of which surface energy is adjusted by modifying hydrocarbon macromolecule with silicon and fluorine can be used. Thickness of the lubricative layer is desirable to be within a range of 0.1 nm to 10 nm approximately.

Further, with respect to an actual material for the hard coat layer, a resin, which transmits more than 70% of light having wavelength λ, such as thermosetting resins, various energy ray curable resins including examples of UV ray curable resins, visible radiation curable resins and electron beam curable resins, moisture curable resin, plural liquid mixture curable resin and thermoplastic resin containing solvent can be used.

The hard coat layer is desirable to exceed a certain value of the "scratch test by pencil" regulated by the Japanese Industrial Standard (JIS) K5400 in consideration of abrasion resistance of the first light transmitting layer 11X (11Xa). In consideration of that glass is a hardest material for an objective lens of apparatus for reproducing an information recording medium, a value of the "scratch test by pencil" for the hard coat layer is most preferable to be more than the "H" grade. If the test value is less than the "H" grade, dust that is caused by scraping the hard coat layer is remarkably generated. Consequently, an error rate is deteriorated abruptly. A thickness of the hard coat layer is desirable to be more than 0.001 mm in consideration of shock resistance. However, the thickness is more desirable to be less than 0.01 mm in consideration of each warp of the information recording mediums 1 through 4 totally.

Further, a thin film, which transmits more than 70% of light having a wavelength λ and has a value of the "scratch test by pencil" of more than the "H" grade, can be used for the hard coat layer. With respect to an actual example of the thin film, an element such as carbon, molybdenum and silicon, and their alloy including composition such as oxide, nitride, sulfide, fluoride and carbide can be used. A film thickness of such a thin film is desirable to be within a range of 1 nm to 1000 nm.

A label printing can be applied on the outer surface of the substrate 13 (13a, 13b) opposite to the second recording layer 12Y although the label printing is not shown in any drawings. Various energy ray curable resins containing pigment and dye such as UV ray curable resins, visible radiation curable resins and electron beam curable resins can be used suitably for the label printing. A thickness of the label printing is desirable to be more than 0.001 mm in consideration of visibility of the printing, more desirable to be less than 0.05 mm in consideration of each warp of the information recording mediums 1 through 4 totally.

A cross sectional surface of a recessed portion "B" and a raised portion "A" in the first microscopic pattern 20X and the second microscopic pattern 20Y is formed flat respectively. However, a cross sectional surface is not limited to flat. Cross-sectionally, they can be formed in a shape of a V-letter or an inverse V-letter.

Further, the information recording medium 1, 2, 3 or 4 can be formed with a read-only area on the plane of the information recording medium other than a predetermined area for recording, that is, an area for recording and reproducing. The read-only area can be formed by a pit or a wobbling groove recorded with at least one modulation wave selected out from the amplitude-shift keying modulation wave 250, the frequency-shift keying modulation wave 260 and the phase-shift keying modulation wave 270 on a sidewall of the groove. The information recording medium can be provided with the reference clock area 300 together with the read-only area hereupon. These read-only area and reference clock area 300 can be formed by a bar code. The read-only area can provide information for tuning an apparatus for recording or reproducing when recording or reproducing, and further can handle an identification information, a copyright information and a copy restriction information of an individual information recording medium.

Furthermore, the read-only area can be allocated arbitrarily. However, in case of an information recording medium in disciform, it is considered that a read-only area and a recording and reproducing area is allocated in the inner circumference area and the outer circumference area respectively, and these areas are formed so as not to overlap with each other. Particularly, it is most desirable that these two areas come into contact with each other, and they are connected at one point and resulted in enabling to be reproduced continuously.

A hologram and a visible microscopic pattern for identifying the information recording medium 1, 2, 3 or 4 can be formed in an area other than a predetermined area for recording.

In order to improve ability of loading an information recording medium into an apparatus for reproducing or recording and in order to improve protectiveness while loading and handling the information recording medium, each of the information recording mediums 1 through 4 can be installed in a cartridge.

In case that the information recording mediums 1 through 4 are in disciform, its dimension is not limited to one dimension. For example, in the case of diameter, various diameters from 20 mm to 400 mm can be applied for the information recording mediums 1 through 4. Any diameter such as 30, 32, 35, 41, 51, 60, 65, 80, 88, 120, 130, 200, 300 and 356 mm can be acceptable.

The first recording layer 12X and the second recording layer 12Y provided in the information recording mediums 1 through 4 are shown as a single layer in the respective drawings. However, the first and second recording layers 12X and 12Y can be formed by a plurality of thin film materials for a purpose of improving recording and reproducing characteristics and storage stability.

With referring to FIGS. 33 and 34, the other embodiments of information recording mediums are detailed next.

Embodiment Five

Figure 33:
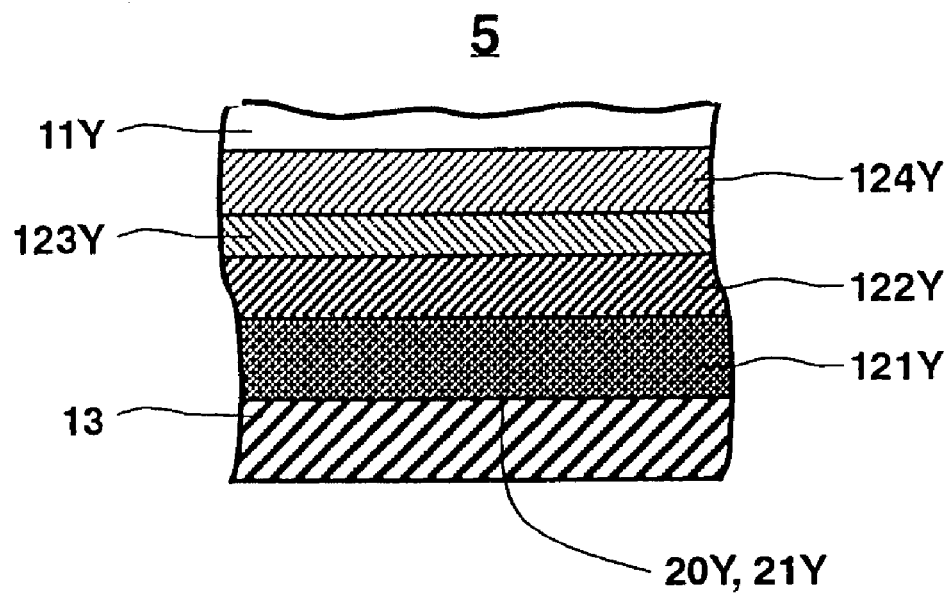
FIG. 33 is a cross sectional view of an information recording medium according to an embodiment five of the present invention.

FIG. 33 is a cross sectional view of an information recording medium according to an embodiment five of the present invention. In FIG. 33, an information recording medium 5 is similar to the information recording medium 1 of the embodiment one shown in FIG. 1, so that the same composition or configuration as that of the information recording medium 1 is marked by the same symbol as the information recording medium 1 and its detail is omitted. As shown in FIG. 33, the information recording medium 5 according to the embodiment five of the present invention is composed of a second reflective layer 121Y, a third protective layer 122Y, a second recording layer 123Y and a fourth protective layer 124Y, which are formed on the substrate 13 in order, instead of the second recording layer 12Y of the information recording medium 1 according to the embodiment one.

With respect to a material for the second reflective layer 121Y, there existed a metal having light reflectiveness such as Al, Au and Ag, an alloy that contains the metal as a main component and an additive element composed of more than one metal, semiconductor or semimetal, and a mixture of metal such as Al, Au and Ag with metal compound such as metal nitride, metal oxide and metal chalcogenide. Such a metal as Al, Au or Ag and an alloy containing the metal as the main component is high in light reflectiveness and thermal conductivity, so that they are preferable for the material of the second reflective layer 121Y.

Further, the second reflective layer 121Y plays a role of optimizing conduction of heat when recording is conducted to the second recording layer 123Y, so that the second reflective layer 121Y can be called a heat-sink layer. With respect to the alloy mentioned above, there existed an alloy composed of Al or Ag added with at least one element out of Si, Mg, Cu, Pd, Ti, Cr, Hf, Ta, Nb, Pd, Zr and Rh as an additive element within a range of more than 1 atomic % to less than 5 atomic % in total or composed of Au added with at least one element out of Cr, Ag, Cu, Pd, Pt and Ni as an additive element within a range of more than 1 atomic % to less than 20 atomic % in total.

Particularly, as anti-corrosiveness is excellent and an iterative characteristic is improved, the second reflective layer 121Y is desirable to be constituted by any one of Al—Cr alloy, Al—Ti alloy, Al—Ta alloy, Al—Zr alloy, Al—Ti—Cr alloy and Al—Si—Mn alloy, which contain Al as a main component and an additive element that is designated to be within a range of more than 0.5 atomic % to less than 3 atomic %. With respect to the additive element, adding a metal or a semiconductor to a base metal alone makes a crystal particle smaller and results in reducing noise level while reproducing, so that adding additive element is desirable.

Furthermore, adding additive element is effective for improving stability under a high temperature and high humidity condition. Alloys such as Al—Ti, Al—Cr, Al—Zr, Al—Si, Ag—Pd—Cu and Ag—Rh—Cu, for example, are desirable for the material of the second reflective layer 121Y. In case of utilizing a violaceous semiconductor laser, constituting the second reflective layer 121Y by an alloy of Al system or Ag system can obtain higher reflectivity. A thickness of the second reflective layer 121Y is within a range of 10 nm to 300 nm.

More, the thickness of the second reflective layer 121Y varies by a degree of thermal conductivity of a metal or an alloy constituting the second reflective layer 121Y. In case of Al—Cr alloy, for example, thermal conductivity decreases in accordance with increasing content of Cr. Consequently, the thickness of the second reflective layer 121Y must be made thicker; otherwise increasing content of Cr does not comply with recording strategy. In case that content of Cr is larger, the second reflective layer 121Y is hard to be heated or cooled down and becomes a so-called gradually cooling structure. In order to control forming a record mark by the recording strategy, some consideration such that shortening a head pulse, shortening multi-pulses or extending a cooling pulse is needed. In case that the thickness of the second reflective layer 121Y exceeds 50 nm, the second reflective layer 121Y does not change optically or affect a value of reflectivity. However, affection to a cooling speed increases extremely. In case of increasing the thickness of the second reflective layer 121Y to more than 300 nm, it takes extra time while manufacturing an information recording medium. Consequently, it is desirable for the film thickness of the second reflective layer 121Y to be suppressed possibly by using a material having higher reflectivity.

Moreover, by dividing the second reflective layer 121Y into more than two layers, a noise level while reproducing an information recording medium can be reduced. In case that the second reflective layer 121Y is constituted by three layers that are formed by three materials individually, for example, these three layers are formed as follows. In case of forming the second reflective layer 121Y having a thickness of 150 nm in total by using a single disc sputtering system, which forms each layer on a substrate 13 in a plurality of vacuum chambers while transporting the substrate 13 one by one, a first reflective layer is formed by a first material in a first vacuum chamber at a filming speed of 2 nm/s, and then second and third reflective layers are formed by second and third materials in second and third vacuum chambers respectively at a filming speed of 6.5 nm/s. Consequently, a plurality of the substrates 13 (discs) can be filmed one after another in a short period of time as long as 10 seconds. By the above-mentioned process, a crystalline particle can be made finer by changing a filming speed. Accordingly, a noise level can be reduced when reproducing the information recording medium 5.

The third protective layer 122Y and the fourth protective layer 124Y is effective for protecting the substrate 13 and the second recording layer 123Y from deformation and resulting in deteriorating a recording characteristic by excessive heat while recording, for preventing oxidization of recording materials, and for improving a signal contrast by an optical interference effect while reproducing.

Further, these third and fourth protective layers 122Y and 124Y are transparent or absorbed slightly at a wavelength of a light beam for recording and reproducing and its refractive index "npy" is within a range of $1.9 \leq npy \leq 2.5$ and its absorption coefficient "kpy" is within a range of $0 \leq kpy \leq 0.2$.

Furthermore, both the third protective layer 122Y and the fourth protective layer 124Y are not required to be made by same material and composition. It is acceptable to be constituted by different materials. A thickness of the fourth protective layer 124Y decides a wavelength exhibiting a minimum value of spectral reflectance.

Moreover, the third protective layer 122Y and the fourth protective layer 124Y is further effective for activating crystallization of a recording layer and for improving an erase ratio.

With respect to a material of these third and fourth protective layers 122Y and 124Y, an oxidized thin film of metal or semiconductor such as Si, Ge, Al, Ti, Zr and Ta, a nitride thin film of metal or semiconductor such as Si, Ge and Al, a carbide thin film of metal or semiconductor such as Ti, Zr, Hf and Si, a sulfide thin film of metal or semiconductor such as ZnS, $In_2S_3$, $TaS_4$ and $GeS_2$ and a film of mixture compound containing more than two compounds out of the above-mentioned compounds such as oxide, nitride, carbide and sulfide are desirable for the third and fourth protective layers 122Y and 124Y because they are high in heat resistance and chemically stable. With respect to a film of mixture compound, there is existed, for example, an inorganic thin film such as ZnS, $SiO_2$, ZnS—$SiO_2$, silicon nitride, and aluminum oxide.

Further, with respect to a material of the third and fourth protective layers 122Y and 124Y, it is desirable that the material does not diffuse into the second recording layer 123Y. Compounds of oxide, sulfide, nitride and carbide are not necessary to be a stoichiometrical composition. Controlling a composition and using them by mixing are also effective for controlling a refractive index. By changing a content amount of oxygen, sulfur, nitrogen and carbon, a refractive index is controlled. If a content amount of them increases, a refractive index decreases. A mixture film of ZnS and $SiO_2$ is particularly desirable for a material of the third and fourth protective layers 122Y and 124Y, because recording sensitivity, C/N (carrier to noise ratio), and erase ratio are hard to be deteriorated by a plurality of repetitions of recording and reproducing. A thickness of the third protective layer 122Y and the fourth protective layer 124Y is within a range of 10 nm to 500 nm respectively. Particularly, a thickness of the third protective layer 122Y is desirable to be within a range of 10 nm to 50 nm because of excellent recording characteristics such as C/N and erase ratio and enabling to rewrite stably a plurality of times. If a thickness of the third protective layer 122Y is thinner, a reflectivity increases and a recording sensitivity results in being deteriorated.

Furthermore, the thinner third protective layer 122Y makes a space between the third protective layer 122Y and the reflective layer 121Y narrower and the second recording layer 123Y results in a so-called rapid cooling construction, so that a relatively large recording power is necessary for forming a record mark.

On the contrary, if the thickness of third protective layer 122Y becomes thicker, the space between the third protective layer 122Y and the reflective layer 121Y becomes wider and the second recording layer 123Y becomes the gradually cooling structure. Consequently, a rewriting performance is deteriorated and a number of repetitions of overwriting decreases. A film thickness of the third protective layer 122Y is preferable to be thinner than that of the fourth protective layer 124Y and to be constituted in the rapid cooling construction so as to relief thermal damage. Consequently, the film thickness of the third protective layer 122Y is preferable to be within a range of 2 nm to 50 nm. Desirably, a filming speed of the third protective layer 122Y is made slower than that of the fourth protective layer 124Y. Accordingly, an increase of jitter caused by rewriting is suppressed and a number of repetitions of overwriting increases.

Moreover, a preferable thickness of the fourth protective layer 124Y is within a range of 10 nm to 200 nm. More preferably, the thickness is within a range of 20 nm to 150 nm so as to increase a reproduced signal although an optimum film thickness varies by a wavelength of a light source to be utilized. In case that recording light is a violaceous laser, reflectivity of the second recording layer 12Y alone can be increased by 2% to 10% and a modulation factor of recorded record mark "M" can be increased by 0.2 to 0.6 if the film thickness of the fourth protective layer 124Y is set to 25 nm to 60 nm. Accordingly, a jitter of the record mark "M" is decreased and an excellent reproduction characteristic that exhibits an error rate as low as less than $4 \times 10^{-4}$ can be obtained although the information recording medium is inclined.

With respect to a material for the second recording layer 123Y, there is provided a phase change material, which generates a change of reflectivity or change of refractive index between amorphous and crystal. Actually, there is provided a phase change material such as Ge—Sb—Te system, Ag—In—Te—Sb system, Cu—Al—Sb—Te system. A film thickness of the second recording layer 123Y is within a range of 5 nm to 100 nm, desirably within a range of 5 nm to 30 nm in order to increase a reproduced signal, to compensate attenuated light at the first recording layer 12X, and to increase recording sensitivity.

Further, a crystallizing speed of phase change material as the second recording layer 123Y is slower than that of a first recording layer 123X that will be depicted later. In case of using a composition having a eutectic point adjacent to the eutectic point of Sb—Te, a composition ratio of Sb (antimony) to Te (tellurium) Sb/Te is made smaller than that of the first recording layer 123X. A ratio of Sb/Te is desirable to be within a range of 2.7 to 3.5.

A method for initializing the second recording layer 123Y, which is in the condition shown in FIG. 33, is explained hereupon. The second recording layer 123Y formed by a phase change material is in the amorphous state immediately after it is filmed. It is necessary for the amorphous state to be phase-changed into a crystalline state before the second recording layer 123Y is recorded by a user. Consequently, the phase-changing process is called an initializing process. Actually, by irradiating a laser beam or light beam of flush lamp not shown on the second recording layer 123Y, the second recording layer 123Y is heated more than crystallizing temperature and initialized. Practically, a laser beam for initializing has a beam diameter that is equal to or larger than the width of raised portion "A" or recessed portion "B". In case that an information recording medium 1 is in disciform, the diameter of laser beam is desirable to be longer in the radial direction than in the tangential direction of the information recording medium 1. Then, the laser beam initializes a plurality of tracks simultaneously while rotating the information recording medium 1.

A light beam for initializing is irradiated on the second recording layer 123Y from the fourth protective layer 124Y side. In order to protect the laminated layers of films, that is, the second reflective layer 121Y the third protective layer 122Y, the second recording layer 123Y and the fourth protective layer 124Y from damage caused by heat generated in the second recording layer 123Y when a laser beam for initializing is absorbed by the second recording layer 123Y, a protective coat layer formed by a ultraviolet curable resin, for example, can be provided on the fourth protective layer 124Y. The protective coat layer is desirable to be formed by a material, which assimilates with the second light transmitting layer 11Y after stuck on the first recording layer 12X and has the same transparency and refractive index as those of the second light transmitting layer 11Y.

Further, a crystallization accelerating layer not shown and a diffusion controlling layer not shown can be formed on a boundary surface between the second recording layer 123Y and the second protective layer 122Y or between the second recording layer 123Y and the fourth protective layer 124Y. The crystallization accelerating layer has a function of accelerating crystallization of phase change material, and realizes direct overwriting in higher linear velocity, and eliminates the initializing process. Actually, an alloy that contains Sb and Bi as main components and Te and Ge are combined with the main components is available. A thickness of the crystallization accelerating layer is within a range of 1 nm to 10 nm and its film thickness is desirable to be thinner as thin as possible. By forming such a crystallization accelerating layer, the second recording layer 123Y, which generally accumulates in an amorphous state, accumulates in a crystalline state immediately after it is filmed, so that the initializing process is eliminated. The reason why the second recording layer 123Y is obtained in a crystalline state is not apparent. However, in case that a material for the crystallization accelerating layer is Sb or its alloy, it is supposed that a crystal in the crystallization accelerating layer becomes a core and the accumulated phase change material conducts crystal growth succeedingly.

Furthermore, in case that the material is Bi or its alloy, the melting point of Bi is lower as low as 271° C. Therefore, it is estimated that the film of Bi phase-changes into a crystalline state by heat that is generated while the sputtering or vacuum evaporation process and the accumulated phase change material conducts crystal growth succeedingly.

The diffusion controlling layer controls an element contained in the third protective layer 122Y and the fourth protective layer 124Y to be diffused to inside of the second recording layer 123Y when recording repeatedly, and prevents a recording material from degeneration. Consequently, a number of repetitions of overwriting is improved. Actually, in case that a sulfide compound is used for the third protective layer 122Y and the fourth protective layer 124Y, metal oxide, nitride, or carbide, or mixture of them is utilized for the diffusion controlling layer in order to suppress diffusion of sulfa to the fourth protective layer 124Y. A simple substance such as AlN, GeN, $Si_3N_4$, TiN, $SiO_2$, $Ta_2O_5$, $Al_2O_3$, AlSiON, $ZrO_2$, $TiO_2$ and SiC, or mixture of them is utilized for a material of the diffusion controlling layer.

Embodiment Six

With referring to FIG. 34, an information recording medium 6 according to the embodiment six of the present invention is explained next.

Figure 34:
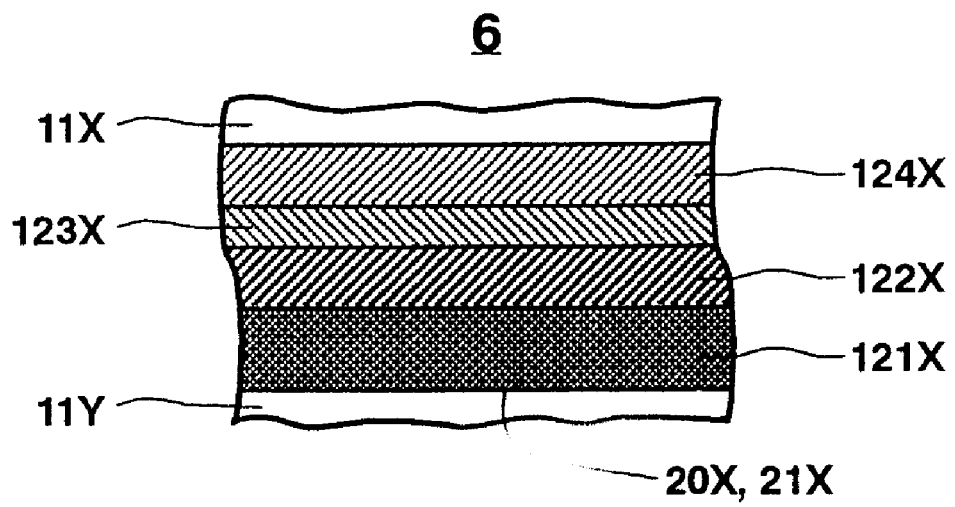
FIG. 34 is a cross sectional view of an information recording medium according to an embodiment six of the present invention.

FIG. 34 is a cross sectional view of the information recording medium 6 of which first recording layer is composed of four layers of thin film material. As shown in FIG. 34, the information recording medium 6 is composed of a first reflective layer 121X, a first protective layer 122X, a first recording layer 123X and a second protective layer 124X, which are formed on the second light transmitting layer 11Y in order, instead of the first recording layer 12X of the information recording medium 1 according to the embodiment one shown in FIG. 1.

With respect to a material for the first reflective layer 121X, the same material as the second reflective layer 121Y is utilized. In other words, there existed a metal having light reflectiveness such as Al and Au and Ag, and an alloy that contains the metal as a main component and an additive element composed of more than one metal or semiconductor or semimetal, and a mixture of metal such as Al and Au and Ag with metal compound such as metal nitride and metal oxide and metal chalcogenide. Such a metal as Al or Au or Ag and an alloy that contains the metal as the main component is high in light reflectiveness and thermal conductivity, so that they are suitable for the material of the first reflective layer 121X.

Further, the first reflective layer 121X plays a role of optimizing conduction of heat when recording is conducted to the first recording layer 123X, so that the first reflective layer 123X can be called a heat-sink layer. With respect to the alloy mentioned above, there is existed an alloy composed of Al or Ag added with at least one element out of Si, Mg, Cu, Pd, Ti, Cr, Hf, Ta, Nb, Pd, Zr and Rh as an additive element within a range of more than 1 atomic % to less than 5 atomic % in total, or another alloy composed of Au added with at least one element out of Cr, Ag, Cu, Pd, Pt and Ni as an additive element within a range of more than 1 atomic % to less than 20 atomic % in total. Particularly, as anti-corrosiveness is excellent and an iterative characteristic is improved, the first reflective layer 121X is desirable to be constituted by any one of Al—Cr alloy, Al—Ti alloy, Al—Ta alloy, Al—Zr alloy, Al—Ti—Cr alloy and Al—Si—Mn alloy, which contains Al as a main component and an additive element that is designated to be within a range of more than 0.5 atomic % to less than 3 atomic %. With respect to the additive element, adding a metal or a semiconductor to a base metal alone makes a crystal particle smaller and results in reducing a noise level while reproducing, so that adding additive element is desirable.

Furthermore, adding additive element is effective for improving stability under a high temperature and high humidity condition. Alloys such as Al—Ti, Al—Cr, Al—Zr, Al—Si, Ag—Pd—Cu and Ag—Rh—Cu, for example, are suitable for the material of the first reflective layer 121X. In case of utilizing a violaceous semiconductor laser having a wavelength of 400 nm approximately, constituting the first reflective layer 121X by an alloy of Al system or Ag system can obtain higher light transmittance and reflectivity.

With respect to a film thickness of the first reflective layer 121X, reflectivity of the first reflective layer 121X can be maintained excellently if the thickness is within a range of 1 nm to 30 nm.

Further, as mentioned above, in order to increase light transmittance when conducting light to the second recording layer 123Y, the thickness is desirable to be within a range of 3 nm to 15 nm. In other words, by setting a film thickness of the first reflective layer 121X to a range of 3 nm to 15 nm, the first reflective layer 121X functions as a translucent layer having reflectiveness together with transmittability.

Furthermore, in order to conduct heat generated by light absorbed in the first recording layer 123X, thermal conductivity of the first reflective layer 121X is desirable to be higher.

The first protective layer 122X and the second protective layer 124X is effective for protecting the second light transmitting layer 11Y and the first recording layer 123X from deformation and resulting in deteriorating a recording characteristic by excessive heat while recording, and for preventing oxidization of the first recording layer 123X, and for improving a signal contrast by an optical interference effect while reproducing.

Further, these first and second protective layers 122X and 124X are transparent or absorbed slightly at a wavelength of a light beam for recording and reproducing. Their refractive index "npx" are within a range of $1.9 \leq npx \leq 2.5$ and their absorption coefficient "kpx" are within a range of $0 \leq kpx \leq 0.2$ respectively.

Furthermore, the first protective layer 122X and the second protective layer 124X are not required to be a same material or composition. It is acceptable for them to be constituted by different materials. A thickness of the second protective layer 124X decides a wavelength exhibiting a minimum value of spectral reflectance.

Moreover, the first protective layer 122X and the second protective layer 124X is further effective for activating crystallization of the first recording layer 123X and for improving an erase ratio. With respect to a material of these first and second protective layers 122X and 124X, the same material as the third protective layer 122Y and the fourth protective layer 124Y is used. There is existed, for example, an inorganic thin film such as ZnS, $SiO_2$, ZnS—$SiO_2$, silicon nitride, and aluminium oxide.

Particularly, an oxidized thin film of metal or semiconductor such as Si, Ge, Al, Ti, Zr and Ta, a nitride thin film of metal or semiconductor such as Si, Ge and Al, a carbide thin film of metal or semiconductor such as Ti, Zr, Hf and Si, a sulfide thin film of metal or semiconductor such as ZnS, $In_2S_3$, $TaS_4$ and $GeS_2$ and a film of mixture containing more than two compounds out of the above-mentioned compounds such as oxide, nitride, carbide and sulfide are desirable for the first and second protective layers 122X and 124X because they are high in heat resistance and chemically stable.

Further, with respect to a material of the first and second protective layers 122X and 124X, it is desirable for the material not to diffuse into the first recording layer 123X. Compounds of oxide, sulfide, nitride and carbide are not necessary to be a stoichiometrical composition. Controlling a composition and using them by mixing are also effective for controlling a refractive index. By changing a content amount of oxygen, sulfur, nitrogen and carbon, a refractive index is controlled. If a content amount of them increases, a refractive index decreases. A mixture film of ZnS and $SiO_2$ is particularly suitable for a material of the first and second protective layers 122X and 124X, because recording sensitivity, C/N, and erase ratio are hard to be deteriorated by a plurality of repetitions of recording and reproducing. A thickness of the first protective layer 122X is desirable to be within a range of 10 nm to 50 nm. If a thickness of the first protective layer 122X is thinner, a reflectivity increases and a recording sensitivity is deteriorated.

Furthermore, the thinner first protective layer 122X makes a space between the first protective layer 122X and the first reflective layer 121X narrower and the first recording layer 123X results in a so-called rapid cooling construction, so that a relatively large recording power is necessary for forming a record mark "M".

On the contrary, if the thickness of first protective layer 122X becomes thicker, the space between the first protective layer 122X and the first reflective layer 121X becomes wider and the first recording layer 123X becomes the gradually cooling structure. Consequently, a rewriting performance is deteriorated and a number of repetitions of overwriting decreases. Consequently, a film thickness of the first protective layer 122X is preferable to be thinner than that of the second protective layer 124X and to be constituted in the rapid cooling construction so as to relief thermal damage. Consequently, the film thickness of the first protective layer 122X is preferable to be within a range of 2 nm to 50 nm.

Moreover, a suitable film thickness of the second protective layer 124X is within a range of 10 nm to 200 nm. Preferably, the thickness is within a range of 20 nm to 150 nm so as to increase a reproduced signal although an optimum film thickness varies by a wavelength of a light source to be utilized. In case that recording light is a violaceous laser, setting the film thickness to be within a range of 25 nm to 50 nm can increase modulation amplitude.

Particularly, a most preferable film thickness of the first protective layer 122X and the second protective layer 124X is within a range of 5 nm to 30 nm for the first protective layer 122X and a range of 25 nm to 60 nm for the second protective layer 124X respectively. By this configuration, reflectivity of the first recording layer 12X can be increased by 2% to 10% and a modulation factor of the first recording layer 12X can be increased by 0.2 to 0.6 drastically. Accordingly, a jitter of the record mark "M" is decreased and an excellent reproduction characteristic that exhibits an error rate as low as less than $4\times10^{-4}$ can be obtained while an information recording medium is inclined.

A phase change material, which generates change of reflectivity or change of refractive index between amorphous and crystal, is utilized for the first recording layer 123X. Actually, there is provided a phase change material such as Ge—Sb—Te system, Ag—In—Te—Sb system, Cu—Al—Sb—Te system. A film thickness of the first recording layer 123X is within a range of 2 nm to 30 nm, desirably within a range of 2 nm to 10 nm in order to increase light transmittance. In case of utilizing a phase change material for the first recording layer 123X, a crystallization accelerating layer not shown and a diffusion controlling layer not shown can be formed on either boundary surface between the first recording layer 123X and the first protective layer 122X or between the first recording layer 123X and the second protective layer 124X, or formed on both the boundary surfaces. The crystallization accelerating layer has a function of accelerating crystallization of phase change material and can realize direct overwriting in higher linear velocity.

On the other hand, the diffusion controlling layer controls an element contained in the first protective layer 122X or the second protective layer 124X to be diffused to inside of the first recording layer 123X when recording repeatedly, and prevents a recording material from degeneration. Consequently, a number of repetitions of overwriting is improved.

Further, a crystallizing speed of phase change material as the first recording layer 123X is faster than that of the second recording layer 123Y. In case of using a composition having a eutectic point adjacent to the eutectic point of Sb—Te, a composition ratio of Sb (antimony) to Te (tellurium) Sb/Te is made larger than that of the second recording layer 123Y. A ratio of Sb/Te is desirable to be within a range of 3.2 to 4.5.

A method for initializing the first recording layer 123X, which is in the condition shown in FIG. 34, is explained hereupon. The first recording layer 123X is heated as high as more than crystallizing temperature by irradiating a laser beam or light beam of flush lamp not shown on the first recording layer 123X, and then initialized. Practically, a laser beam for initializing has a beam diameter that is equal to or larger than the width of raised portion "A" or recessed portion "B". In case that an information recording medium 1 is in disciform, the diameter of laser beam is desirable to be longer in the radial direction than in the tangential direction of the information recording medium 1. The laser beam initializes a plurality of tracks simultaneously while rotating the information recording medium 1.

A light beam for initializing is irradiated on the first recording layer 123X from the first light transmitting layer 11X side. The light beam for initializing is desirable to be focused on the first recording layer 123X without affecting the second recording layer 12Y or 123Y. However, it is acceptable that the first recording layer 12X or 123X and the second recording layer 12Y or 123Y is initialized simultaneously.

Further, in case that a crystallization accelerating layer is provided on one surface or both surfaces of the first recording layer 12X or 123X, a phase change recording layer is crystallized at the same time when the first recording layer 12X or 123X is filmed. Consequently, initialization may not be necessary in some cases. In order to improve a recording characteristic and a reproducing characteristic, a subsidiary thin film can be formed on each layer or between layers.

The information recording mediums 1 through 6 according to the embodiments one through six of the present invention are explained above. With referring to FIG. 35, a first apparatus for reproducing any of the information recording mediums 1 through 6 is explained next. The information recording medium 1 represents the information recording mediums 1 though 6 generically for simplifying the explanation hereinafter.

Figure 35:
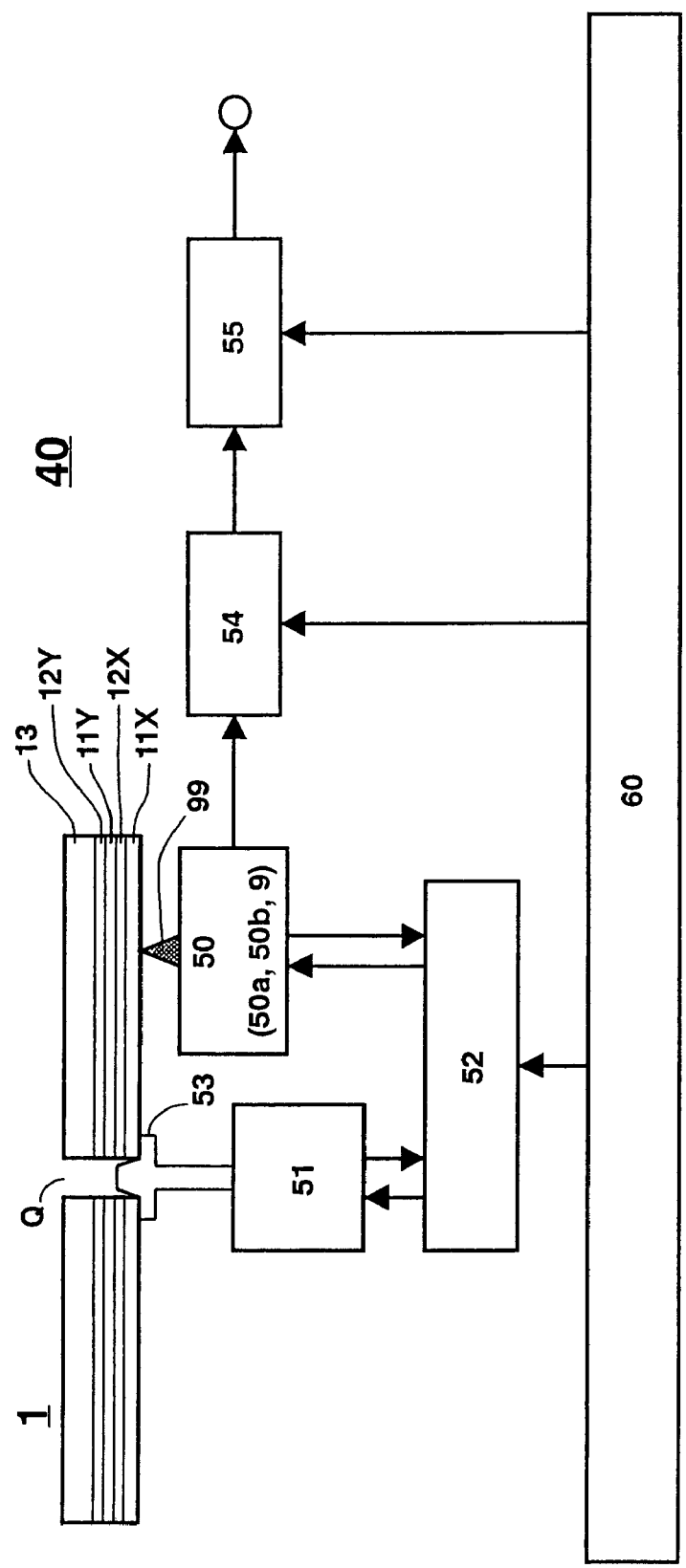
FIG. 35 is a block diagram of a first apparatus for reproducing an information recording medium according to an embodiment of the present invention.

FIG. 35 is a block diagram of a first apparatus for reproducing an information recording medium according to the present invention. As shown in FIG. 35, a first apparatus 40 is an apparatus for reproducing a first recording layer 12X or a second recording layer 12Y of the information recording medium 1 and composed of at least a reproducing unit provided with a light emitting element, which emits reproducing light having a wavelength λ of 350 nm to 450 nm and has a noise level of less than RIN (Relative Intensity Noise)−125 dB/Hz, and an objective lens having a numerical aperture NA of 0.75 to 0.9, and a control unit, which controls the reproducing unit so as to reproduce the information recording medium 1 by irradiating the reproducing light only on a raised portion "A" of the information recording medium 1. In FIG. 35, the first apparatus 40 is at least composed of a pickup 50 for reading reflected light from the information recording medium 1, a motor 51 that rotates the information recording medium 1, a servo controller 52 for controlling to drive the pickup 50 and the motor 51, a turntable 53 for supporting the information recording medium 1 while rotating, a demodulator 54 for demodulating an information signal that is read out by the pickup 50, an interface (I/F) 55 for outputting a signal that is demodulated by the demodulator 54 and a controller 60 that controls the first reproducing apparatus 40 totally.

The demodulator 54 hereupon is a digital converter that returns 16-bit data to original 8-bit data if a reproduced signal is modulated by the EFM plus modulation (8-16 modulation) method, which is commonly used for the DVD system.

The turntable 53 and the information recording medium 1 is connected with plugging a center hole Q of the information recording medium 1 with the turntable 53. Such a connection between the turntable 53 and the information recording medium 1 can be either a fixed connection or semi-fixed connection, which can load or release the information recording medium 1 freely.

Further, the information recording medium 1 can be installed in a cartridge. With respect to a cartridge, a commonly known cartridge having an opening and closing mechanism in the center can be used as it is.

The motor 51 is linked to the turntable 53 and the turntable 53 is plugged with the center hole Q of the information recording medium 1.

Further, the motor 51 supports the information recording medium 1 and supplies relative motion for reproduction to the information recording medium 1 through the turntable 53. A signal output can be supplied to a not shown external output terminal or directly supplied to a not shown display device, audio equipment or printing equipment.

The pickup 50 is at least composed of a light emitting element 50a, which emits light having a single wavelength λ within a range of 350 nm to 450 nm, desirably 400 nm to 435 nm, an objective lens 50b having a numerical aperture NA within a range of 0.75 to 0.9 and a photo detector 9, which receives reflected light that is reflected by the information recording medium 1 although they are not shown in FIG. 35.

Further, the pickup 50 forms reproducing light 99 in conjunction with these components. It is acceptable that the light emitting element 50a is a semiconductor laser of gallium nitride system compound or a laser having a second harmonic generating element.

Furthermore, the servo controller 52 is indicated only one in FIG. 35. However, it can be divided into two; one is a driving control servo for the pickup 50 and the other is another driving control servo for the motor 51. A commonly know equalizer and the PRML (partial response maximum likelihood) decoding circuit, which are not shown, can be installed in the demodulator 54. With respect to an equalizer (waveform equalizer), for example, a so-called neural net equalizer (that is disclosed in the Japanese Patent No. 2797035) in which a plurality of conversion systems having a nonlinear input-output characteristic is combined together with applying individual variable weighting and constitutes a neural network, a so-called limit equalizer (that is disclosed in the Japanese Patent Application Laid-open Publication No. 11-259985/1999) in which an amplitude level of reproduced signal is limited to a predetermined value and forwarded to a filtering process, and a so-called error selection type equalizer (that is disclosed in the Japanese Patent Application Laid-open Publication No. 2001-110146) in which an error between a reproduced signal and an objective value for waveform equalization is obtained and a frequency of the waveform equalizer is changed adaptively so as to minimize the error can be preferably used.

Moreover, in the commonly known PRML decoding circuit that contains a predicted value controlling and equalization error calculating circuit, a so-called adaptive viterbi decoder (that is disclosed in the Japanese Patent Application Laid-open Publications No. 2000-228064 and No. 2001-186027) in which a predicted value utilized for decoding viterbi algorithm is calculated and a frequency response is optimized so as to minimize an equalization error of waveform equalizer can be used particularly.

Operations of the first apparatus 40 are explained next. The information recording medium 1 is loaded on the turntable 53, which can control the information recording medium 1 to rotate in the circumferential direction, with facing the pickup 50 towards the first light transmitting layer 11X. The reproducing light 99 is emitted from the light emitting element 50a of the pickup 50 through the objective lens 50b and converged on the first microscopic pattern 21X or the second microscopic pattern 21Y of the information recording medium 1.

Accurately, the reproducing light 99 is focused on the first microscopic pattern 21X that is disposed at a depth of 0.07 mm to 0.10 mm corresponding to the thickness of the first light transmitting layer 11X or the second microscopic pattern 21Y that is disposed at a depth of 0.09 mm to 0.14 mm corresponding to the total thickness of the first light transmitting layer 11X and the first recording layer 12X and the second light transmitting layer 11Y. Succeedingly, the reproducing light 99 tracks either a raised portion "A" or a recessed portion "B". The tracking is conducted on a predetermined portion of either the raised portion "A" or the recessed portion "B". However, as mentioned above, selecting the raised portion "A" is most desirable.

The reflected light from the first microscopic pattern 21X or the second microscopic pattern 21Y is received by the photo detector 9 not shown and a recorded signal is read out. As shown in FIG. 11, the photo detector 9 is divided into four sections. A total sum signal, that is, "(Iα+Iβ+Iγ+Iδ)" of outputs from the divided four sections of the photo detector 9

(hereinafter referred to as "4-division photo detector" 9) is transmitted to the demodulator 54. Reading out the recorded signal is conducted by reproducing a record mark "M" that is recorded only on the raised portion "A", for example, in the first microscopic pattern 21X or the second microscopic pattern 21Y.

It is omitted in the above explanation that a focus error signal is necessary for focusing to be generated and a tracking error signal is necessary for tracking to be generated. Such a focus error signal and a tracking error signal is generated by a differential signal in the radial direction, that is, "$(I\alpha+I\beta)-(I\gamma+I\delta)$", which is outputted from the 4-division photo detector 9, and transmitted to the servo controller 52. In the servo controller 52, a focus servo signal or a tracking servo signal is produced from the received focus error signal or the tracking error signal in accordance with the control by the controller 60, then the focus servo signal or the tracking servo signal is transmitted to the pickup 50.

In addition thereto, a rotary servo signal is produced in the servo controller 52 and transmitted to the motor 51.

Further, in the demodulator 54, the recorded signal is demodulated and applied with error correction as required, and a data stream that is obtained is transmitted to the I/F 55. Finally, a signal is outputted externally in accordance with the control by the controller 60.

As mentioned above, the first apparatus 40 of the present invention is loaded with an information recording medium 1 and designed for coping with the reproducing light 99, which is generated by the light emitting element 50*a* (not shown) having single wavelength $\lambda$ within the range of 350 nm to 450 nm, the objective lens 50*b* (not shown) having the numerical aperture NA of 0.75 to 0.9 and the 4-division photo detector 9 (not shown). Therefore, the first apparatus 40 can reproduce the information recording medium 1 excellently.

Accordingly, the first apparatus 40 is such a reproducing apparatus that reads out information recorded on the first recording layer 12X or the second recording layer 12Y. Particularly, the first apparatus 40 can reproduce contents, which are continuously recorded for a long period of time, and can be used for reproducing an HDTV program and a movie, which are recorded by video equipment, for example.

With referring to FIG. 36, a second apparatus for reproducing any of the information recording mediums 1 through 6 according to the present invention is explained, wherein the information recording medium 1 represents the information recording mediums 1 though 6 generically for simplifying the explanation hereinafter.

Figure 36:
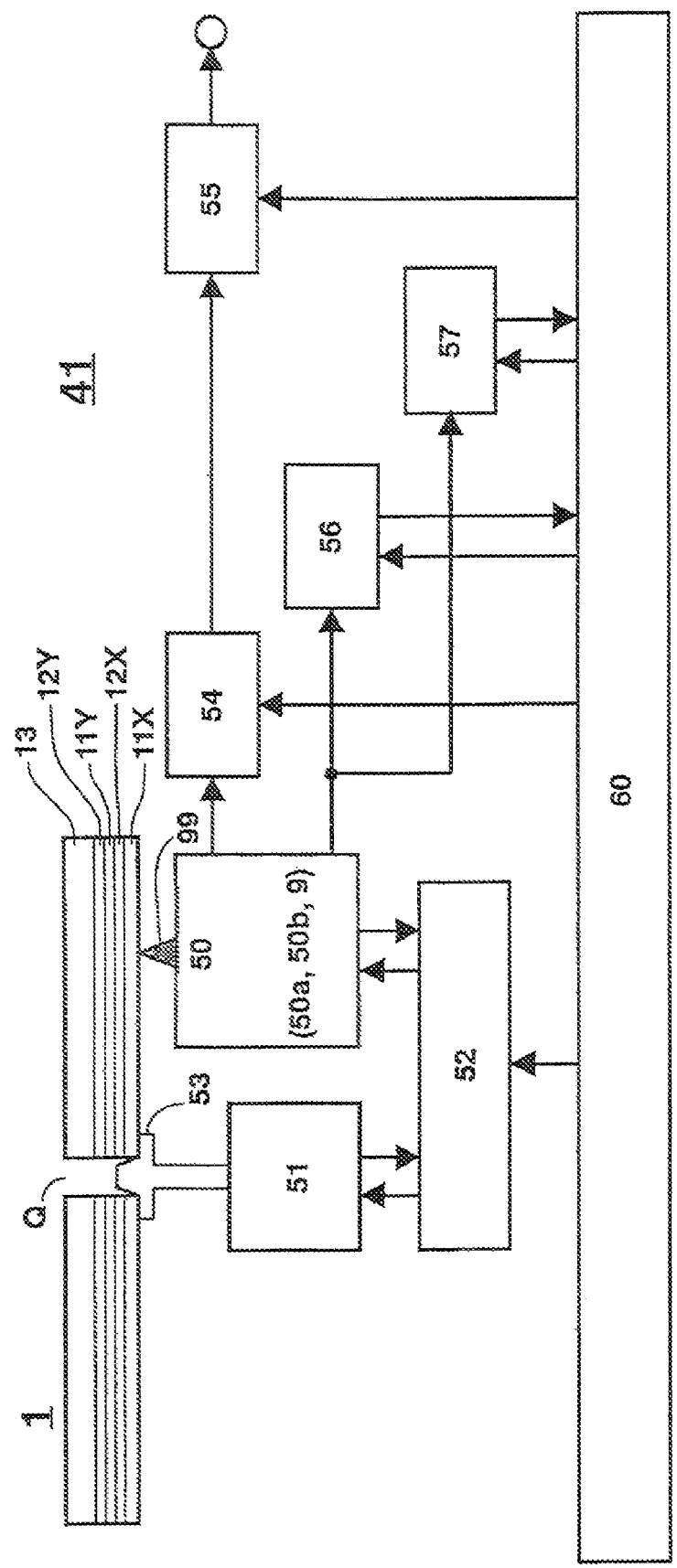
FIG. 36 is a block diagram of a second apparatus for reproducing an information recording medium according to an embodiment of the present invention.

FIG. 36 is a block diagram of a second apparatus for reproducing an information recording medium according to the present invention. In FIG. 36, a second apparatus 41 is identical to the first apparatus 40 except for an auxiliary information demodulator 56 and a reference clock demodulator 57, which are provided between the pickup 50 and the controller 60 and demodulate an auxiliary information and a reference clock read out by the pickup 50 respectively. The second apparatus 41 is a reproducing apparatus that is used for index reproduction of a HDTV program and a movie, which are recorded by video equipment, and for index reproduction of data stored in a computer.

As mentioned above, a signal that is transmitted from the pickup 50 to the demodulator 54 is the total sum signal, that is, "$(I\alpha+I\beta+I\gamma+I\delta)$" outputted form the 4-division photo detector 9 not shown. On the other hand, another signal that is transmitted from the pickup 50 to the auxiliary information demodulator 56 is the differential signal, that is, "$(I\alpha+I\beta)-(I\gamma+I\delta)$" in the radial direction outputted from the 4-division photo detector 9 not shown.

An auxiliary information and a reference clock recorded geometrically in the information recording medium 1 as a wobbling groove. The wobbling is formed in the radial direction, so that the auxiliary information and the reference clock can be extracted by monitoring the differential signal.

With respect to an actual constitution of the auxiliary information demodulator 56, it is constituted by at least any one of an amplitude-shift keying modulation demodulator, a frequency-shift keying modulation demodulator and a phase-shift keying modulation demodulator.

More accurately, an envelope detector circuit can be suitably used for the amplitude-shift keying modulation demodulator. A frequency detector circuit and a synchronous detector circuit can be suitably used for the frequency-shift keying modulation demodulator. A synchronous detector circuit, a delay detector circuit and an envelope detector circuit can be suitably used for the phase-shift keying modulation demodulator.

The amplitude-shift keying modulation wave 250, the frequency-shift keying modulation wave 260 or the phase-shift keying modulation wave 270, which constitutes the auxiliary signal area 200, is inputted to the auxiliary information demodulator 56 and an auxiliary information is demodulated from the differential signal in the radial direction outputted from the 4-division photo detector 9.

The total sum signal may leak into the differential signal in the radial direction although it may be a small amount. In order to avoid such leaking, a band-pass filter that is adjusted for a frequency range of an auxiliary signal can be inserted between the pickup 50 and the auxiliary information demodulator 56.

An actual constitution of the reference clock demodulator 57 is at least composed of a slicing circuit. The single-frequency wave 350, which constitutes the reference clock area 300 and is extracted from the differential signal in the radial direction that is outputted from the 4-division photo detector 9, is inputted to the reference clock demodulator 57. In the reference clock demodulator 57, the single-frequency wave 350 is properly sliced and formed in binary coded. In order to separate the single-frequency wave 350 from a signal obtained from the auxiliary signal area 200, a band pass filter can be inserted into a previous stage immediately before the reference clock demodulator 57. A binary coded signal controls revolution of the motor 51 through the controller 60 and the servo controller 52 so as to decide a number of revolutions of the turntable 53.

Further, in order to amplify, wave-transform, wave-shape or frequency-divide the binary coded signal, an amplifier, a waveform transformer, a waveform shaper, or a frequency divider can be connected to the second apparatus 41 additionally.

The auxiliary information demodulator 56 and the reference clock demodulator 57 is connected so as to distribute the differential signal respectively. A switching circuit not shown can be inserted in a previous stage before the auxiliary information demodulator 56 and the reference clock demodulator 57 in order not to deteriorate S/N and in order to reduce reading out error. In case that the auxiliary information area 200 and the reference clock area 300 is allocated at every predetermined interval, prediction for a following signal to be read out can be theoretically decided by reading out and identifying the signal. Consequently, the switching circuit can be constituted.

Furthermore, in case that a start bit signal and a stop bit signal is allocated between the auxiliary information area 200 and the reference clock area 300, prediction for a following signal to be read out can be theoretically decided by referring to these start bit and stop bit signals. Consequently, the switching circuit can be theoretically constituted.

With referring to FIGS. 36 and 37, an operation of the second apparatus 41 is explained next.

Figure 37:
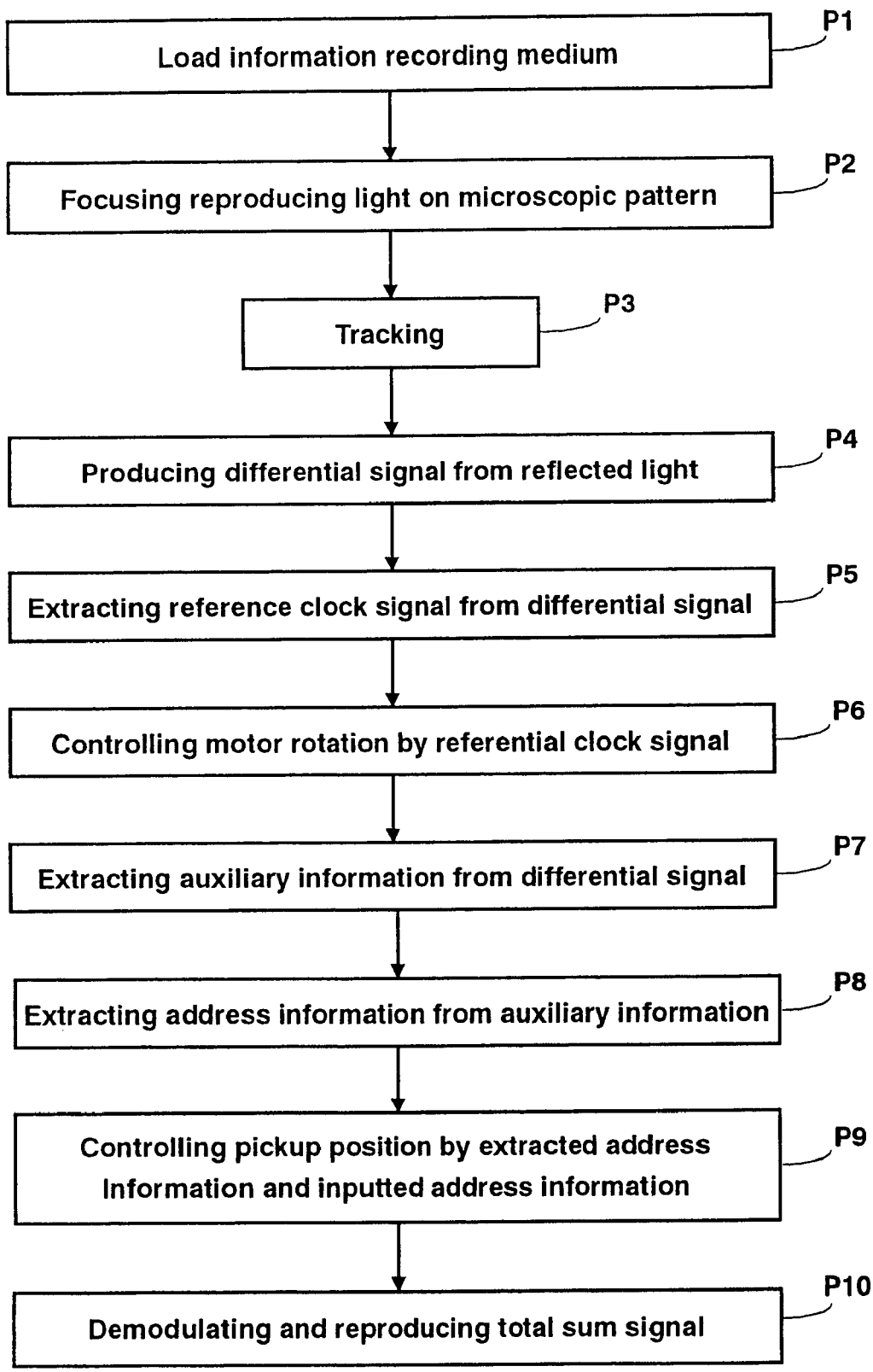
FIG. 37 is a flow chart showing a method for reproducing an information recording medium according to an embodiment of the present invention.

FIG. 37 is a flow chart showing a method for reproducing according to an embodiment of the present invention. As shown in FIG. 37, an operation of the second apparatus 41, that is, a method of reproducing the information recording medium 1 by using the second apparatus 41 is composed of at least following steps. The information recording medium 1 is loaded on the turntable 53 of the second apparatus 41 (step P1). The reproducing light 99 from the pickup 50 is converged and focused on the first microscopic pattern 21X or the second microscopic pattern 21Y formed in the information recording medium 1 (step P2), and is made tracking (step P3). A differential signal is produced from reflected reproducing light 99 that is reflected by the first microscopic pattern 21X or the second microscopic pattern 21Y (step P4). A reference clock signal is extracted from the differential signal (step P5). Revolution of the motor 51 is controlled by the extracted reference clock signal (step P6). An auxiliary information is extracted from the differential signal (step P7). An address information is extracted from the extracted auxiliary information (step P8). A position of the pickup 51 is controlled by the extracted address information and an address information inputted externally (step P9). A total sum signal is demodulated and reproduced (step P10).

More specifically, the information recording medium 1 is loaded on the turntable 53, which can control revolution of the information recording medium 1 to the circumferential direction, in order to face the pickup 50 towards the first light transmitting layer 11X first (the step P1). Succeedingly, the reproducing light 99 is emitted from the light emitting element 50a of the pickup 50 through the objective lens 50b and converged on the first microscopic pattern 21X or the second microscopic pattern 21Y of the information recording medium 1 (the step P2). Accurately, the reproducing light 99 is focused on the first microscopic pattern 21X, which is disposed at a depth of 0.07 mm to 0.10 mm that is equivalent to the thickness of the first light transmitting layer 11X, or the second microscopic pattern 21Y, which is disposed at a depth of 0.09 mm to 0.14 mm that is equivalent to a total thickness of the first light transmitting layer 11X, the first recording layer 12X, and the second light transmitting layer 12Y. Then, the reproducing light 99 is conducted to a track either the recessed portion "B" or the raised portion "A" (the step P3). The tracking is conducted by selecting a portion previously decided. However, as mentioned above, selecting the raised portion "A" is most preferable. The differential signal "(Iα+Iβ)−(Iγ+Iδ)" in the radial direction is produced from reflected light that is reflected by the first microscopic pattern 21X or the second microscopic pattern 21Y and picked up by the pickup 50 (the step P4). The produced differential signal is transmitted to the reference clock demodulator 57 and a clock signal is produced (the step P5).

Further, the clock signal is transmitted to the controller 60 so as to control a number of revolutions of the turntable 53 and controls revolution of the motor 51 by way of the servo controller 52 (the step P6).

The differential signal is transmitted to the auxiliary information demodulator 56 at the same time, and an auxiliary information is read out (the step P7). At this moment, an address information out of various auxiliary information is extracted from the extracted auxiliary information (the step P8). The extracted address information is compared with another address information that is utilized for indexing data inputted to the controller 60. In case that the extracted address information does not coincide with the other address information, the controller 60 sends a signal to the servo controller 52 and instructs the servo controller 52 to search. The searching is conducted such that a number of revolutions of the motor 51 is reset to a specific number of revolutions, which corresponds to a radius between the motor 51 and the pickup 50, according to movement in the radial direction of the pickup 50 while scanning the movement of the pickup 50 in the radial direction.

Furthermore, during a process of scanning, an address information outputted from the address information demodulator 56, which receives the differential signal from the pickup 50, is compared with a predetermined address information. The searching is continued until they coincide with each other (the step P9). When they coincide, scanning in the radial direction is interrupted and reproduction is switched over to continuous reproduction of the total sum signal "(Iα+Iβ+Iγ+Iδ)" (the step P10). An output from the demodulator 54 in which the total sum signal "(Iα+Iβ+Iγ+Iδ)" is inputted, is resulted in demodulating a data stream that is obtained by indexing, and the output is inputted to the I/F 55. Finally, the I/F 55 outputs a signal externally in accordance with controlling conducted by the controller 60.

As mentioned above, according to the second apparatus 41 and the method for reproducing that is composed of the steps P1 through P10 of the present invention, an information recording medium 1 is loaded on.

Further, the second apparatus 41 and the method for reproducing is designed for coping with the reproducing light 99, which is generated by the light emitting element 50a having a single wavelength λ within the range of 350 nm to 450 nm and the objective lens 50b having the numerical aperture NA of 0.75 to 0.9. Therefore, the second apparatus 41 and the method for reproducing can suitably reproduce information recorded in the first recording layer 12X or the second recording layer 12Y of the information recording medium 1. At the same time, they can perform index reproduction of a data stream by reproducing an auxiliary information thereto.

Furthermore, in case that an auxiliary information contains information related to reproduction power other than an address information, it is acceptable for a power value of the light emitting element 50a to be set or to be renewed by extracting the information related to reproduction power from the read-out auxiliary information.

A gap between the first microscopic pattern 21X and the second microscopic pattern 21Y of the information recording medium 1 is the thickness of the second light transmitting layer 11Y and the thickness is 0.02 mm to 0.04 mm. An NA of the objective lens 50b is large, so that spherical aberration caused by the gap becomes extremely large. Consequently, spherical aberration is essential to be compensated by adjusting an optical system in the pickup 50. Actually, in the step P2, for example, the spherical aberration can be compensated by adjusting the optical system so as to maximize an output of differential signal after focusing. If a corrective lens not shown is installed in the pickup 50, for example, it is possible to find a maximum point of differential signal by changing a distance between the corrective lens and another optical element such as the objective lens 50b.

Further, compensating spherical aberration can be conducted by observing a total sum signal. More specifically, in the step P10, the compensation can be realized by adjusting an optical system as mentioned above so as for an output of total sum signal to be maximized.

With respect to spherical aberration that is compensated by observing a differential signal, it is also acceptable for compensation to be conducted by observing a differential signal of a microscopic pattern that is disposed in a predetermined specific area.

Further, in case that spherical aberration is compensated by observing a total sum signal, it is also acceptable that test data is recorded on a recessed portion "B" or a raised portion "A" in a predetermined specific area and the compensation is conducted by observing a total sum signal of the test data. Particularly, in case that the information recording medium 1 is in disciform, these compensating methods of spherical aberration are desirable to be performed in an area, where a user never records or reproduces data, such as a lead-in area allocated in the inner circumference area or another area adjacent to the lead-in area.

With referring to FIG. 38, a third apparatus for recording any of the information recording mediums 1 through 6 according to the present invention is explained, wherein the information recording medium 1 represents the information recording mediums 1 though 6 generically for simplifying the explanation hereinafter.

Figure 38:
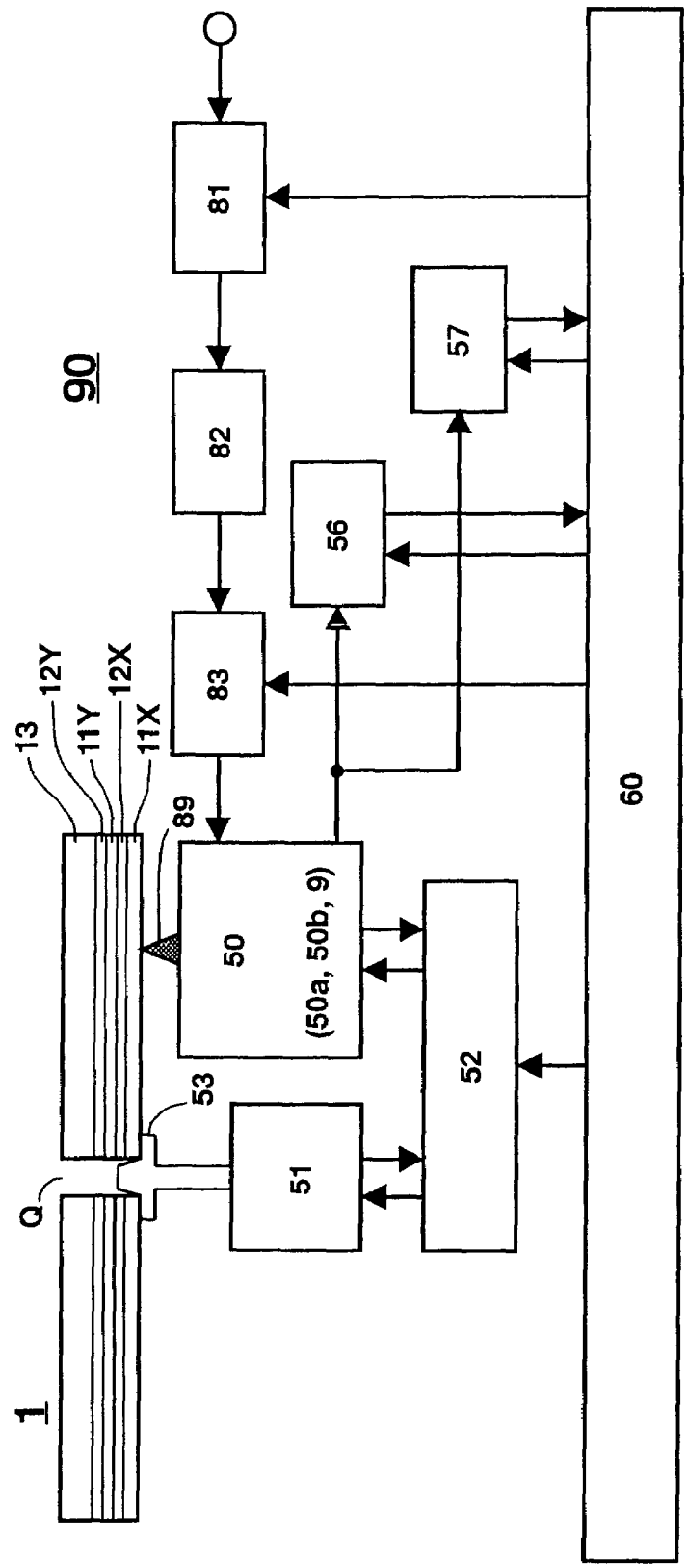
FIG. 38 is a block diagram of a third apparatus for recording an information recording medium according to an embodiment of the present invention.

FIG. 38 is a block diagram of a third apparatus 90 for recording an information recording medium 1 according to the present invention. The third apparatus 90 is an apparatus for recording information in the first recording layer 12X or the second recording layer 12Y of the information recording medium 1, and composed of at least a recording unit provided with a light emitting element 50a, which emits recording light 89 having a wavelength λ of 350 nm to 450 nm and has a noise level of less than RIN−125 dB/Hz, and an objective lens 50b having a numerical aperture NA of 0.75 to 0.9, and a control unit, which controls the recording unit so as to record the information recording medium 1 by irradiating the recording light 89 exclusively on a raised portion "A" of the information recording medium 1. Actually, the third apparatus 90 is similar to the second apparatus 41 shown in FIG. 36 except for followings: the demodulator 54 is replaced by a modulator 82 for modulating an original data and a waveform converter 83 for transforming a modulated signal from the modulator 82 into a waveform suitable for recording on an information recording medium 1, which are connected in series, and the I/F 55 is replaced by an interface (I/F) 81 for receiving an external signal to be recorded. Other components are exactly the same as those of the apparatus 41, so that explanations for the same functions and operations are omitted.

Further, the third apparatus 90 is an apparatus for recording a computer data, for example, at a predetermined address newly or recording a HDTV program or a movie continuously from a predetermined address by a video recorder.

The modulator 82 is such a modulator that converts an 8-bit original data into 16 bits, in case of the EFM plus modulation method. The waveform converter 83 transforms a modulated signal that is received from the modulator 82 into another waveform that is suitable for recording on an information recording medium 1. Actually, the waveform converter 83 is such a converter that converts a modulated signal into a recording pulse, which satisfies a recording characteristic of the first and second recording layers 12X and 12Y of the information recording medium 1. In case that the first recording layer 12X and the second recording layer 12Y is composed of a phase change material respectively, for example, a so-called multi-pulse is formed. In other words, the modulated signal is divided into a unit of channel bit or less than the unit of channel bit, and recording power is changed into a rectangular waveform, wherein peak power, bottom power, erase power and a pulse time duration, which constitute a multi-pulse, are adjusted in accordance with a direction of the controller 60.

With referring to FIGS. 38 and 39, an operation of the third apparatus 90 is explained next.

Figure 39:
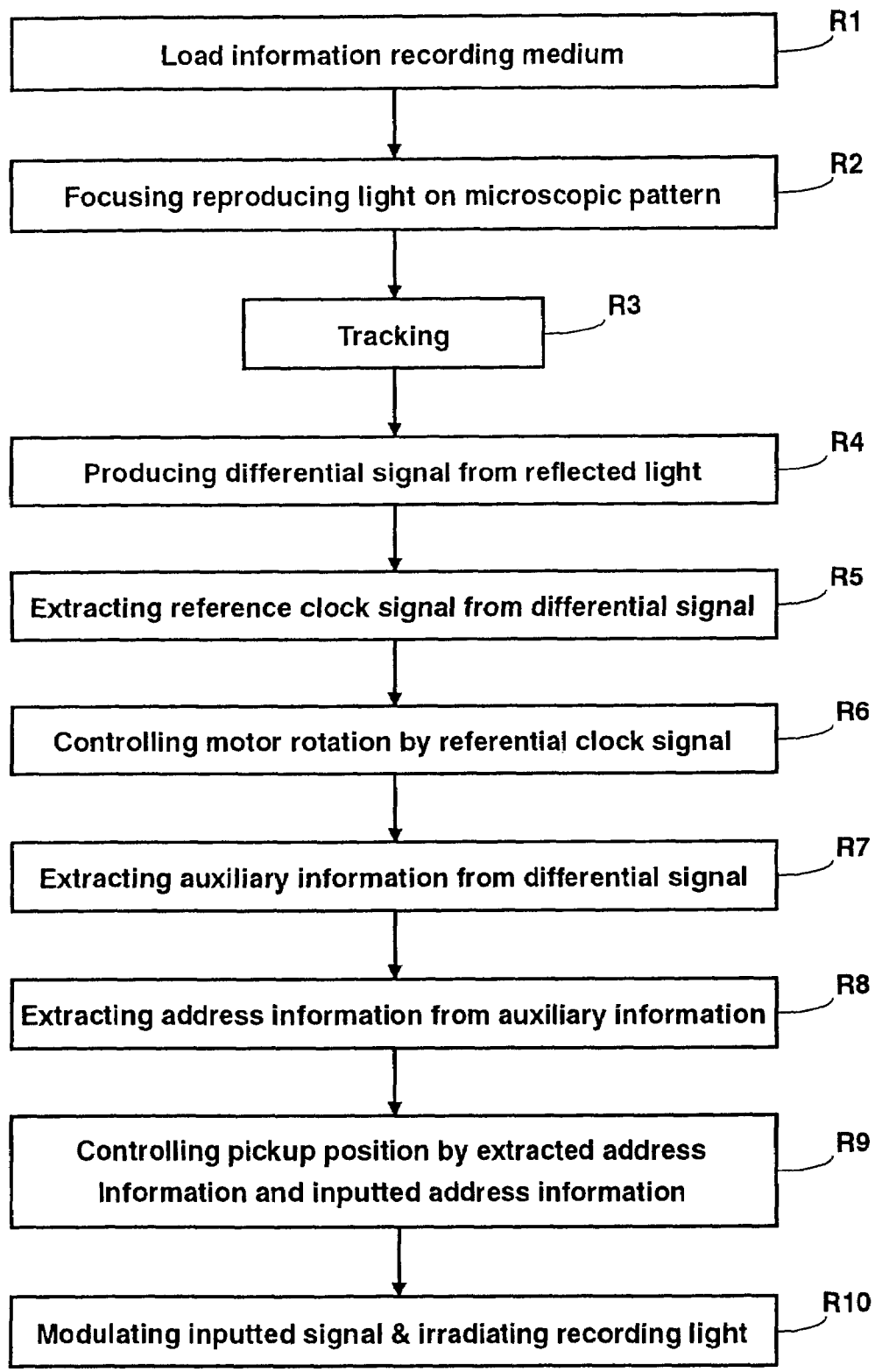
FIG. 39 is a flow chart showing a method for recording an information recording medium according to an embodiment of the present invention
Figure 40:
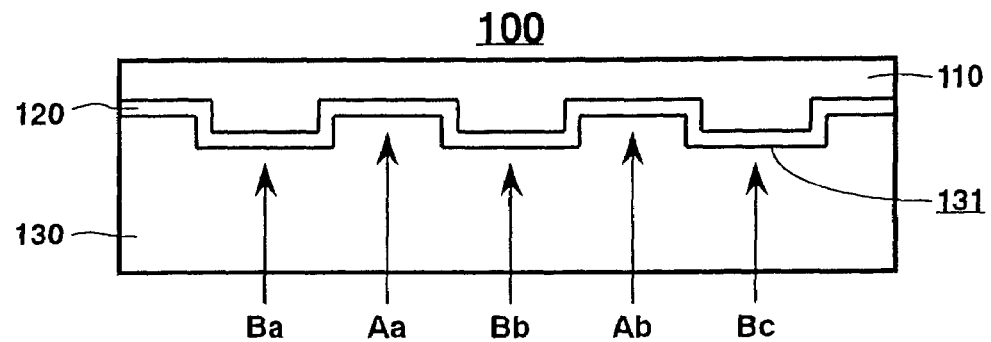
FIG. 40 is a cross sectional view of a conventional information recording medium adopting a microscopic configuration that is called the land-groove system according to the prior art.
Figure 41:
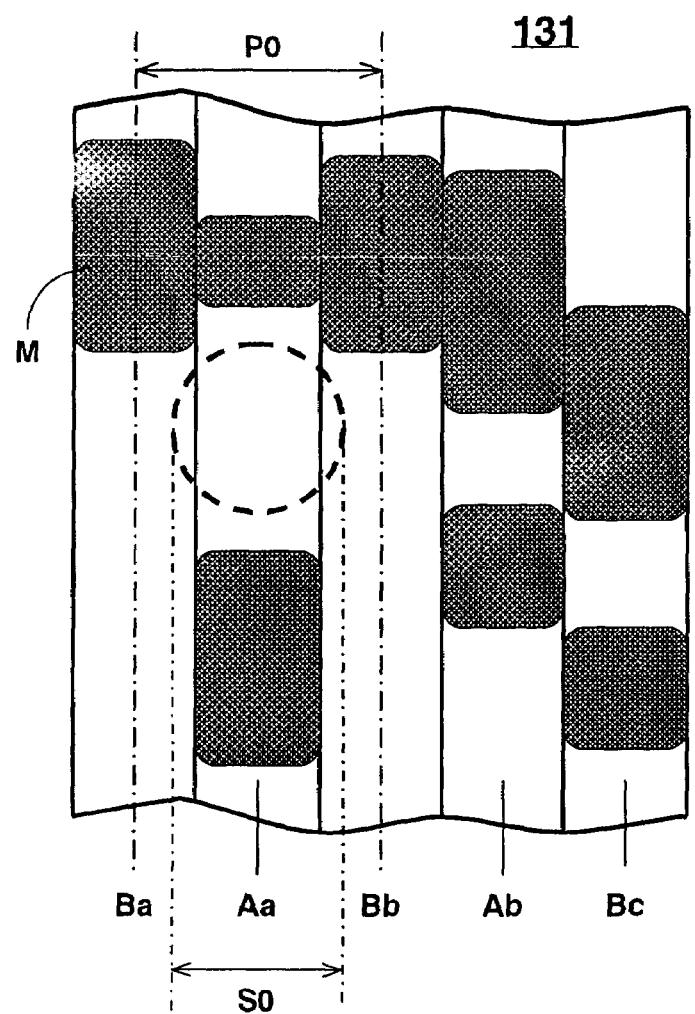
FIG. 41 is an enlarged plan view of the information recording medium shown in FIG. 40 exhibiting the horizontal configuration of the information recording medium according to the prior art.

FIG. 39 is a flow chart showing a method for recording an information recording medium 1 by using the third apparatus 90 shown in FIG. 38. As shown in FIG. 39, an operation of the third apparatus 90, that is, a method for recording the information recording medium 1 by using the third apparatus 90 is composed of at least following steps. The information recording medium 1 is loaded on the turntable 53 of the third apparatus 90 (step R1). The reproducing light 99 from the pickup 50 is converged and focused on the first microscopic pattern 20X or the second microscopic pattern 20Y formed in the information recording medium 1 (step R2), and is made tracking (step R3). A differential signal is produced from reflected reproducing light 99 that is reflected by the first microscopic pattern 20X or the second microscopic pattern 20Y (step R4). A reference clock signal is extracted from the differential signal (step R5). Revolution of the motor 51 is controlled by the extracted reference clock signal (step R6). An auxiliary information is extracted from the differential signal (step R7). An address information is extracted from the extracted auxiliary information (step R8). A position of the pickup 50 is controlled by the extracted address information and another address information inputted externally (step R9). An inputted signal is demodulated and the recording light 89 is irradiated (step R10).

More specifically, the information recording medium 1 is loaded on the turntable 53 that can control revolution of the information recording medium 1 to the circumferential direction with facing the pickup 50 towards the first light transmitting layer 11X first (the step R1). Succeedingly, the reproducing light 99 is emitted from the light emitting element 50a of the pickup 50 through the objective lens 50b and converged on the first microscopic pattern 20X or the second microscopic pattern 20Y of the information recording medium 1 (the step R2). More accurately, the reproducing light 99 is focused on the first microscopic pattern 20X, which is disposed at a depth of 0.07 mm to 0.10 mm that is equivalent to the thickness of the first light transmitting layer 11X, or the second microscopic pattern 20Y, which is disposed at a depth of 0.09 mm to 0.14 mm that is equivalent to a total thicknesses of the first light transmitting layer 11X, the first recording layer 12X, and the second light transmitting layer 12Y. Then, the reproducing light 99 is conducted to a track either the recessed portion "B" or the raised portion "A" (the step R3). The tracking is conducted by selecting a portion previously decided. However, as mentioned above, selecting the raised portion "A" is most preferable. The differential signal "(Iα+Iβ)−(Iγ+Iδ)" in the radial direction is produced from reflected reproducing light 99 that is reflected by the first microscopic pattern 20X or the second microscopic pattern 20Y and picked up by the pickup 50 (the step R4). The produced differential signal is transmitted to the reference clock demodulator 57 and a clock signal is produced (the step R5).

Further, the clock signal is transmitted to the controller 60 so as to control a number of revolutions of the turntable 53 and controls revolution of the motor 51 by way of the servo controller 52 (the step R6).

The differential signal is transmitted to the auxiliary information demodulator 56 at the same time, and an auxiliary information is read out (the step R7). At this moment, an address information out of various auxiliary information is extracted (the step R8). The extracted address information is compared with another address information that is utilized for indexing data, which is inputted to the controller 60. In case that the extracted address information does not coincide with the other address information, the controller 60 sends a signal to the servo controller 52 and instructs the servo controller 52 to search. The searching is conducted such that a number of revolutions of the motor 51 is reset to a specific number of revolutions, which corresponds to a radius between the motor 51 and the pickup 50, according to movement in the radial direction of the pickup 50 while scanning the movement of the pickup 50 in the radial direction.

Furthermore, during a process of scanning, an address information outputted from the address information demodulator 56, which receives a differential signal from the pickup 50, is compared with a predetermined address information. The searching is continued until they coincide with each other (the step R9). When they coincide, scanning in the radial direction is interrupted and reproduction is switched over to a recording operation. In other words, data inputted form the I/F 81 is demodulated by the demodulator 82 in accordance with controlling conducted by the controller 60. The modulated data is inputted into the waveform converter 83 in accordance with the controlling conducted by the controller 60 and finally, the demodulated data is transformed into a format that is suitable for recording, and outputted to the pickup 50 (the step R10).

In the pickup 50, the recording light 89 is generated by changing recording power to a predetermined recording power that is designated by the waveform converter 83, and irradiated on the information recording medium 1. Consequently, the original data is recorded at a predetermined address in the information recording medium 1.

In addition thereto, the recording light 89 can read out the differential signal "$(I\alpha+I\beta)-(I\gamma+I\delta)$" in the radial direction and an address can be extracted from the auxiliary information demodulator 56 even while recording. Accordingly, limited area recording as far as an address that is required by a user can be conducted.

As mentioned above, according to the third apparatus 90 and the method for recording that is composed of the steps R1 through R10 of the present invention, an information recording medium 1 is loaded on.

Further, the third apparatus 90 and the method for recording is designed for coping with the reproducing light 99 and the recording light 89, which are generated by the light emitting element 50*a* having a single wavelength λ within the range of 350 nm to 450 nm and the objective lens 50*b* having the numerical aperture NA of 0.75 to 0.9. Therefore, the third apparatus 90 and the method for recording can suitably record information in the first recording layer 12X or the second recording layer 12Y of the information recording medium 1. At the same time, they can reproduce even auxiliary information and can conduct random indexing for recording.

Furthermore, in case that an auxiliary information contains information related to recording strategy such as peak power, erase power, and pulse interval other than an address information, it is acceptable that a setting value of the waveform converter 83 is designated or renewed by extracting these strategic information from the read-out auxiliary information.

More, it is possible to combine the above-mentioned method for recording and the method for reproducing the information recording medium 1 together. For example, an additional step of confirming whether or not recording on an information recording medium 1 is conducted correctly by reproducing the recorded information recoding medium 1 can be added after the information recording medium 1 is recorded by the method for recording that is composed of the steps R1 through R10. The additional step of confirming is conducted by reproducing the recorded area with the reproducing light 99, and by comparing data to be recorded and another data to be reproduced.

Moreover, by extracting an address information from an auxiliary information, the additional step of confirming can be compared with the address information hereat. In case that data not recorded properly is found by the comparing, an address information corresponding to the original data is recorded in a specific area at the inner circumference area and/or the outer circumference area of the information recording medium 1. In other words, in case that an error is found when confirming by reproducing after recording, the address information is recorded in a specific area of the information recording medium 1. Consequently, an address information having error can be recognized by referring to the specific area when reproducing data recorded by a user.

Further, it is possible to reproduce the recorded data excluding only data corresponding to the address information. Accordingly, reproduction without error can be enabled.

Furthermore, in case that data not recorded properly is found by the comparing, it is acceptable that the defective data is recorded in another area having another address information together with recording an address information corresponding to the original data in a specific area at the inner circumference area and/or the outer circumference area of the information recording medium 1. By this process, not only reproducing without error but also compensating a defective part can be conducted, so that it is more effective.

The information recording mediums 1 through 6, the first and second apparatuses 40 and 41 for reproducing any of the information recording mediums 1 through 6, and the third apparatus 90 for recording any of the information recording mediums 1 through 6 is explained above.

While the invention has been described above with reference to specific embodiment thereof, it is apparent that many changes, modifications and variations in the arrangement of equipment and devices can be made without departing from the invention concept disclosed herein.

For example, the present invention provides not only the first and second apparatuses 40 and 41 for reproducing any of the information recording mediums 1 through 6 and the third apparatus 90 for recording any of the information recording mediums 1 through 6 but also each operation of the first, second, and third apparatuses 40, 41, and 90.

Further, the present invention provides the methods for reproducing and recording that are conducted by replacing each operation of apparatuses with each step of procedures of the operations respectively.

Furthermore, the present invention provides computer programs that execute each step of the methods for reproducing and recording.

More, the preset invention provides an apparatus for recording and reproducing that combines the first or second apparatus for reproducing and the third apparatus for recording, and provides a method for recording and reproducing that combines the method for reproducing and the method for recording.

Moreover, the present invention provides a system that is constituted by combining the information recording medium, the apparatus for reproducing, the apparatus for recording, the method for reproducing, and the method for recording totally.

According to the present invention, as mentioned above, there is provided an information recording medium that is composed of at least a substrate, a first recording layer, a first light transmitting layer, a second recording layer for recording different information from that to be recorded in the first recording layer, and a second light transmitting layer. The first recording layer is formed with a first microscopic pattern that is composed of continuous substance of grooves. The second recording layer is formed with a second microscopic pattern that is different from the first microscopic pattern and composed of continuous substance of grooves. Both sidewalls of raised portions of the first and second microscopic patterns are formed with wobbling so as to be parallel with each other. An auxiliary information and a reference clock is recorded on these sidewalls alternately and continuously. Consequently, the information recording medium can realize higher recording density as well as reducing cross erase.

Further, it is enabled to record and reproduce the second recording layer through the first recording layer excellently as well as recording and reproducing the first recording layer.

Furthermore, by adjusting reflectivity of the first recording layer that is observed from the first light transmitting layer side to be within a range of 0.5% to 10% and by adjusting reflectivity of the second recording layer that is observed from the first light transmitting layer side through the first recording layer to be within a range of 0.8% to 14%, continuous recording and reproducing two information surfaces of the first and second recording layers is enabled by changing focusing on respective layers. In other words, a total system can be established by combining the apparatus for reproducing, the apparatus for recording, the method for reproducing, and the method for recording together.

More, an auxiliary information such as address data is recorded geometrically in a part of microscopic pattern by the amplitude-shift keying modulation method. Consequently, recorded data can be demodulated even under low C/N condition.

Moreover, an auxiliary information such as address data is recorded geometrically in a part of microscopic pattern by the frequency-shift keying modulation method. Consequently, recorded data can be demodulated by a simplified circuitry.

Particularly, by utilizing a frequency-shift keying modulation in which a phase is selected such that a wave continues at a point of changing a frequency, a reproducing envelope is made constant and stable reproduction is enabled.

Further, an auxiliary information such as address data is recorded geometrically in a part of microscopic pattern by the phase-shift keying modulation method. Consequently, recorded data can be reproduced even under low C/N condition by demodulating the modulated data by the synchronous detection method.

Particularly, phase difference between a higher frequency section and a lower frequency section, which constitute a frequency-shift keying modulation wave, is set to $\pm\pi/2.5$, excellent signal demodulation is enabled by the synchronous detection method.

Furthermore, a reference clock is recorded in succession to an auxiliary information in a part of microscopic pattern, so that controlling revolution of an apparatus for reproducing and an apparatus for recording is enabled. Particularly, recording by stabilized length of record mark can be conducted when recording.

It should be understood that many modifications and adaptations of the invention will become apparent to those skilled in the art and it is intended to encompass such obvious modifications and changes in the scope of the claims appended hereto.

What is claimed is:

1. An information recording medium at least comprising:
    a substrate;
    a second recording layer formed on the substrate for recording information;
    a second light transmitting layer formed on the second recording layer;
    a first recording layer formed on the second light transmitting layer for recording different information from that recorded in the second recording layer; and
    a first light transmitting layer formed on the first recording layer;
    the second recording layer being formed with a second continuous microscopic pattern of a plurality of raised portions and recessed portions formed alternately viewed from the first light transmitting layer side; and
    the first recording layer being formed with a first continuous microscopic pattern of a plurality of raised portions and recessed portions formed alternately viewed from the first light transmitting layer side and different from the second microscopic pattern;
    both the first microscopic pattern and the second microscopic pattern satisfying a relation of $P \leq \lambda/NA$, wherein P is a pitch of the raised portion, $\lambda$ is a wavelength of reproducing light for reproducing the first recording layer and the second recording layer, and NA is a numerical aperture of an objective lens; and
    a sidewall of the raised portion of the first microscopic pattern and the raised portion of the second microscopic pattern being continuously wobbled in alternating sections corresponding to auxiliary information and a reference clock, wherein the auxiliary information is a frequency-shift keying modulation wave having two different frequencies and the reference clock is a sinusoidal wave having a single frequency respectively, and
    wherein thickness of the first light transmitting layer is within a range of 0.07 mm to 0.10 mm.

2. An apparatus for reproducing an information recording medium at least comprising:
    a substrate;
    a second recording layer formed on the substrate for recording information;
    a second light transmitting layer formed on the second recording layer;
    a first recording layer formed on the second light transmitting layer for recording different information from that recorded in the second recording layer; and
    a first light transmitting layer formed on the first recording layer;
    the second recording layer being formed with a second continuous microscopic pattern of a plurality of raised portions and recessed portions formed alternately viewed from the first light transmitting layer side; and
    the first recording layer being formed with a first continuous microscopic pattern of a plurality of raised portions and recessed portions formed alternately viewed from the first light transmitting layer side and different from the second microscopic pattern;
    both the first microscopic pattern and the second microscopic pattern satisfying a relation of $P \leq \lambda/NA$, wherein P is a pitch of the raised portion, $\lambda$ is a wavelength of reproducing light for reproducing the first recording layer and the second recording layer, and NA is a numerical aperture of an objective lens; and
    a sidewall of the raised portion of the first microscopic pattern and the raised portion of the second microscopic pattern being continuously wobbled in alternating sections corresponding to auxiliary information and a reference clock, wherein the auxiliary information is a frequency-shift keying modulation wave having two different frequencies and the reference clock is a sinusoidal wave having a single frequency respectively, and wherein thickness of the first light transmitting layer is within a range of 0.07 mm to 0.10 mm, the apparatus further comprising:

a reproducing device for reproducing the first recording layer or the second recording layer of the information recording medium, wherein the reproducing device includes a light emitting element for emitting reproducing light having a wavelength $\lambda$ of 350 nm to 450 nm and a noise of less than RIN (Relative Intensity Noise)−125 dB/Hz, and an objective lens having a numerical aperture NA of 0.75 to 0.9; and a control device for controlling the reproducing device to irradiate the reproducing light on the raised portion.

* * * * *